US005904869A

United States Patent [19]

Saito et al.

[11] Patent Number: 5,904,869

[45] Date of Patent: May 18, 1999

[54] AUTOMATIC LASER BEAM MACHINING APPARATUS AND PERFORMING AUTOMATIC LASER BEAM MACHINING METHOD

[75] Inventors: Shinya Saito, Tokyo; Yoshihiko Kodo, Osaka; Kazukuni Hiraoka, Osaka; Shigeru Minami, Osaka; Hamao Horiguchi, Osaka, all of Japan; Shin Tsuyuzaki, Campbell, Calif.; Kouichi Ishimoto; Yoshinori Matsumoto, both of Osaka, Japan

[73] Assignee: SNK Corporation, Osaka, Japan

[21] Appl. No.: 08/909,887

[22] Filed: Aug. 12, 1997

[30] Foreign Application Priority Data

| | | | |
|---|---|---|---|
| May 1, 1997 | [JP] | Japan | 9-130447 |
| Jun. 19, 1997 | [JP] | Japan | 9-180664 |
| Jun. 19, 1997 | [JP] | Japan | 9-180665 |

[51] Int. Cl.[6] ..... B23K 26/00

[52] U.S. Cl. ..... 219/121.68; 219/121.6; 364/474.08

[58] Field of Search ..... 219/121.68, 121.67, 219/121.6, 121.69, 121.72, 121.83; 364/479.05, 474.08

[56] References Cited

U.S. PATENT DOCUMENTS

| | | | |
|---|---|---|---|
| 4,392,476 | 7/1983 | Gresser et al. | 219/121.6 |
| 4,901,241 | 2/1990 | Schneck | 364/464.02 |
| 5,504,688 | 4/1996 | Letourneau | 364/479.05 |
| 5,506,393 | 4/1996 | Ziarno | 235/380 |
| 5,561,604 | 10/1996 | Buckley et al. | 364/479.05 |

FOREIGN PATENT DOCUMENTS 0486160 5/1992 European Pat. Off. .

OTHER PUBLICATIONS

Kuriki et al., "Eye–Contact Technique Using A Blazed Half–Transparent Mirror (BHM)", IEICE Transactions on Communications, vol. E77–B, No. 2, Feb. 1994, pp. 226–231.

*Primary Examiner*—Geoffrey S. Evans

*Attorney, Agent, or Firm*—Leydig, Voit& Mayer

[57] ABSTRACT

An automatic laser beam machining apparatus with a sensor that detects whether a user slots a fare (e.g. coins) for starting laser beam machining of an article. The apparatus includes a video camera that can take an image (such as the face of a user) and reproduce it by laser machining upon an article. The article is removed from a stack of the articles and automatically properly positioned for laser machining with safety and ease. A mark is provided on the article for detecting the machining condition (e.g. the material or a shape of the article) by using a sensor.

28 Claims, 44 Drawing Sheets

AUTOMATIC LASER BEAM MACHINING APPARATUS AND PERFORMING AUTOMATIC LASER BEAM MACHINING METHOD

FIELD OF THE INVENTION

The present invention relates to an apparatus and a method for performing laser beam machining to an article to be processed according to a user's preference by slotting predetermined fare thereto to start laser beam machining to the article.

BACKGROUND OF THE INVENTION

In recent years, at game centers or on the street, it's been fashionable among people to take pictures of their faces using a video camera provided in a seal creating machine and print images taken by the video camera or input character information using a video printer, to create seals.

Seals thus created by the seal creating machine are utilized in various ways. For example, the seals are attached to their belongings to improve originality thereof or attached to their name cards to impress themselves.

A stamp creating machine is also known, in which images taken by a video camera are transferred on paper or the like by applying special heat treatment to a stamp surface and by stamping on the paper or the like, rather than printing using the video printer.

However, in many cases, the video printer for use in the seal creating machine generally adopts sublimation type printing method. For this reason, the seals attached to belongings are poor in durability against water or the like. A printed portion tends to partially peel when it gets wet, or fade from being exposed to light for a long time.

It is true that a seal attached to belongings can improve originality thereof, but in the case of attaching it to an expensive fountain pen or a ball pointed pen, it looks inexpensive.

In the stamp creating machine, while a special heat treatment may be used in place of the video printer to transfer images on a stamp surface using nega and stamp the transferred images on papers or the like, thereby it is possible to reproduce images therein, there is a demand for a printer which can print or process various kinds of articles to be printed, namely, the printer in which input characters are printed in belongings or images taken by a video camera are printed on a seal or the like and used in processing of a stamp surface.

Therefore, there has been a problem that a special processing means (including printing) should be selected and used depending on a kind of an article to be printed (to be processed).

SUMMARY OF THE INVENTION

Accordingly, it is an object of the present invention to provide an automatic laser beam machining apparatus which can directly reproduce characters or images in belongings without attaching seals or the like in which characters or images are reproduced to the belongings, and can perform printing/machining changing an article to be printed (to be machined) and remaining printing/machining means unchanged when characters or images are reproduced in belongings, and an automatic laser beam machining method thereof.

Conventionally, laser beam machine is utilized extensively as industrial equipments. Specifically, the laser beam machine is utilized for processing concave-convex surfaces or printing of a mark for identifying a kind of electronic parts. However, as concerns a laser beam machine for citizens, there is a seal creating machine which an operator must operate throughout processing. The laser beam machine for citizens is not into wide use, since there seems to be a problem of safety.

However, these days, performance of the laser beam machine is upgraded and safety measures for the laser beam machining is taken by utilizing it in industrial equipments, so that the problem of safety is a history. Therefore, there has been a problem that little demand is found for equipments for citizens which perform laser beam machining.

The inventor, et. al of the present invention have discovered the following. If desired laser beam machining is automatically performed to the article by the user's operation, using a laser beam machine for which safety measures is being taken without fixing a skilled operator thereto, there's a possibility of achieving the aims.

It is important that amateur users can operate the apparatus with safety and ease, and that handling is not significantly changed in a case where the article is changed.

In accordance with the present invention, when the user at least slots predetermined fare for starting laser beam machining, the article is guided toward a laser beam machining position. When the article is guided to the laser beam machining position, it is positioned in a direction of optical axis of a lens which contributes to laser beam oscillation and in a plans which intersects the direction of optical axis of the lens, in order to perform laser beam machining to the article.

With the construction described above, it is possible to perform laser beam machining to the article with no need for the user to directly set the article in the laser beam machining position. This allows the user to perform laser beam machining to the article with safety and ease.

In accordance with the present invention, there is provided a mark on the article for checking a machining condition. When the user at least slots predetermined fare for starting laser beam machining, the mark is detected by a sensor to check the machining condition of the article, and then laser beam machining is performed to the article under the machining condition which has been checked by the sensor.

With the construction described above, changing the mark representing the machining condition of the article copes with change of machining condition in accordance with a material or a shape of the article. In addition, it is possible to check the machining condition by detecting the mark using the sensor. Therefore, inputting the machining condition which requires skill is dispensed with.

Furthermore, in accordance with the present invention, there is provided a mark on the article for checking its kind. When the user slots predetermined fare for starting laser beam machining, the mark is detected by the sensor to check the kind of the article and then the laser beam machining is performed to the article under the machining condition adapted to the kind of the article checked by the sensor.

With the construction described above, changing the mark representing the kind of the article copes with change of the kind, such as change of a material or a shape of the article. In addition, the machining condition adapted to the kind of the article checked by the sensor is set, so that inputting the machining condition which requires skill is dispensed with.

Furthermore, in accordance with the present invention, the article is stored in a stocker and, when the user slots predetermined fare for starting laser beam machining, laser beam machining is performed to the article which is discharged from the stocker.

With the construction described above, the article stored in the stocker is discharged from the stocker to perform laser beam machining to the same when the user at least slots predetermined fare. Therefore it is not necessary for the user to bring the article. In addition, since the article adapted to a predetermined laser power is discharged from the stocker 300 in laser beam machining, it is not necessary for the user to decide whether the discharged article is appropriate for use in laser beam machining or not.

In accordance with the present invention, laser beam machining is performed to the article to reproduce images taken by a video camera therein when the user at least slots predetermined fare for starting laser beam machining.

With the construction described above, it is possible to reproduce the images in the article.

Furthermore, in accordance with the present invention, there is provided a mark on the article for checking the process condition thereof. When the user at least slots predetermined fare for starting laser beam machining, the mark is read by the sensor to extract the process condition thereof, image data to be processed which is provided and created by the user is compared with the extracted process condition to produce the process data for machining the article, and the laser beam machining is performed to the article on the basis of the produced process data.

With the construction described above, changing the mark representing the process condition of the article copes with change of process condition in accordance with a material or a shape of the article. In addition, it is possible to check the process condition thereof by detecting the mark using the sensor. Therefore, inputting the process condition which requires skill is dispensed with. In addition, image data to be processed which is provided and created by the user is compared with the extracted process condition, to produce the process data for machining the article. Therefore, laser beam machining is performed to the article based on process data which is suitable for the article.

Numerous novelties of characteristics of the present invention is defined by appended claims.

The present invention, advantages in operating the same and aims which is attained by implementing the present invention will be better appreciated from the following detailed description of illustrative embodiments thereof, and the accompanying drawings.

DETAILED DESCRIPTION OF THE PREFERRED EMBODIMENTS

Embodiments of the present invention will be described in detail according to accompanying drawings.

Embodiment 1

Figure 1:
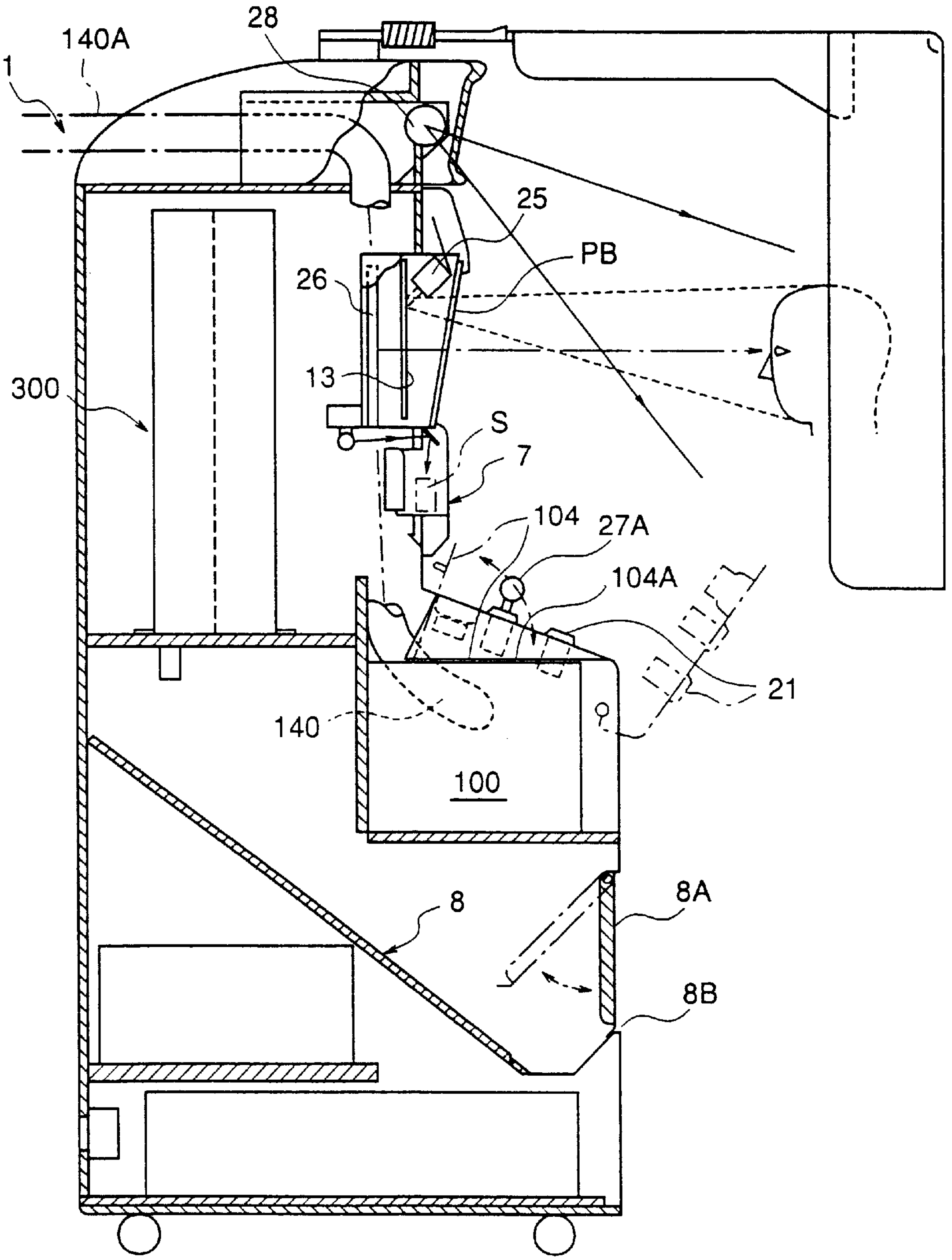
FIG. 1 is a diagram showing an internal structure of an automatic vending machine to which an automatic laser beam machining apparatus according to a first embodiment of this invention is applied.

FIG. 1 is a diagram showing an internal structure of an automatic vending machine to which an automatic laser beam machining apparatus according to a first embodiment of this invention is applied.

Figure 2:
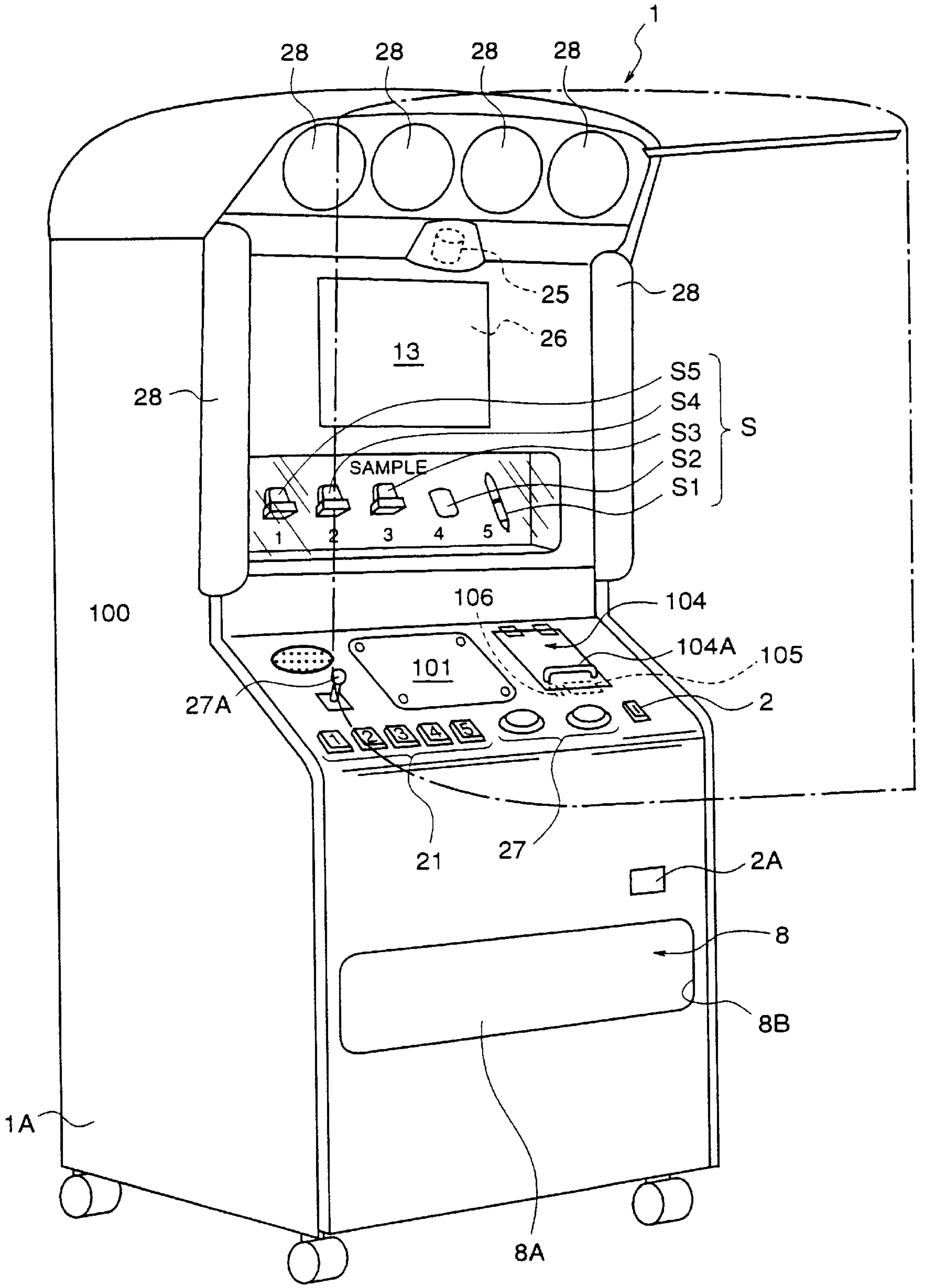
FIG. 2 is a perspective view showing an appearance of the automatic vending machine.

FIG. 2 is a perspective view showing an appearance of the automatic vending machine.

As shown in FIGS. 1 and 2, an automatic vending machining apparatus of this embodiment is designed to automatically apply a desired laser beams to an article that is vended by the automatic vending machine based on a user's operation. An automatic vending machine body 1 is in a shape suitable for the aforesaid function.

Referring to FIG. 1, the automatic vending machine body 1 comprises (i) a stocker 300 that stocks plural kinds of articles with plural pieces per kind (e.g., each 100 pieces for five kinds); (ii) a chute 8 for delivering an article discharged from the stocker 300, and (iii) laser beam machining means 100 that performs laser beam machining of a pattern to be expressed on the article delivered by the chute 8. The stocker 300 is disposed in an upper part of the automatic vending machine body 1. The chute 8 is disposed in a lower part of the stocker 300 so as to receive an article discharged from the stocker 300. The laser beam machining means 100 is provided between the stocker 300 and the chute 8.

Referring to FIGS. 1 and 2, an upper front of the automatic vending machine body 1 is provided with (i) a video camera 25 as an image taking means for taking an image of a user, (ii) a display 26 as displaying means for displaying an image taken by the video camera 25, and (iii) a showcase 7 for displaying plural (five) samples S1, S2, S3, S4, and S5 corresponding to articles, respectively. The upper front of the automatic vending machine body 1 is easy to open and close around a lateral pivot. This enables that when an article stored in the stocker 300 is out of stock, the upper front of the automatic vending machine body 1 is opened to supply articles into the stocker 300. At upper and both sides of the video camera 25, a plurality of illuminating lamps 28 are disposed so as to surround the video camera 25, in order to take an image of a user under satisfactory conditions. Preferred example of the video camera 25 is a CCD camera. The showcase 7 is disposed under the video camera 25.

An operation panel is disposed under the showcase 7. The operation panel is provided with (i) selection buttons 21 as selecting means for selecting a preferable article from five samples S1 to S5, (ii) operation buttons 27 and an operation lever 27A with which a user performs image machining operations as explained later, while watching a display 26, and (iii) a coin slot 2B into whlch a user slots a coin. The operation panel is, as shown in FIG. 1, carried in the automatic vending machine body 1 so as to easily open and close around a lateral pivot.

Referring to FIG. 2, the selection buttons 21 are disposed at the lower left side of the operation panel, and the number of the selection buttons 21 corresponds to the number of samples S1 to S5 displayed in the showcase 7. The operation buttons 27 are disposed at the right side of the selection buttons 21, and the number of the operation buttons 27 is two. The coin slot 2B is disposed at the right side of the operation button 27.

A top face of a casing of the laser beam machining means 100 is exposed to the operation panel. The top face of the casing is provided with (i) an observation window 101 through which a user observes a state of laser beam machining for an article, and (ii) a put-in door 104 through which a user puts an article into the laser beam machining means 100. The observation window 101 is located at the left side of the top face of the casing. The put-in door 104 closes an input port formed on the top face of the casing of the laser beam machining means 100, and is disposed at the right side of the observation window 101, as shown in FIG. 2. The put-in door 104 is carried in the casing of the laser beam machining means 100 so that it is easy to open and close around a lateral pivot.

The coin slot 2B may be replaced with a slot for an IC card, a paper money or a prepaid card. Alternatively, in addition to the coin slot 2B, a slot for paper money and another slot for a prepaid card may be provided.

The put-in door 104 is provided with a handle 104A for facilitating open/close of the put-in door 104. An open area of an input port is enough for a user to easily put an article into the laser beam machining means 100.

Referring again to FIGS. 1 and 2, a lower part of the automatic vending machine body 1 is provided with (i) a payback port 2A for returning a coin, (ii) a discharge port 8B through which a user takes out an article delivered by the chute 8, and (iii) a door 8A for closing the payout port 8B. The payback port 2A is located below the selection buttons 21, the operation buttons 27 and the coin slot 2. The payback port 8B and the door 8A are located below the payback port 2A. The payout port 8B has a predetermined open area sufficient for taking out an article. The door 8A is carried in the automatic vending machine body 1 so that it is easy to open and close around a lateral pivot.

Referring to FIG. 1, the chute 8 obliquely extends from a position immediately below the stocker 300 to the vicinity of the payout port 8B underlying the stocker 300, so that an article slides down in the vicinity of the payback port 8B due to the weight of the article itself.

Figure 3:
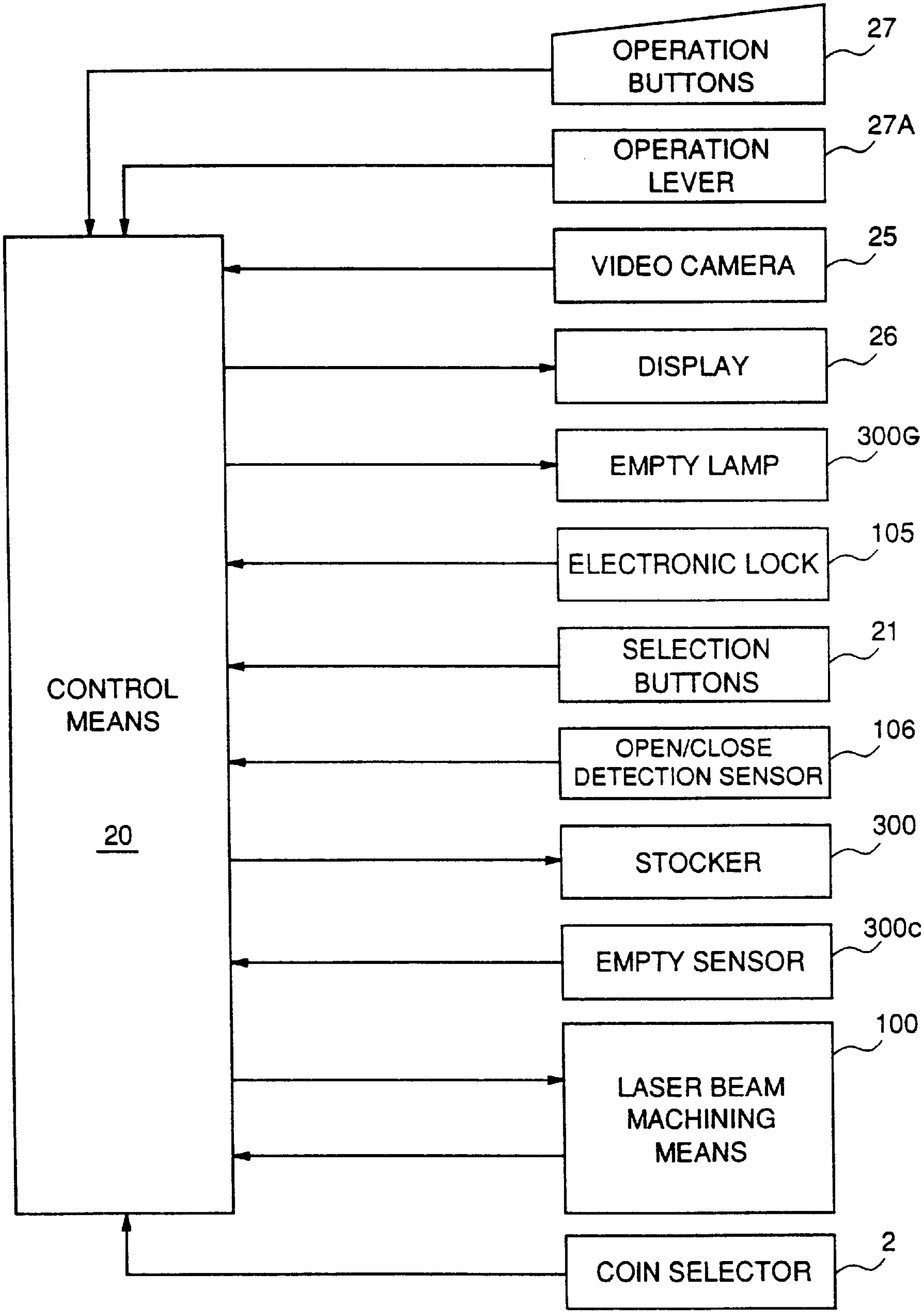
FIG. 3 is a block diagram illustrating an electrical construction of an automatic vending machine to which the automatic laser beams machining apparatus of the first embodiment is applied.

FIG. 3 is a block diagram illustrating an electrical construction of an automatic vending machine to which an automatic laser beam machining apparatus of this embodiment is applied. Control means 20 includes a CPU, a program RAM and a data RAM, and controls a control center according to programs stored in the ROM.

Specifically, the control means 20 is electrically connected with a coin selector 2 as fare detecting means that detects whether a coin corresponding to a predetermined fare is put in through the coin slot 2B, selection buttons 21, a video camera 25, a display 26, operation buttons 27, an operation lever 27A, laser beam machining means 100, an electronic lock 105 for locking a put-in door 104, an open/close detection sensor 106 for detecting whether the put-in door 104 is locked by the electronic lock 105 to close the door 104, a stocker 300, an empty sensor 300C for controlling stock of articles stored in the stocker 300, and an empty lamp 300G that informs a user or a keeper of an automatic vending machine of the presence or absence of articles based on article stock information detected by the empty sensor 300C.

The control means 20 is given signals from each of the coin selector 2, the selection buttons 21, the video camera 25, the operation buttons 27, the operation lever 27A, the laser beam machining means 100, the electronic lock 105, the open/close detection sensor 106, and the empty sensor 300C. Based on the respective signals, the control means 20 controls the display 26, the laser beam machining means 100, the stocker 300 and the empty lamp 300G.

Figure 4:
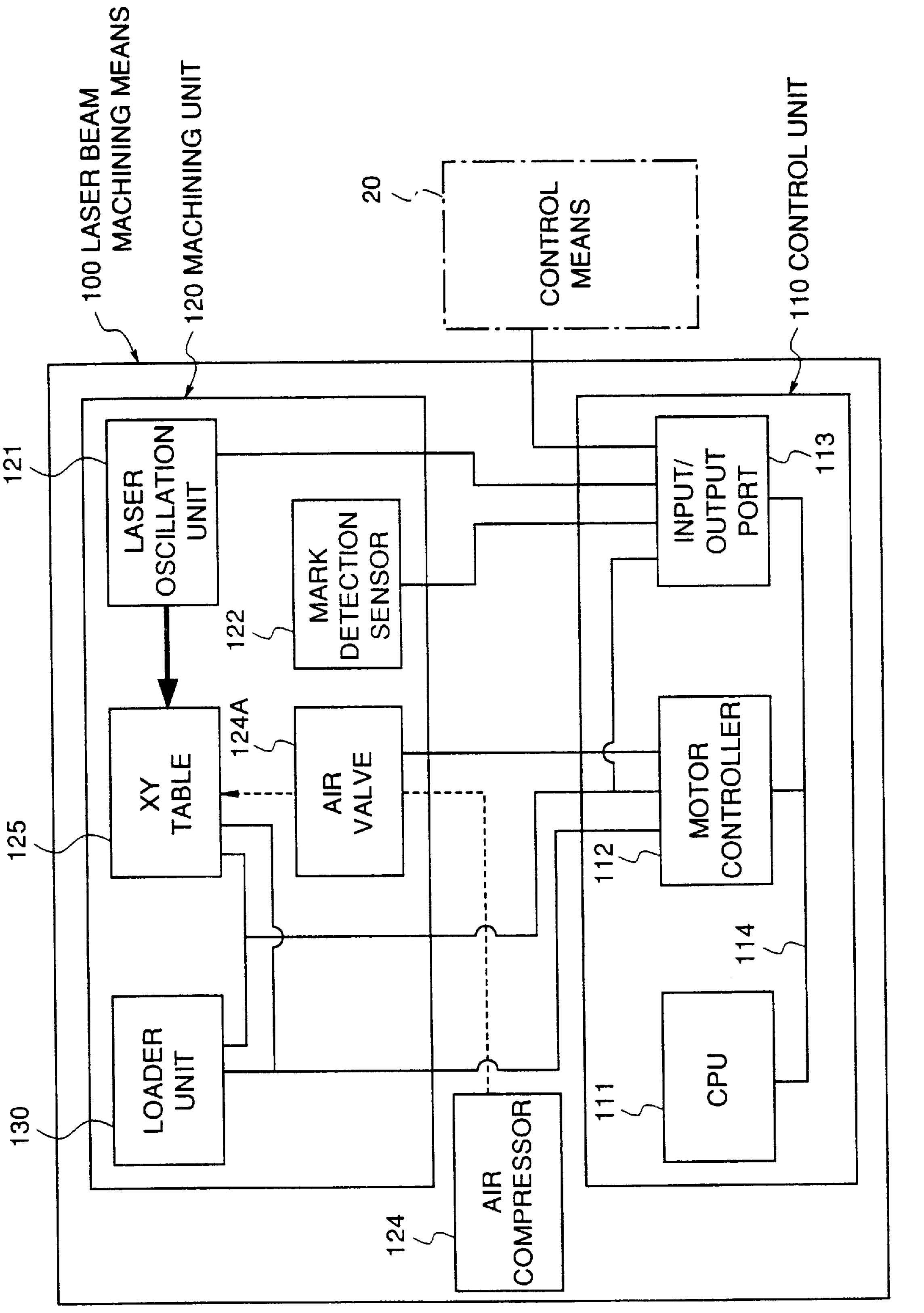
FIG. 4 is a block diagram showing an electrical construction of a laser beam machining means.

FIG. 4 is a block diagram showing an electrical construction of the laser beam machining means 100.

Referring to FIG. 4, the laser beam machining means 100 comprises (i) a control unit 110 for controlling a control center of laser beam machining, and (ii) a machining unit 120 that performs laser beam machining for an article based on control signals from the control unit 110.

The control unit 110 comprises a CPU 111, a motor controller 112 and an input/out port 113, all of which are designed to communicate with one another through a bus 114.

The machining unit 120 comprises (i) a laser oscillation unit 121 being a resource of laser beams, (ii) a mark detection sensor 122 for reading a mark M (see FIGS. 22 and 24) which is attached to an article, (iii) an XY table 125 that moves a laser beam machining head 123 (see FIGS. 5, 6 and 8) including a laser condensing lens 123A, along X axis and Y axis directions based on machining data as explained later, and (iv) a loader unit 130 including one of elements constructing guide means for guiding a tray 5 (see FIGS. 5, 6 and 8) in which an article is set, to a laser beam machining position.

Data communication between the control means 20 and the machining unit 120 is performed via the input/output port 113.

An air compressor 124 is connected to an air valve 124A in the machining unit 120, and blows out air from an air nozzle (not shown) according to control of the controller 112. Therefore, gas and the like that generate in performing laser beam machining of an article will be blown off by air originated from the air compressor 124, whereby accuracy of laser beam machining is held constant.

Figure 5:
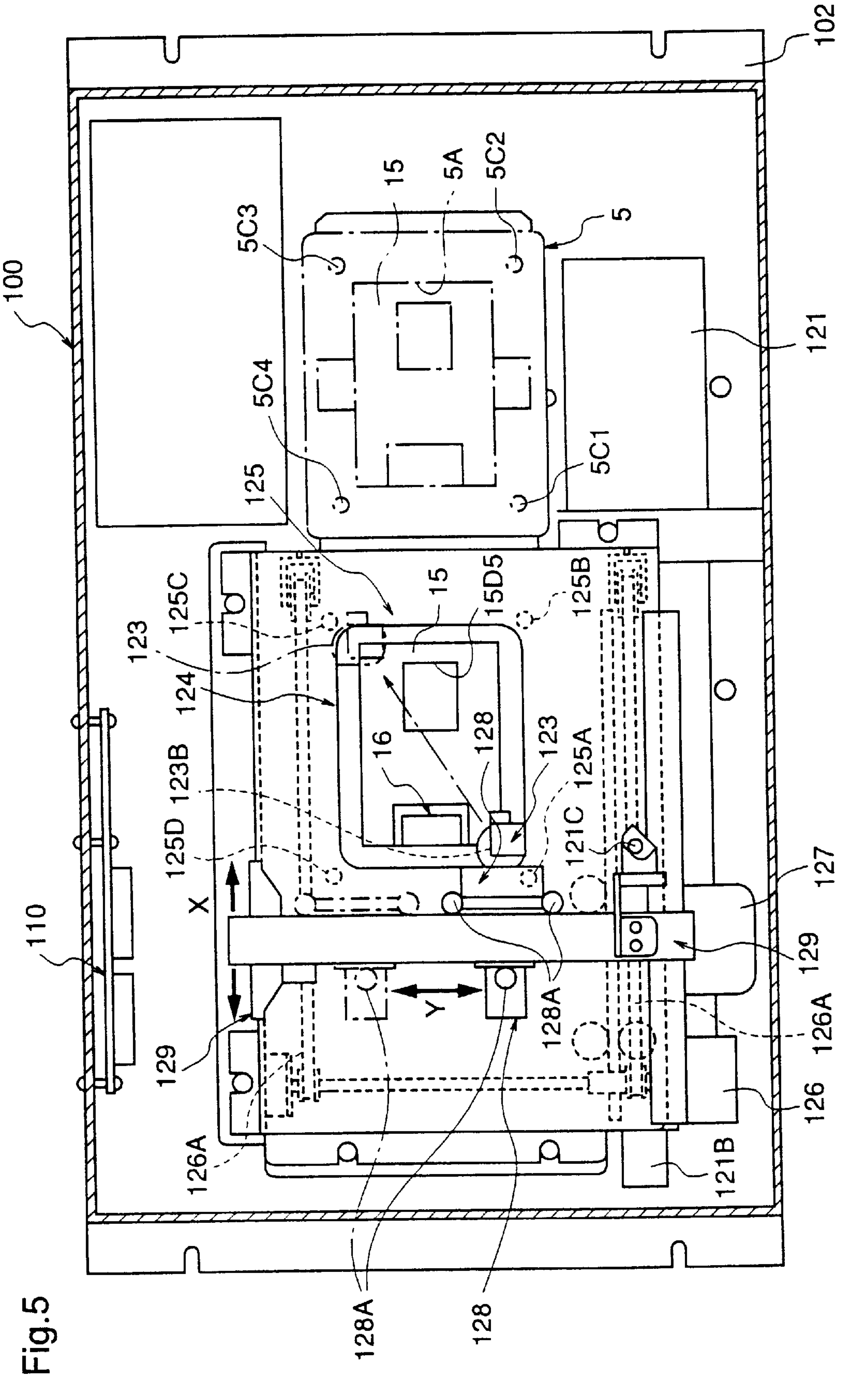
FIG. 5 is a plan view partly in section of the laser beam machining means.
Figure 6:
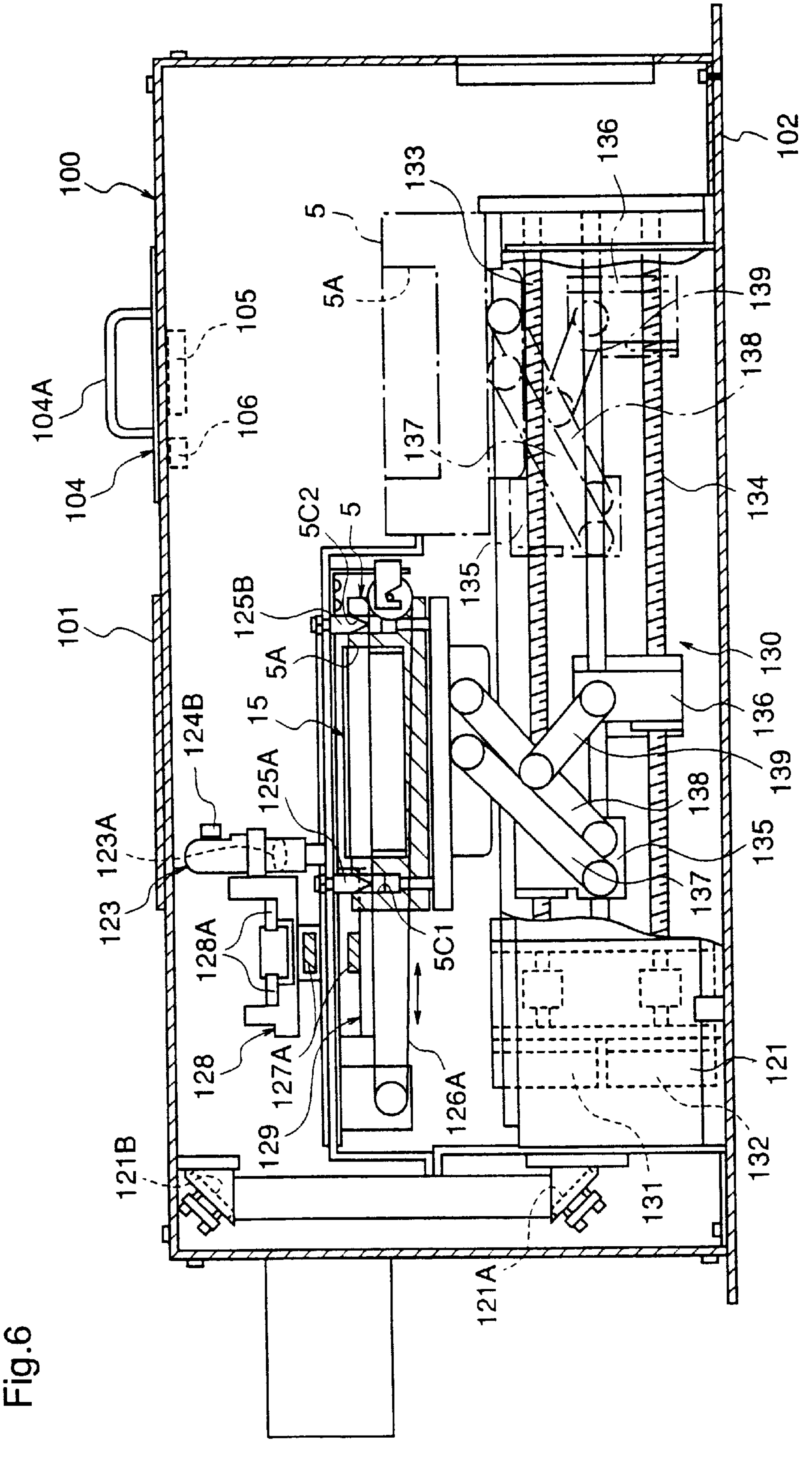
FIG. 6 is an elevational view in section of the laser beam machining means.
Figure 7:
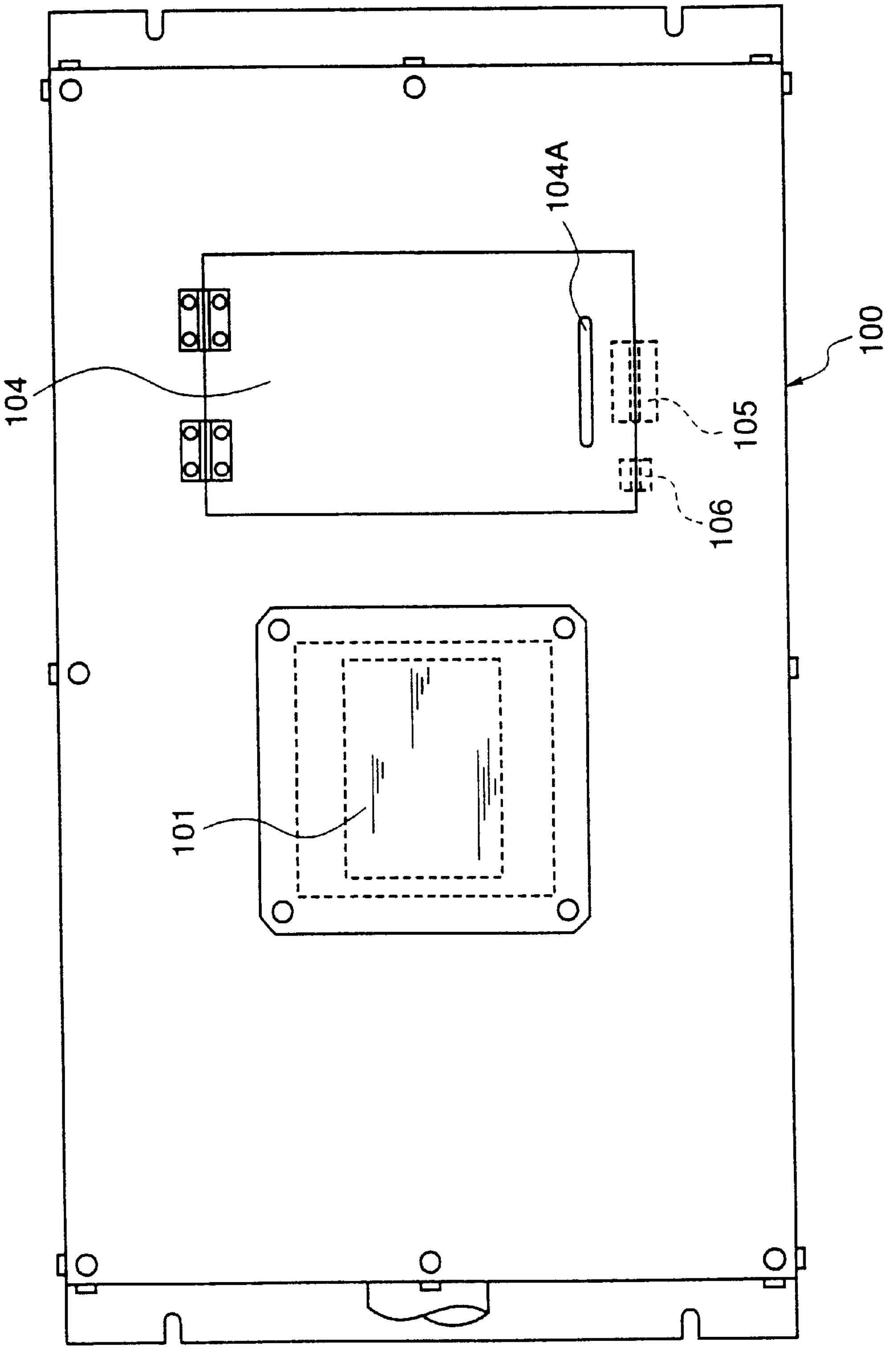
FIG. 7 is a plan view of the laser beam machining means.
Figure 8:
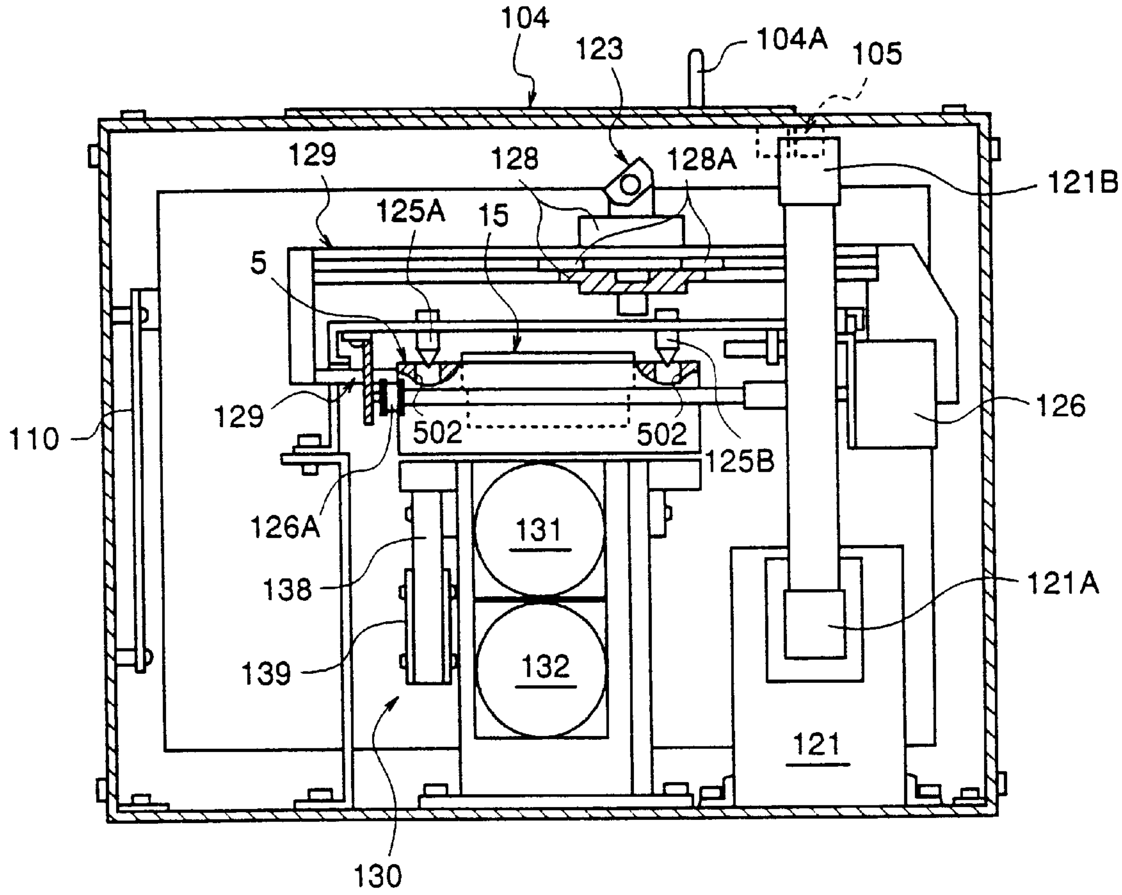
FIG. 8 is a fragmentary left-sectional view of the laser beam machining means.

FIGS. 5 to 8 show a mechanical construction of laser beam machining means 100; FIG. 5 is a plan view partly in section of the means 100; FIG. 6 is an elevational view in section of the means 100; FIG. 7 is a plan view of the means 100; and FIG. 8 is a fragmentary left-sectional view of the means 100.

Figure 9:
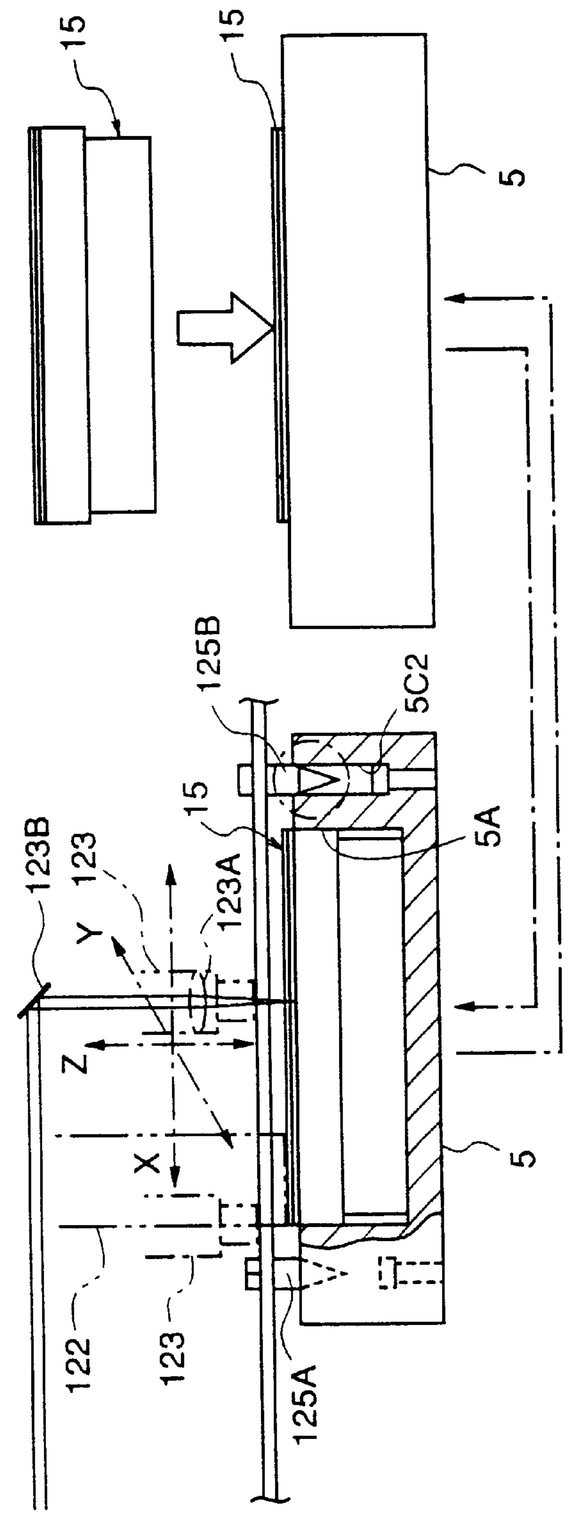
FIG. 9 is a diagram illustrating motion in the laser beam machining means.

FIG. 9 is a diagram illustrating motion in the laser beam machining means 100.

Referring to FIGS. 5 to 8, the laser beam machining means 100 is provided with a loader unit 130, an XY table 125 and a base 102 on which a laser oscillation unit 121 is mounted. The base 102 is clamped to an automatic vending machine body 1 and is coupled with a casing of the laser beam machining means 100 through the screws. As shown in FIG. 7, an electronic lock 105 and an open/close detection sensor 106 are disposed in the vicinity of an edge of a slot door of the casing.

The loader unit 130 has a guide mechanism for guiding a package 15 packing an article with the package 15 set on a tray 5, up to a laser beam machining position of the laser beam machining means 100.

Referring to FIGS. 6 and 8, the guide mechanism comprises (i) a first feed shaft 133 extending in the direction of X axis, (ii) a first pulse motor 131 for driving rotationally the first feed shaft 133, its output axis being coupled with the first feed shaft 133, (iii) a first slider 135 sliding in the direction of X axis along a rotation of the feed shaft 133, fit in the first feed shaft 133 from the outside, (iv) a second feed shaft 134 extending in the direction of X axis, (v) a second pulse motor 132 for driving rotationally the second feed shaft, its output axis being coupled with the second feed shaft 134, (vi) a second slider 136 sliding in the direction of X axis along a rotation of the feed shaft 134, fit in the second feed shaft 134 from the outside, (vii) a first link plate 137 and a second link plate 138 that link the first slider 135 and the tray 5 disposed over the first slider 135, and (viii) a third link plate 139 for linking a center portion of the second link plate 138 and the second slider 136.

The second feed shaft 134 is disposed under the first feed shaft 138 as shown in FIG. 6. The second slider 136 is disposed so as to slip from the second slider 135 in X axis. The second pulse motor 132 is disposed under the first pulse motor 131. The first and second link plates 137, 138 are approximately parallel to each other, to constitutes a parallel link. An end of the link plates 137, 138, is rotatablly carried in a lower portion of the tray 5 through a pin. An end of the third link plates 139 is rotatable supported in a center potion of the second link plates 138 through a pin, and the other end is rotatablly supported in an upper portion of the slider 136 through a pin. Therefore, the guide mechanism is slidable along the direction of X axis while elevating the tray 5 as shown by alternate long and short dash line in FIG. 5.

Referring to FIGS. 5 and 6, a fitting recess 5A as fixing means that fixes the package 15 containing an article to the tray 5 is provided in a center portion of a surface of the tray 5. The shape of the recess 5A approximately corresponds to an outline of the package 15. Thus, when the tray 5 is placed at a laser beam machining position of the laser beam machining means 100 with the package 15 fit in the recess 5A, the tray 5 and the package 15 have a certain relationship so as to absorb a tolerance in laser bean machining by the laser beam machining means 100, thereby reading a mark M precisely. Positioning holes 5C1, 5C2, 5C3, and 5C4 are provided around the recess 5A.

Referring to FIGS. 5, 6, and 8, positioning pins 125A, 125B, 125C, and 125D are formed downward on the XY table 125. The positioning pins 125A to 125D are disposed so as to correspond to the positioning holes 5C1 to 5C4, respectively, so that when the tray 5 is pressed up against the XY table 125, the positioning pins 125A to 125D are fit in the positioning holes 5C1 to 5C4, respectively. The positioning pins 125A to 125D are gradually tapered toward their tips. This is because when the tray 5 is pressed against the XY table 125, the position of the tray 5 is remedied by taper action of the pins 125A to 125D, allowing the pins 125A to 125D to certainly goes into the positioning holes 5C1 to 5C4.

When the positioning pins 125A to 125D certainly goes into the positioning holes 5C1 to 5C4, it is inevitably determined the direction of optical axis (Z axis) of the lens 123A in the laser beam machining means 100, and the position of the package 15 containing an article in a flat surface (XY flat surface) crossing at right angles with the optical axis of the lens 123A.

When the tray 5 is pushed up against the XY table 125 by the guide mechanism, the positioning pins 125A to 125D of the XY table 125 are fit in the positioning holes 5C1 to 5C4 of the tray 5 as shown in FIG. 9. The fitting between the positioning holes 5C1 to 5C4 and the positioning pins 125A to 125D lead to positioning so that laser beams narrowed down by the lens 123A of the laser beam machining means 100 are efficiently apply to a face of laser beam machining face of an article that is temporarily fixed to the tray 5. Specifically, positional relationships between the lens 123A and the positioning pins 125A to 125D are previously adjusted properly. Positional relationships between the positioning pins 125A to 125D and the positioning holes 5C1 to 5C4 are previously adjusted so that laser beams are efficiently applied to an article when the positioning pins 125A to 125D are completely fit in the positioning holes 5C1 to 5C4.

Thus, in this embodiment, the positioning holes 5C1 to 5C4 of the tray 5 and the positioning pins 125A to 125D of the XY table 125 constitute positioning means with which the direction of an optical axis (Z axis) of the lens 123A and the position of the package 15 in a flat surface (XY flat surface) crossing at right angels with the optical direction of the lens 123A, are determined when the package 15 containing an article is guided to the laser beam machining means 100.

Description will be given of a mechanism in which an XY table 125 moves a laser beam machining head 123.

Referring to FIGS. 5, 6 and 8, the laser beam machining head 123 is fixed to a slider 128. The slider 128 is provided with a roller 128A that slides while contacting a rail 129 extending along Y axis direction, and is mounted on the rail 129 so as to reciprocate along Y axis direction. Therefore, the slider 128 slides along the rail 129 according to a slide of the roller 128A. The rail 129 is mounted on the XY table 125 so that it is slidable in X axis direction.

Referring to FIGS. 5 and 6, the movement of the slider 128 in Y axis direction is attained by fixing the slider 128 to an endless belt 127A movable in Y axis direction and driving the belt 127A by a third pulse motor 127.

Referring to FIGS. 5 and 8, the laser beam machining head 123 moves integrally with the rail 129 in X axis direction. This movement is attained by fixing the rail 129 to an endless belt 126A movable in X axis direction and driving the belt 126A by a fourth pulse motor 126.

Note that the pulse motors 126 and 127 are controlled by the controller 112 as previously described.

Description will be given of how laser beams from a laser oscillation unit 121 is introduced into a laser beam machining head 123.

Referring to FIGS. 5, 6, 8 and 9, laser beams from the laser oscillation unit 121 are firstly directed to upward by a first mirror 121A and are introduced to a third mirror 121C by a second mirror 121B, and then are reflected in parallel with the rail 129 by a third mirror 121C. The laser beams thus reflected are directed to downward by a reflection mirror 123B of the machining head 123 and condensed by a lens 123A, and then applied to an article.

Figure 10:
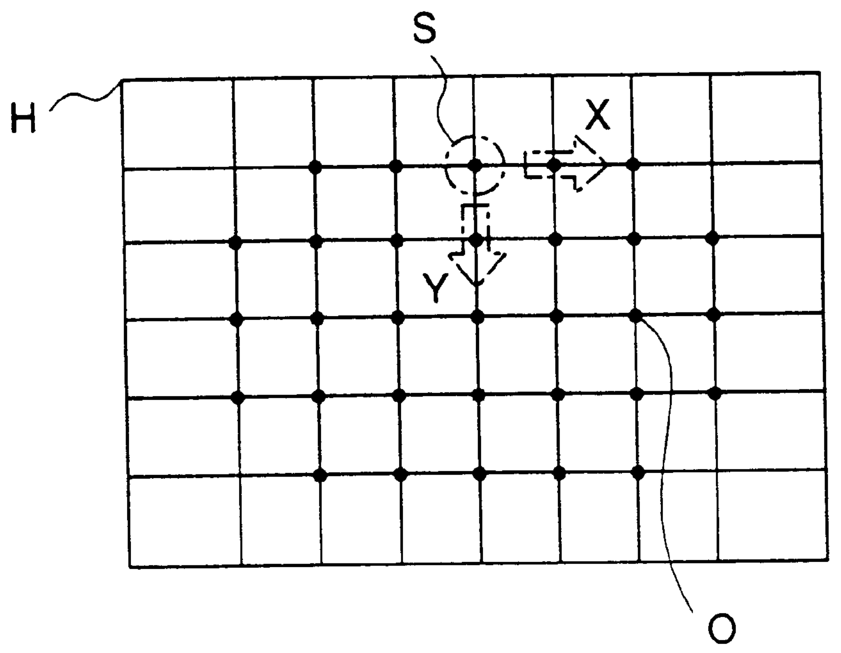
FIG. 10 is a diagram illustrating a way of obtaining a laser beam machining start point after considered a relationship with a package containing an article.

In this embodiment, in order to enable various laser beam machining regions, a home position H is previously determined in view of a relationship with the package 15 containing an article, as shown in FIG. 10. In addition, a mark M contains coordinate information (a machining position) of a machining center O and information on the size of a machining region.

Thus, the control means 20 calculates to obtain a machining start point S, based on positional relationships between a home position H, coordinate information on a machining center coordinate O, and a machining region size.

Setting the machining start point S thus obtained as an origin, the XY table moves the laser beam machining head 123 in the directions of X axis and Y axis, based on machining data, to perform a desired laser beam machining.

In laser beam machining of an article, sometimes ignitable gas occurs depending on the material of an article. To cope with this, in this embodiment, an exhaust fan 140 is provided so that ignitable gas is forced to exhaust, as shown in FIG. 1. A filter (not shown) is provided with an exhaust port of the exhaust fan 140 to prevent nasty smell and poisonous gas generated during laser beam machining, from escaping outside of an automatic vending machine body 1. In order to increase the exhaustion rate, there may provide an inlet fan.

In addition to ignitable gas, chlorine gas poisonous to human being is liable to occur. Therefore, as shown in FIG. 1, an exhaust duct 140A is connected to the exhaust fan 140 In order to introduce such poisonous gas to a place where the gas is exhausted.

In the meantime, examples of article materials that generate ignitable gas include acrylate resins. When considered laser beam machining for an article made of an acrylate resin, it is preferable to provide exhausting means, such as the exhaust fan 140. The most effective means for such an ignition is to perform laser beam machining to an article while applying purge air as explained later to a laser beam machining region of the article.

A purge air applying port 124B that applies purge air against a laser beam machining region is provided at a suitable location in the laser beam machining head 123.

Since an article made of an combustible material is liable to ignite in laser beam machining, it is necessary to apply purge air to a laser beam machining region of the article. By applying purge air to an article, it is able to perform laser beam machining of an article while cooling the article, thereby reproducing a clear image on the article.

As shown in FIG. 4, the aforesaid purge air is originated from an air compressor 124, and is applied from a purge air applying port 124B through an air valve 124A. That is, the air compressor 124 and the air valve 124A constitute air applying means. During laser beam machining, the air valve 124A is opened by tho controller 112 so that air from the air compressor 124 is applied to a laser beam machining region.

In cases where machining waste of an article occurs during laser beam machining, it is preferable to apply purge air to an article and to forcedly discharge machining waste being dispersed by the purge air by utilizing the exhaust fan 140. This prevents machining waste from attaching to an article, and no cleaning of the article is required when laser beam machining is completed.

For an article made of noncombustible material (e.g., metal) or flame retardant material, although there is no necessity to apply purge air, for safety, it is preferable to have the structure as described.

Without limiting to the aforementioned structure, it is preferable that the control means 20 cooperates with air applying means, so that if air cannot be applied to a laser beam machining region due to some trouble, use of an automatic vending machine is prohibited.

Although in this embodiment, air is applied, carbon dioxide or inactive gas may be applied for more effective prevention of ignition.

Figure 11:
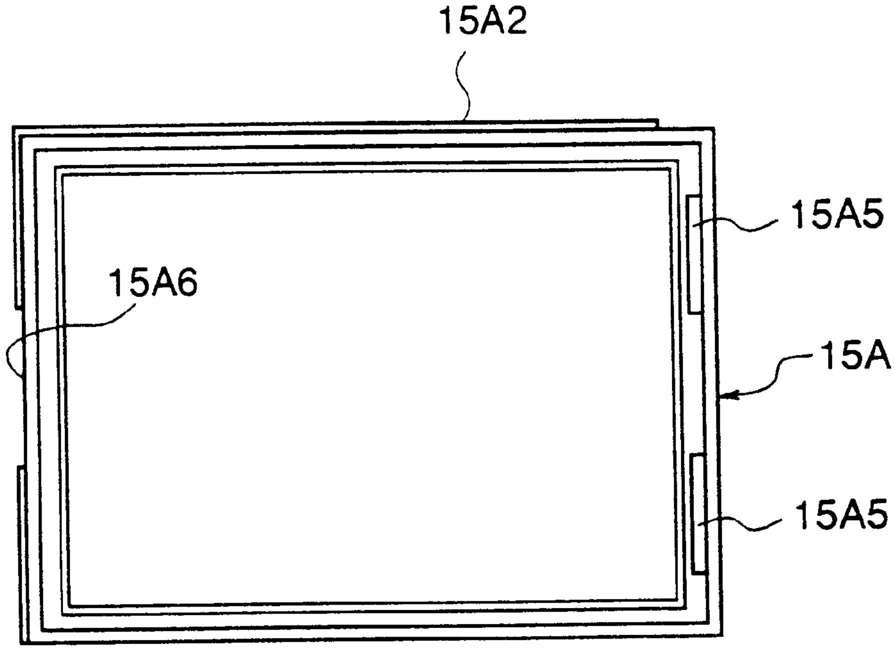
FIG. 11 is a plan view of a package bottom.
Figure 12:
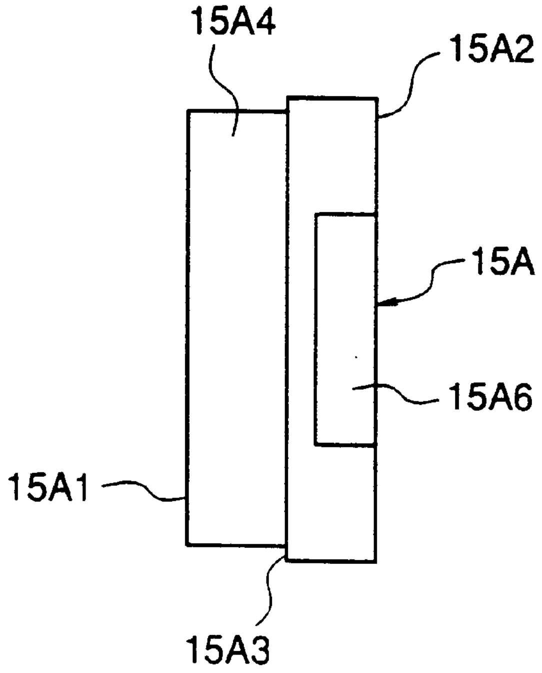
FIG. 12 is fragmentary left-sectional view of the package bottom.
Figure 13:
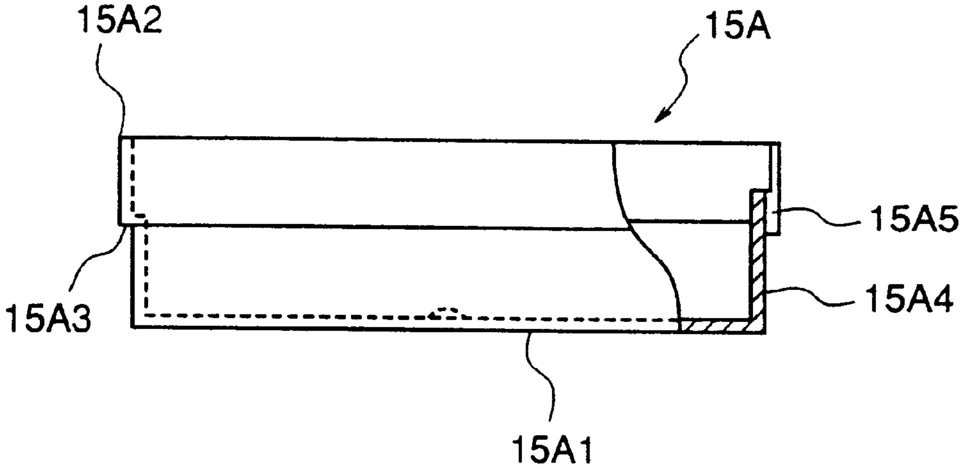
FIG. 13 is a plan view partly in section of the package bottom.

FIGS. 11 to 13 show a structure of a package bottom; FIG. 11 is a plan view of a package bottom; FIG. 12 is fragmentary left-sectional view of the package bottom; and FIG. 13 is a plan view partly in section of the package bottom.

Figure 14:
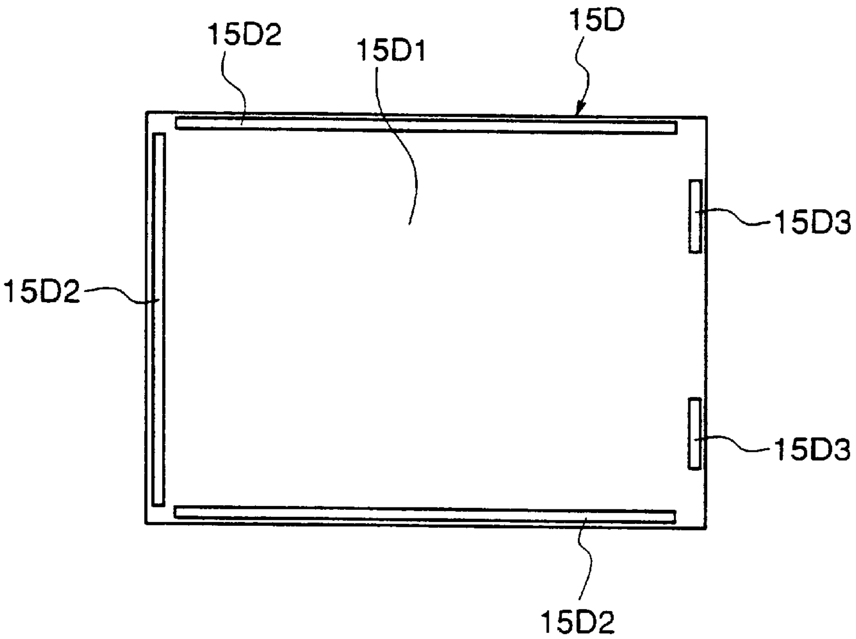
FIG. 14 is a bottom view of a package lid.
Figure 15:
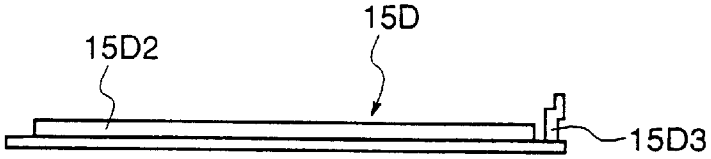
FIG. 15 is an elevational view of the package lid.
Figure 16:
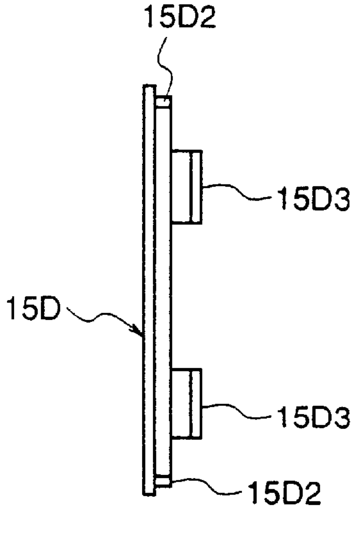
FIG. 16 is a fragmentary left-sectional view of the package lid.
Figure 17:
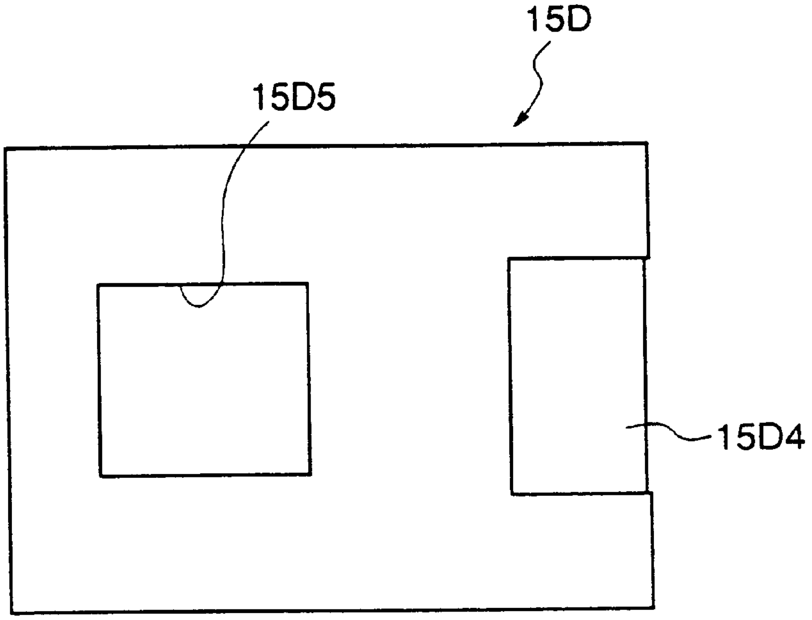
FIG. 17 is a plan view of the package lid.
Figure 18:
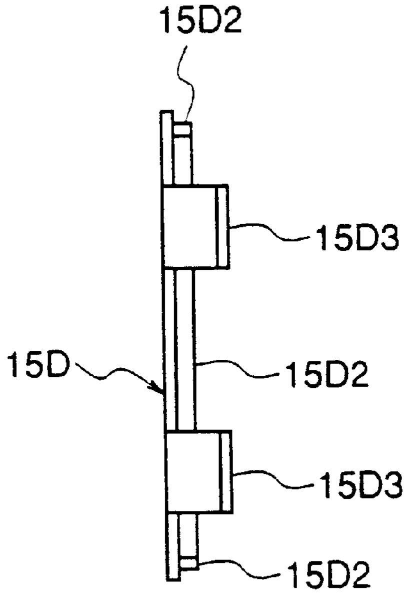
FIG. 18 is a fragmentary right-sectional view of the package lid.

FIGS. 14 to 18 show a structure of a package lid; FIG. 14 is a bottom view of a package lid; FIG. 15 is an elevational view of the package lid; FIG. 16 is a fragmentary left-sectional view of the package lid; FIG. 17 is a plan view of the package lid; and FIG. 18 is a fragmentary right-sectional view of the package lid.

Referring to FIGS. 11 to 18, a package 15 is divided into a bottom 15A for storing an article, and a lid 15D for covering the bottom 15A.

Referring to FIGS. 11 to 13, the bottom 15A includes a bottom plate 15A1 and a periphery 15A2 surrounding a periphery of an opening of the bottom 15A. The bottom plate 15Al and the periphery 15A2 are of similar rectangle. An area of the bottom plate 15Al is smaller than that of the periphery 15A2.

A periphery between the bottom plate 15A1 and the periphery 15A2 has a taper face 15A4 that widens as a distance from the periphery 15A2 is decreased. The taper face 15A4 facilitates a user's setting of the package 15 to a fitting recess 5A of a tray 5.

Referring to FIGS. 12 and 13, a step 15A3 corresponding to a periphery of the bottom 15A is provided between the bottom plate 15A1 and the periphery 15A2.

A pair of engagement projections 15D3 of a lid 15D as explained later are engaged with a pair of engagement holes 15A5.

A hollow 15A6 continues up to the periphery 15A2. Some portions of a seal 16 as explained later is attached to the hollow 15A6.

Referring to FIG. 17, a laser beams introduction port 15D5 for introducing laser beams from a laser oscillation unit 121 into the inside, is provided in a predetermined region of a surface of a lid 15D.

Referring to FIG. 14, on each inside face of three sides among four sides constituting a periphery of a bottom face 15D1 of the lid 15D, there is provided a projection 15D2 parallel to each side, and, on the rest inside face, there is provided a pair of engagement projections 15D3 to be engaged with a pair of engagement holes 15A5.

A hollow 15D4 corresponding to a hollow 15A6 of the bottom 15A engages the engagement claw 15D3 of the lid 15D to the engagement hole 15A5 of the bottom 15A. The hollow 15D4 is integrated with the hollow 15A6 when the bottom 15A is covered with the lid 15D. A seal 16 is attached to the hollows 15A4, 15D6 thus integrated.

An article is stored in space that generates between a bottom 15A and a lid 15D, when the bottom 15A is covered with the lid 15D. Examples of articles include ball pens, metallic cards, stamps, among others.

For a ball pen and a metallic card, a coating layer made of a material other than metal is placed on a metallic base, and laser beams are applied to the coating layer to remove unnecessary portion of the coating layer.

For a stamp, a coating layer that leaks no ink outside is placed on an ink absorption layer, and laser beams are applied to the coating layer to form a plurality of fine holes within a region corresponding to a desired shape, thus forming a stamp face enabling to stamp the desired shape.

Figure 19:
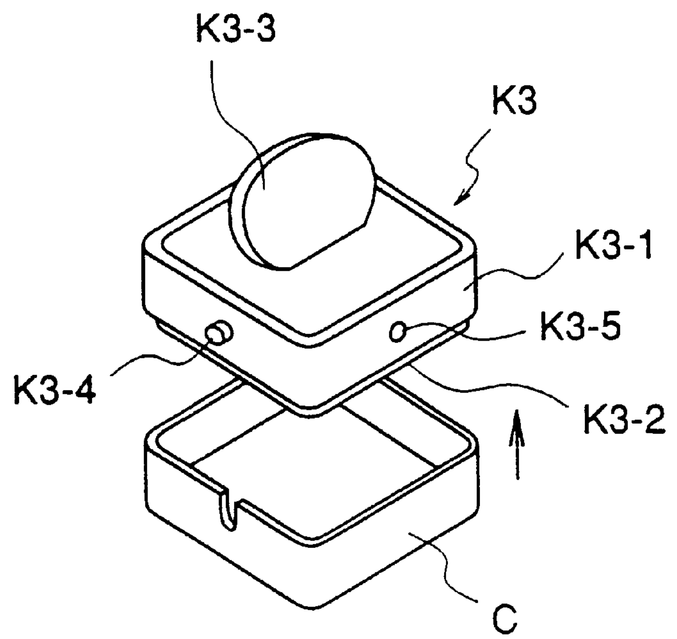
FIG. 19 is a perspective view of a stamp structure.

Taking a stamp as an example of an article, its structure will be described. FIG. 19 is a perspective view of a stamp structure.

Figure 20:
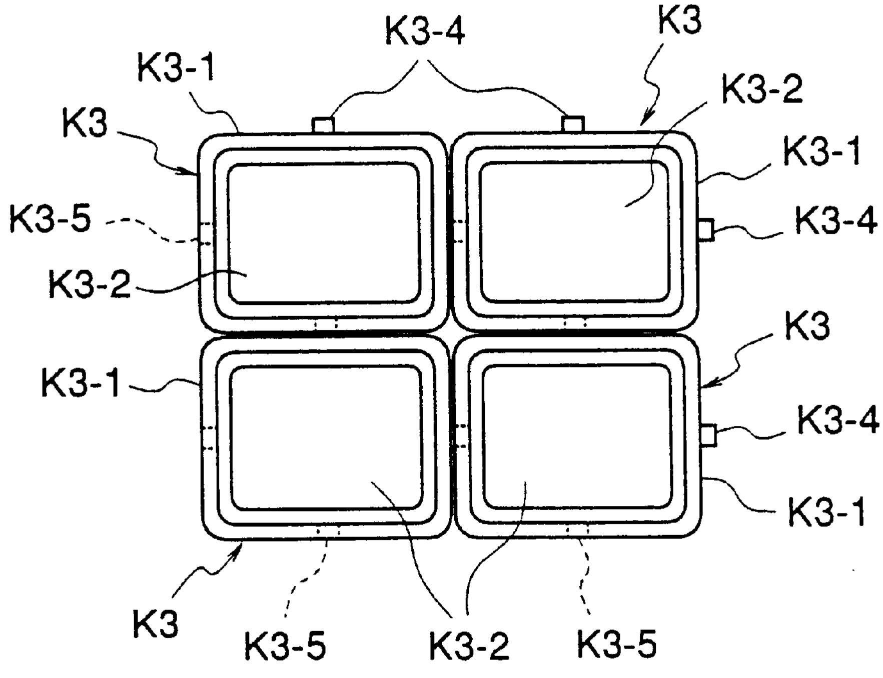
FIG. 20 is a plan view a state where plural stamps are combined.

Referring to FIG. 19, a stamp K3 includes a stamp body K3-1 of an approximately cube, a stamp face K3-2 underlying the stamp body K3-1, and a handle K3-3 located in the center of a surface of the stamp body K3-1. The engagement projections K3-4 and the engagement holes K3-5 are alternately provided on peripheral surfaces of the stamp body K3-1. It is thus possible to combine a plurality of stamps K3 as shown in FIG. 20.

Referring again to FIG. 19, the stamp face K3-2 is covered with a cap C when the stamp K3 is not used. The cap C is removable from the stamp body K3-1. The stamp face K3-2 is covered with the cap C when the cap is fit in the stamp body K3-1. The stamp face K3-2 includes an ink absorption layer and a coating layer disposed thereon, as previously described. In laser beam machining for the stamp K3, there is adopted a manner in which laser beams are applied to a coating layer and a plurality of fine holes are regenerated based on machining data. As another manner, a plurality of fine holes are previously formed over the entire surface of a coating layer, and laser beams are applied to the coating layer to melt the coating layer so as to fill the fine holes.

Figure 21:
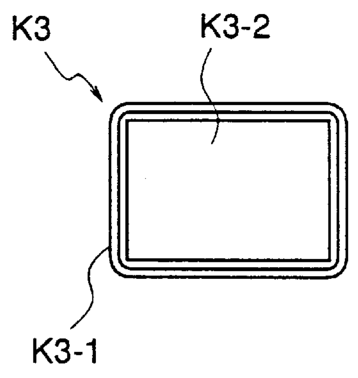
FIGS. 21(*a*) and 21(*b*) are a plan view illustrating a stamp having a different stamp face.
Figure 21:
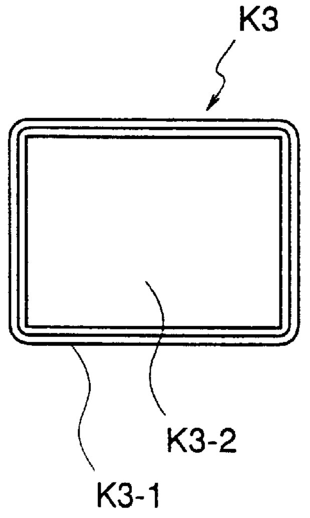

A variety of stamps that differ in the size of a stamp face K3-2 may be prepared as a stamp K3, as shown in FIGS. 21(*a*) and 21(*b*).

Figure 22:
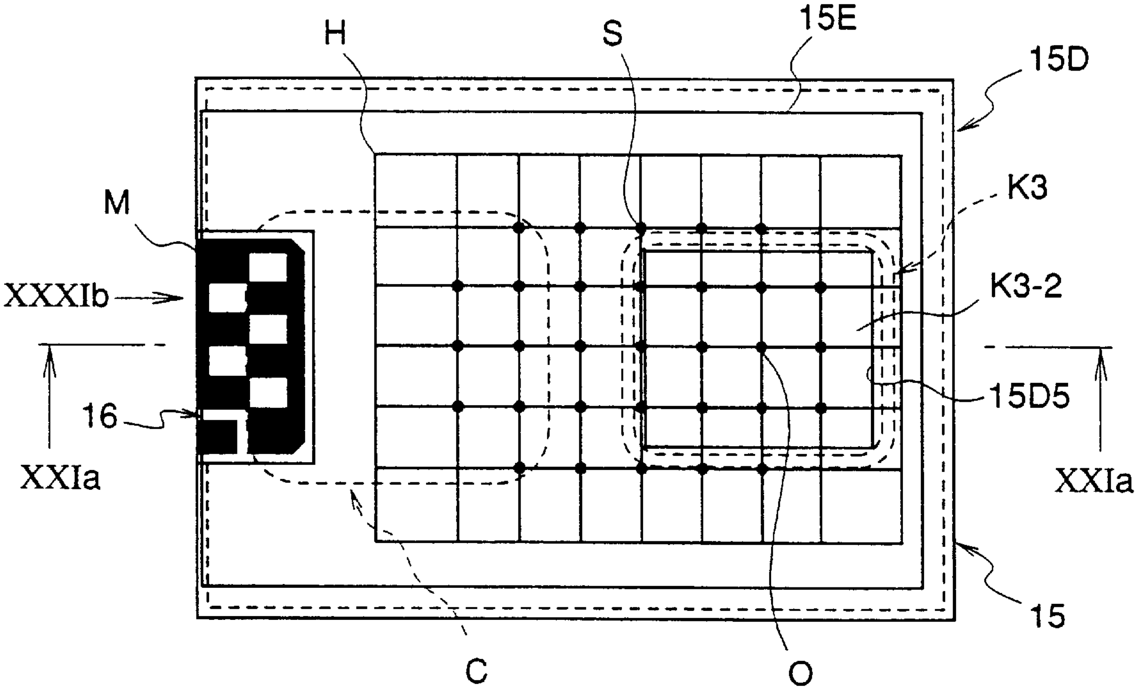
FIG. 22 is a plan view illustrating a state where a stamp and a cap are stored in a package.
Figure 23:
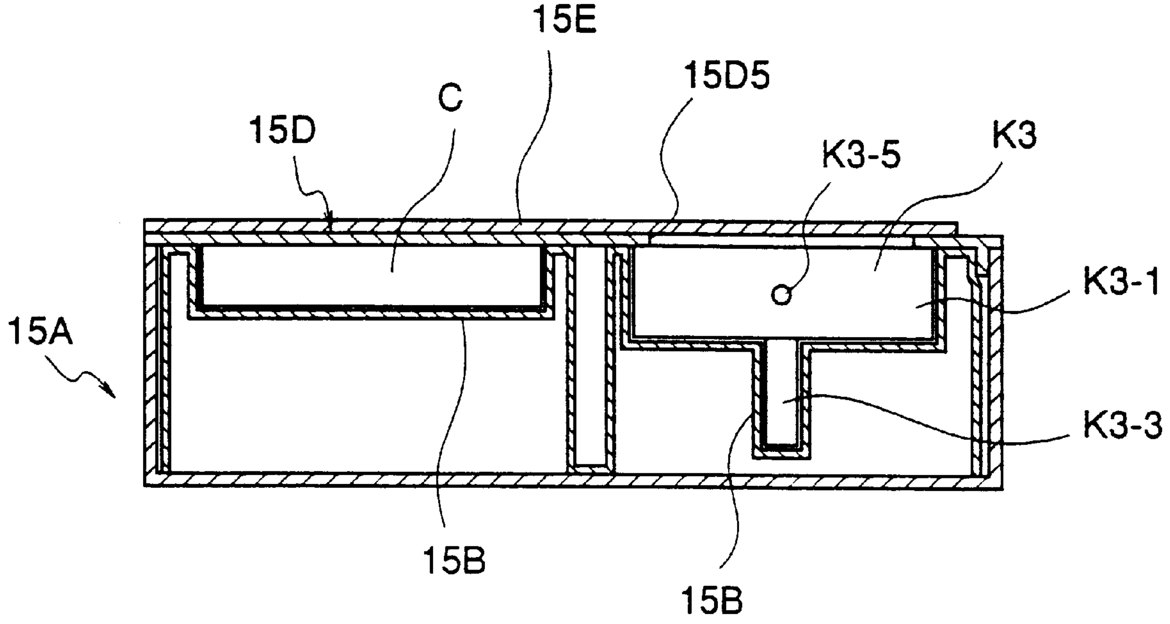
FIG. 23 is a sectional view along line XXIa—XXIa of FIG. 22.
Figure 24:
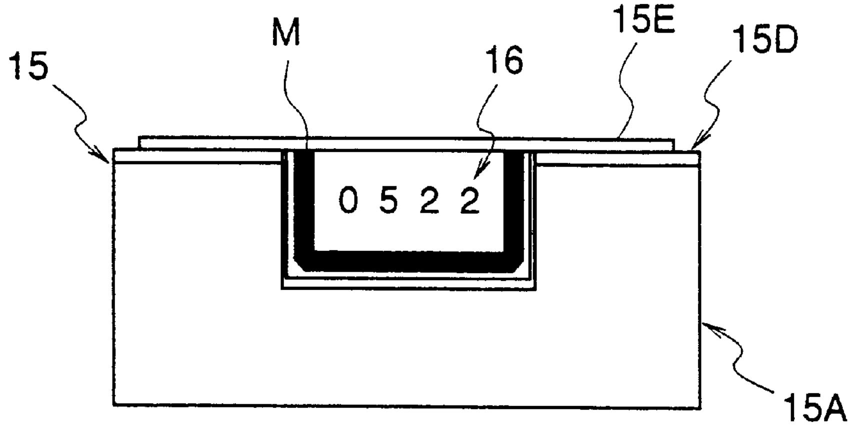
FIG. 24 is a diagram taken in the direction of the arrow XXIb of FIG. 22.

FIGS. 22 to 24 show a state where a stamp K3 and a cap C are stored in a package 15; FIG. 22 is a plan view illustrating a stamp K3 and a cap C being stored in a package 15; FIG. 23 is a sectional view along line XXIa—XXIa of FIG. 22; and FIG. 24 is a diagram taken in the direction of the arrow XXIb of FIG. 22.

Referring to FIGS. 22 and 24, in a package 15, a stamp K3 is disposed so that a stamp face K3-2 to which laser beam machining is performed is opposed to a laser beams introduction port 15D5, and a cap C is disposed at a side surface (the left side in FIGS. 22 and 24).

Referring to FIG. 23, since a stamp K3 and a cap C are in complicated shape, both are stored in a package 15 with the stamp K3 and the cap C set in a package 15B that seems to have a recess when viewed from an overhead. This enables to prevent misalignment between the stamp face K3-2 to be subjected to laser beam machining, and the laser beam introduction port 15D5, when a package 15 is conveyed or discharged from a stocker 300. This solves a problem that laser beam machining cannot be conducted for a predetermined laser beam machining region. In addition, only by a suitable design change of a recess in the package 15B, the package 15 can store any article of different external form, without modifying the external form of the package 15.

The package 15B is preferably prepared from a porous material, such as sponge, in order to prevent an article from being damaged.

Referring to FIGS. 22 and 23, after a stamp K3 and a cap C are stored in a package 15, a bottom 15A and a lid 5D are sealed with a seal 16. That is, the seal 16 is attached so as to extend over both the bottom 15A and the lid 5D. The seal 16 is obtained by deposing a carbonaceous conductive material in the form of a thin film, on a surface of a relatively breakable resin or paper sheet. A pattern made of a thin film that differs depending on the type of an article is provided on a surface of the seal 16. Such a pattern corresponds to a mark M as previously described.

Referring to FIG. 22, after a bottom 15A and a lid 5D are sealed with a seal 16, the laser beams introduction port 15D5 is closed, and, a coating seal 15E is attached so as to cover the seal 16. The coating seal 15E is peeled off when a package 15 is set to a tray 5. On the package 15, there is clearly shown, for example, "Please peel off a coating seal 15E when setting a package 15 to a tray 5." Similar instructions is also displayed on a display 26. It is necessary to stop a mark detection sensor 122 from reading a seal 16 when a user sets a package 15 to a tray 5 without peeling off a coating seal 15E. In order to prohibit laser beam machining with a coating seal 15E attached to a package 15, a preferred material for a coating seal 15E is non-conductivity one.

Figure 25:
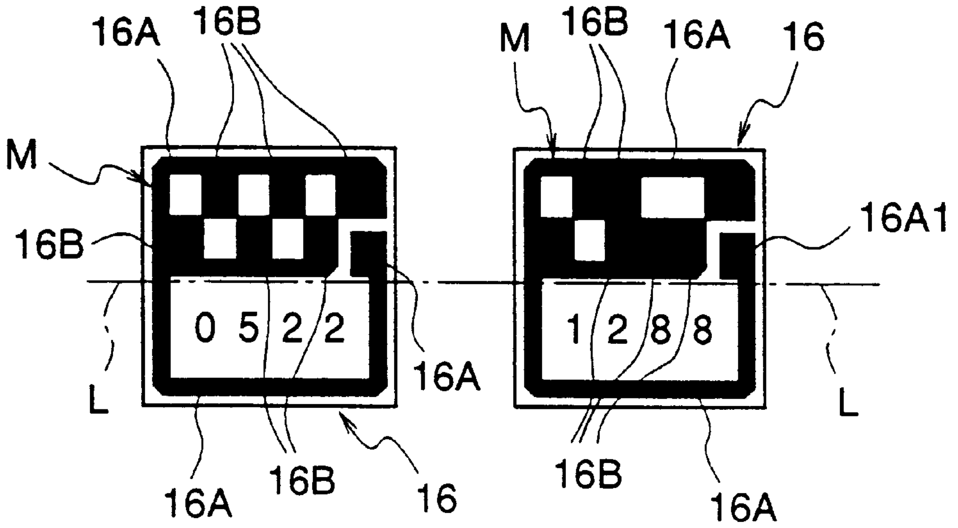
FIGS. 25(*a*) and 25(*b*) are a plan view showing a thin film pattern of a seal.

FIGS. 25(*a*) and 25(*b*) are a plan view showing a thin film pattern of a seal 16.

Referring to FIGS. 25(*a*) and 25(*b*), a thin film pattern of a seal 16 comprises (i) common patterns 16A serving as a basic pattern, being in the form of an approximately E-shaped, and (ii) supplementary patterns 16B being successively formed in a proper place of the common patterns 16A. The common patterns 16A are disposed so that, at the time of reading, a common probe P1 (see FIG. 28) of a mark detection sensor 122 always continues. The supplementary patterns 16B are disposed so that, at the time of reading, a probe of a mark detection sensor 122 that contacts, through supplementary patterns 16B, a region where the supplementary patterns 16B are formed, continues to the common patterns 16A. A reference numeral 16A1 designates an electrode pad with which a common probe P1 contacts, and L designates a bent-up line for attaching a seal 16 so as to extend over both a bottom 15A and a lid 15D.

Figure 26:
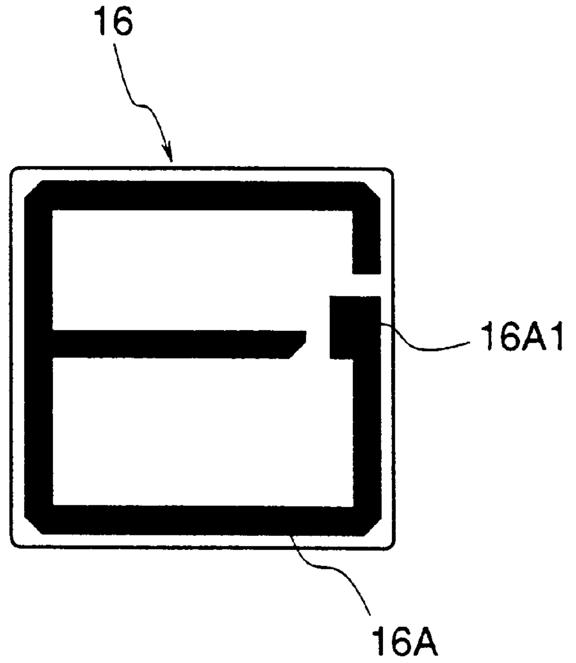
FIG. 26 is a plan view illustrating a structure of a thin film pattern of a seal where no supplementary pattern formed.

Since the supplementary patterns 16B are successively provided on proper places of the common patterns 16A, as shown in FIG. 26, sometimes a thin film patters of a seal 16 has no supplementary pattern 16B. In this case, a probe corresponding to a region where supplementary patterns 16B are formed, does not continue to a common pattern 16A.

Figure 27:
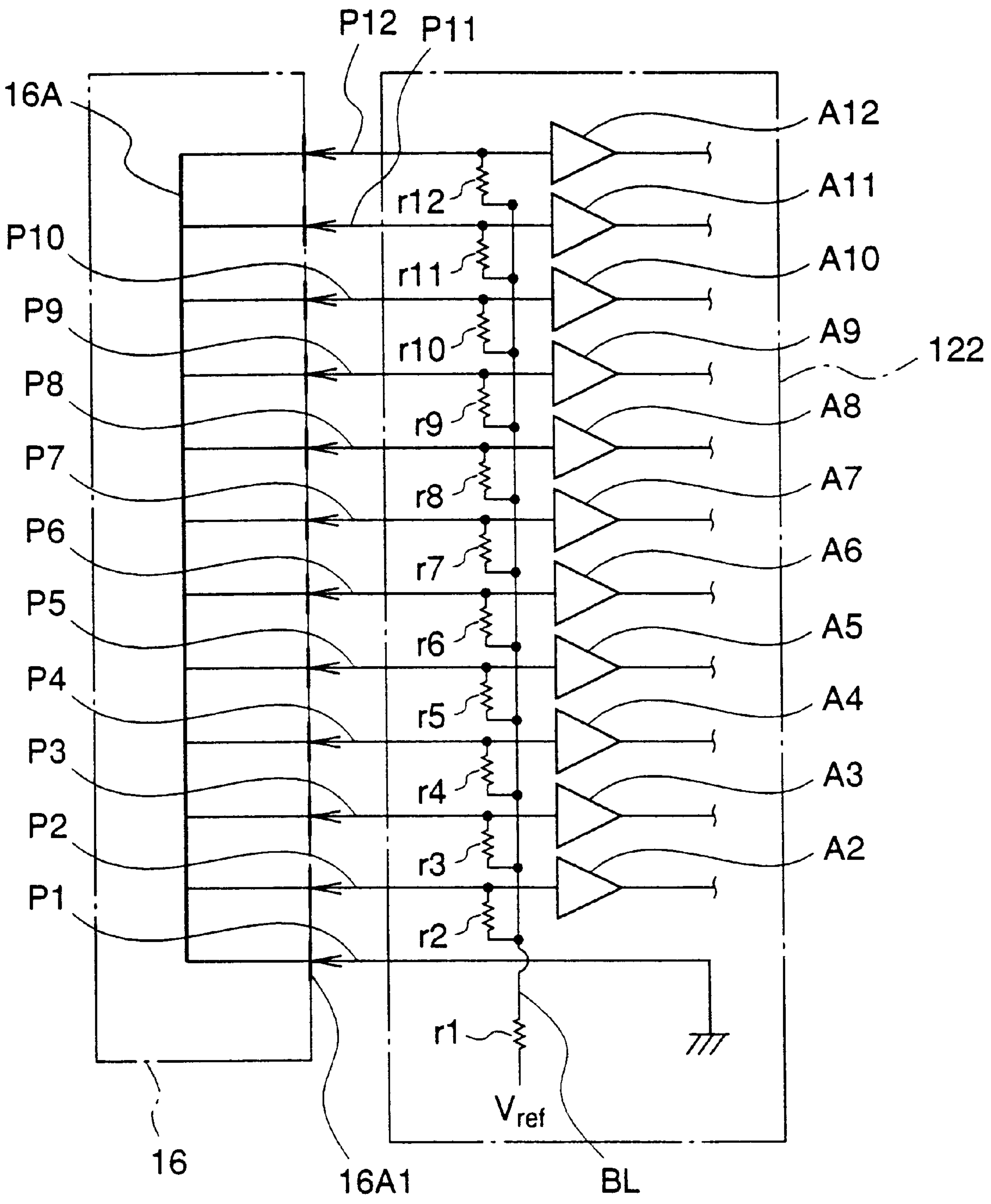
FIG. 27 is a circuit diagram illustrating a structure of a mark detection sensor in brief.

FIG. 27 is a circuit diagram illustrating a structure of a mark detection sensor 122 in brief.

Referring to FIG. 27, a mark detection sensor 122 is a conventional one, and comprises a common probe P1 and probes P2 to P12 which contact with a seal 16, and amplifiers A2 to A12 that amplify electric power from each of the probes P2 to P12. A common probe A1 is grounded. The probes P2 to P12 are connected to input terminals of the amplifiers A2 to A12, respectively, and also connected to a reference voltage line BL connected to a reference voltage source (not shown) through a resistor r1. Reference numerals r2 to r12 designate pull-up resistors. One end of each pull-up resistor is connected to each of the probes P2 to P12, and the other end is connected to the reference voltage line BL.

The mark detection sensor 122 is disposed so as to correspond to a laser beam machining position, as shown in FIG. 9. From an overhead, the common probe P1 and probes P2 to P12 are brought into contact with a mark M, to read the mark M.

Figure 28:
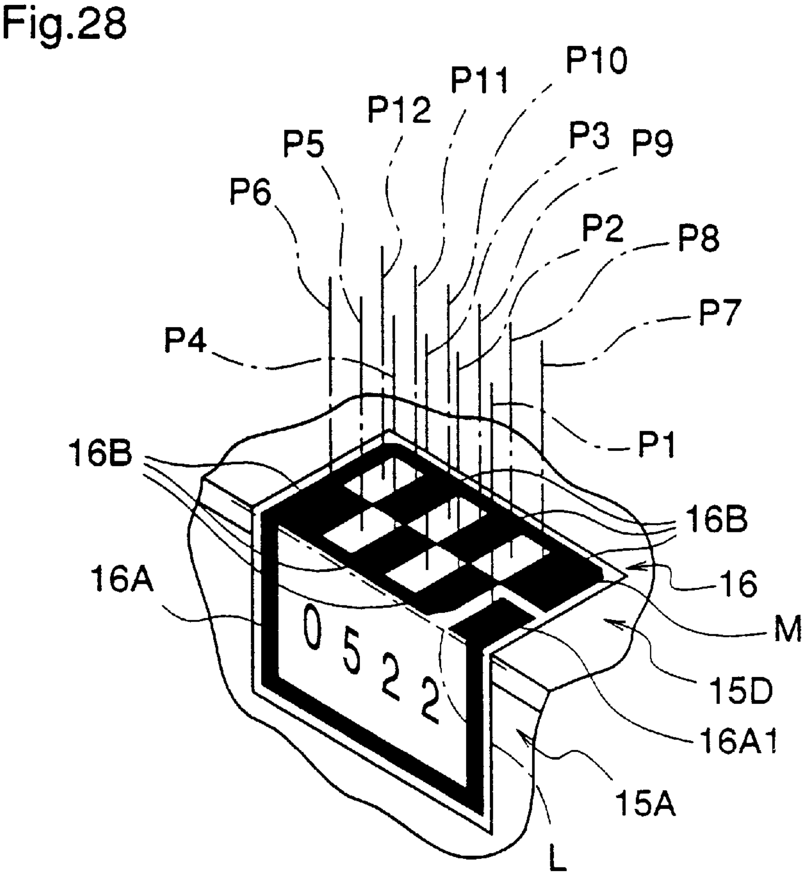
FIG. 28 is a diagram for explaining a state where a mark detection sensor is reading a mark.

FIG. 28 is a diagram for explaining a state where a mark detection sensor 122 is reading a mark M.

Referring to FIG. 28, a package 15 is sealed by bending a seal 16 at a bent-up line L (shown by alternate long and short dash line) and then attaching the seal 16 over both a bottom 15A and a lid 15D. In this state, the common probe P1 and probes P2 to P12 of a mark detection sensor 122 are brought into contact with a mark M (a seal 16), so that a common probe P1 continues to a common pattern 16A, and probes corresponding to a region where common patterns 16B are formed continues to the common pattern 16A. Information (11 bits in total) on an article in a package 15 are read depending on which probe is in a continuity state, in addition to a common probe P1. When, in order to open a lid 15D, a seal 16 is broken to unpack a package 15, a common pattern 16A is divided by, for example, a bent-up line L. This results in discontinuity between the common probe P1 and the common pattern 16A. It is thus able to check whether a lid 15D is opened or not. That is, the aforesaid mark detection sensor 122 also functions to detect whether a seal 16 is opened or not.

A variety of information on an article can be read by the mark detection sensor 122. Examples of the information are shown in the following Table 1.

TABLE 1

| Contents | Number of bit | Number of data |
|---|---|---|
| Negative or positive | 1 bit | 2 |
| Laser output | 2 bits | 4 |
| Pattern and its size | 3 bits | 8 |
| Laser beam machining position | 5 bits | 32 |

The information arrangement as shown in Table 1 is a mere example. These information can be used valuably, as follows:

(A) Negative/positive information of 1 bit enables to select a way of laser beam machining. For example, when machining an identical character information, portion of the character or portion excluding the character is hollowed by laser beams.

(B) When performing laser beam machining to a stamp having a stamp face which comprises a sponge containing ink and a resin sheet that evaporates the ink, disposed on the sponge, a plurality of fine holes are provided in a region corresponding to a character. When performing laser beam machining to a stamp having a stamp face which comprises a a sponge containing ink and a resin layer including a plurality of fine holes, disposed on the sponge, laser beams are applied to melt a resin layer surrounding the fine holes where no character is formed. It is thus able to perform laser beam machining according to the type of an article.

(C) In this embodiment, a laser oscillation unit 121 can oscillates laser beam power in a range of 0 W to 10 W, to an article. However, laser beam power range suitable to laser beam processing differs depending on the material of an article. For example, the range of 0 W to 5 W is suitable for an article, and the range of 0 W to 10 W is suitable for another article. Therefore, in this embodiment, 2 bits are assigned to "laser beam power" so that laser beam processing has four types of laser beam power ranges. Control means 20 performs laser beam machining within a laser beam power range suitable for the material of an article (e.g., by assigning a predetermined gray levels, such as 256 gray levels), based on information obtained by reading a mark M.

(D) As information on laser beam machining, it is able to contain shape information of a laser beam introduction port 15D5 (a rectangle in this embodiment), and size information of a laser beam introduction port 15D5, and machining position information for calculating a machining position (a machining center in this embodiment), and the like.

In the structure of the package 15 as described, since a lid 15D is removable, it may occur that a lid 15D is forced to open from a side opposite to a side to which a seal 16 is attached, without peeling off a seal 16, and an article in a bottom 15A is taken out to exchange it with another article. Preferably, another seal 16 is attached to a side opposite to a side where a seal 16 is attached so that a package 15 is sealed by bidirectional sealing. In addition, it is preferable to stop laser beam machining when detected either seal 16 is broken.

To avoid an exchange of an article, a seal 16 having a transparent electrode may be used in place of a seal 16 of a carbonaceous conductive material as described. It does not seem that a seal 16 with a mark is attached to a package 15, and therefore, a user is unconscious of the seal 16. A transparent electrode is made from an oxide of indium and tin, for example, and can be prepared by screen printing of an indium tin oxide (ITO) that is often employed in liquid crystal technique.

Figure 29:
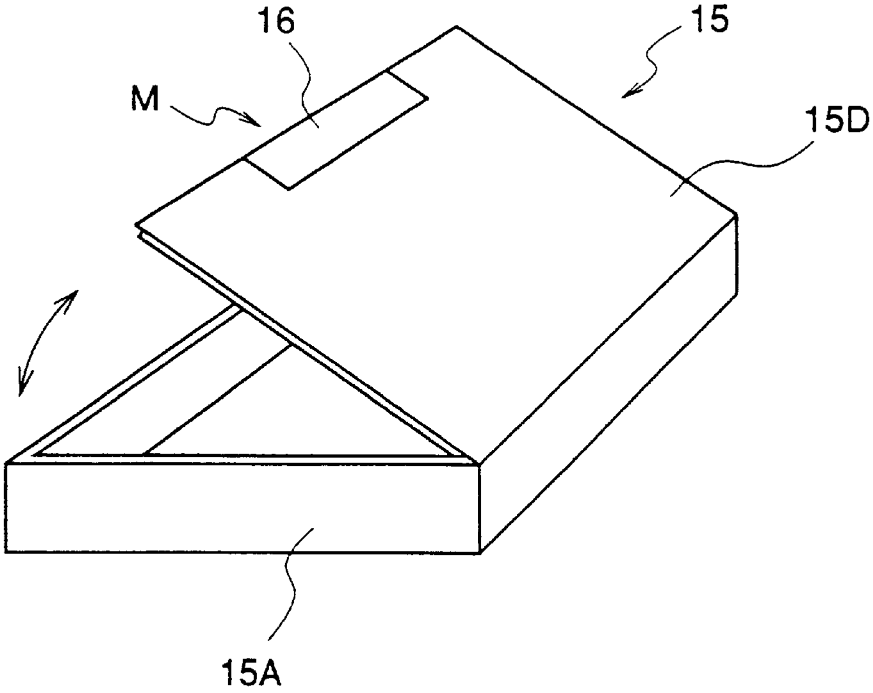
FIG. 29 is a perspective view illustrating a structure of a modified package.

As another preferred structure, as shown in FIG. 29, a lid 15D is formed in a plane plate, a side opposite to a side to which a seal 16 is attached is integrally formed with a bottom 15A, and a broken line or the like is formed on the boundary between the lid 15D and the bottom 15A so that the lid 15D is easy to open and close up and down.

Figure 30:
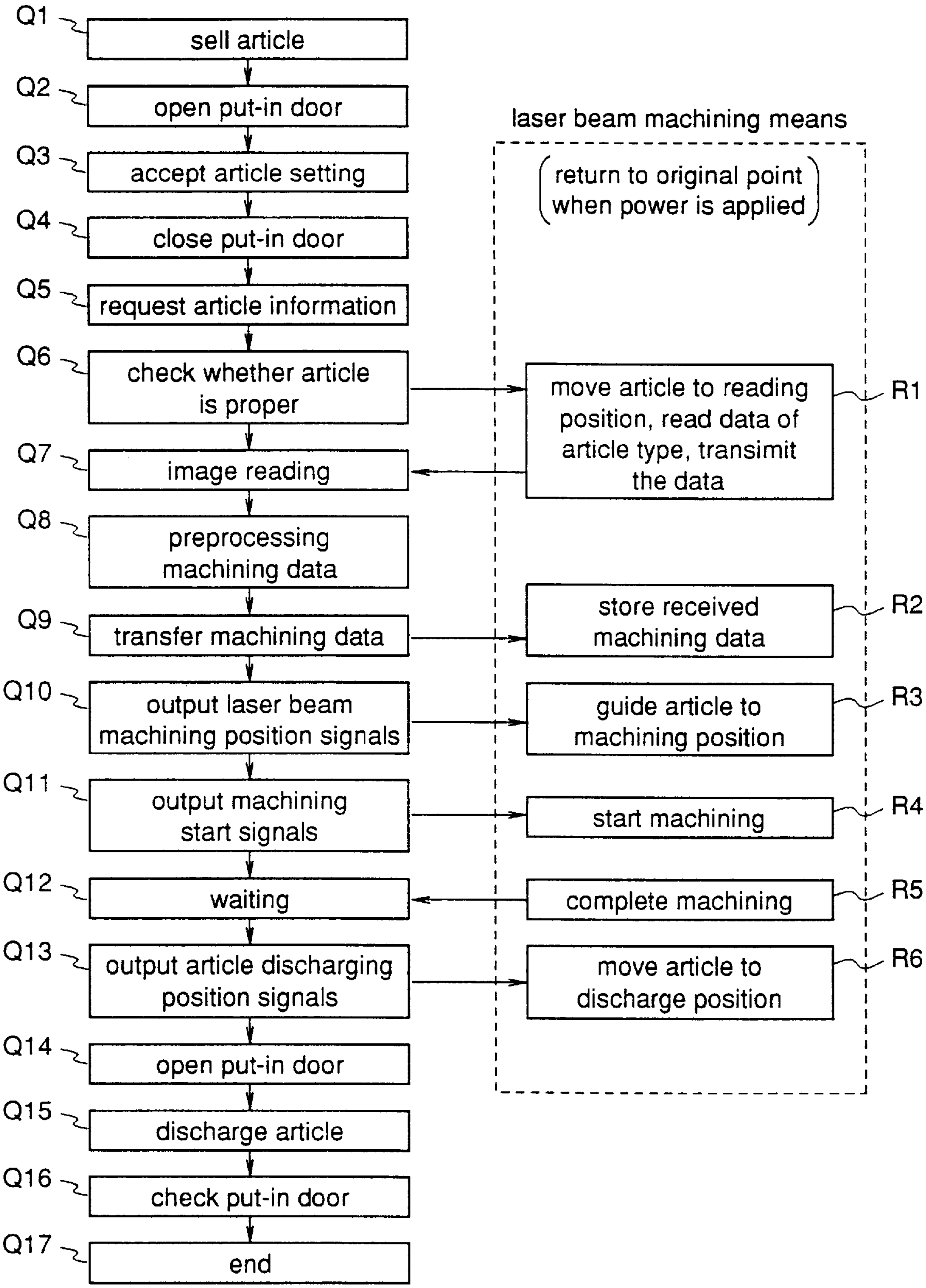
FIG. 30 is a flow chart showing a control flow of an automatic vending machine to which an automatic laser beam machining apparatus is applied.

FIG. 30 is a flow chart showing a control flow of an automatic vending machine to which an automatic laser beam machining apparatus is applied.

Referring to FIG. 30, when a coin selector 2 detects that a coin for a predetermined fare is slotted from a coin slot 2B, control means 20 allows selection buttons 21 to be operated by a user. The user selects a desired article from samples in a sample case 7, based on instructions of a display 26, or voice instructions.

After selecting a desired article, the selected article is sold (Step Q1). Specifically, when a desired article is selected from five samples S1 to S5 by that a user pushes one of the buttons 21, control means 20 instructs a stocker 300 to discharge the selected article according to the instruction. The stocker 300 discharges the selected article. The discharged article is then delivered to the vicinity of a discharge port 8B through a chute 8. The user opens a window 8A to take out the article from the discharge port 8B.

In this embodiment, an article is contained in a package 15 and the package is stored in a stocker 300. The article keeps in the package 15 throughout its laser beam machining after discharging from the stocker 300 and its discharging after the laser beam machining.

Although laser beam machining is performed with an article contained in a package 15, an article may be subjected to laser beam machining with the article set on a tray 5 without containing in a package 15. For setting an article directly to a tray 5, however, it is necessary to employ a proper fixing method in order to correspond to difference in shape between articles. In a proper fixing method, plural trays 5 having a recess are prepared for plural articles. The shape of a recess differs depending on the shape of an article. There is selected a tray 5 having a recess corresponding to the shape of a selected article, and the selected article is then fit in the recess of the selected tray 5.

In this embodiment, however, the shape of a package 15 is equalized, requiring no fixing method. That is, a fitting recess 5A for fitting a package 15 to a tray 5 is provided, and a package 15 has a special structure. These lead to satisfactory laser beam machining, irrespective of the shape of an article. A package 15 includes a package 15B in the form of a recess as previously described. An article is firstly contained in the package 15B and then contained in the package 15.

In place of a package 15B, a plurality of projections or the like may be provided according to the shape of an article, in a region of a bottom 15A where an article is stored, so that the article is scrammed and fixed by the projections.

When the operation of vending an article is terminated, note on machining of an article discharged from a stocker 300 by laser beam machining means 100 is explained by instructions on a display 26 or voice instructions. After a predetermined time given to a user for checking the note, the user is required to open a put-in door 104 by instruction on the display 26 or voice instructions. This is because laser beam machining utilizing laser beam machining means 100 is dangerous compared with printing machining utilizing a conventional video printer.

Next, the user opens the door 104 to input an article in the laser beam machining means 100 (Step Q2). That is, the user opens the door 104 according to the instructions on the display 26.

When the door 104 is opened, the control means 20 a message saying that setting of an article is accepted is displayed on a display 26 (Step Q3).

The user sets the article being contained in a package 15 to a tray 5, according to the instruction on the display 26, and then closes the door 104 (Step Q4).

For a safer handling, an electronic lock 105 for locking a put-in door 104 is provided in this embodiment. When a user opens the door 104 while holding a handle 104A, to set an article to a tray 5, an open/close detection sensor 106 checks whether the door 104 is closed. When the close of the door 104 is checked, control means 20 instructs to lock the door 104. Hard a user may press selection buttons 21 after locking the door 104, the electronic lock 105 is designed not to be released until laser beam machining is completed.

A state where the package 15 is set to the tray 5 is detected by a setting sensor (not shown), which is provided on the tray 5 and is electrically connected to the control means 20. By the setting sensor, the control means 20 can check whether the package 15 is set in a predetermined state. When confirmed the package 15 is in a predetermined state, the display 26 displays a message to lock the door 104. When the control means 20 confirms the user closes the door 104, the door 104 is locked by an electronic lock 105.

On the other hand, if not confirmed that the package 15 is in a predetermined state, in order to prevent the door 104 from being locked by the electronic lock 105, the control means 20 instructs the display 26 to display a message saying "Article K is in poor setting, please reset it", whereby a user is required to reset the article.

When a series of operations for closing the door 104 is terminated, the control means 20 outputs singles to request information on the article, to the laser beam machining means 100 (Step Q5). The aforesaid signals are input to an input/output port 113 and transferred to a CPU 111. Upon the signals, the CPU 111 outputs instruction signals to the input/output port 113 for guiding a package 15 containing an article to a laser beam machining position, by using a loader 130. After the instruction signals are input to the port 113 and then transferred to the CPU 111 through a bus 114. Upon this signals, the CPU 111 gives necessary instruction signals to a controller 112. Based on such signals from the controller 111, the controller 112 controls pulse motors 131, 132 of the loader 130.

Contents of the instructions given to the controller 112 by the CPU 111, include information on velocity, acceleration, and move distance, with which a series of controls are carried out. For example, the CPU 111 instructs the controller 112 to move the package 15 in a predetermined velocity up to a certain distance. When the movement is terminated, the controller 112 outputs termination signals to the CPU 111 and then waits the next instruction.

When information on an article is required, in the laser beam machining means 100, an article is moved to a reading position to read a mark M, so that information of the type of an article is transmitted (Step R1). Specifically, a package 15 is guided to a reading position. When the package 15 is guided to a laser beam machining position, a mark detection sensor 122 detects a mark M, i.e., a seal 16 on the package 15, to acquire information on an article contained in the package 15. The information is then transferred to control means 20 through an input/output port 113.

The mark detection sensor 122 also functions to detect whether a package 15 is opened or not, as well as reading of a mark M, as previously described. Examples of information on an article that is obtained from a mark M, include material of an article, laser beam machining region and shape, machining center coordinate, and the state of a package 15 (i.e., opened or closed).

Upon receipt of information on an article, the control means 20 checks whether the article is a proper one or not, based on the state of a package 15 (Step Q6). When the mark detection sensor 122 confirms the package 15 is opened, it is determined the article is improper.

Thus, in this embodiment, whether an article is proper or not depends on the state of a package 15. As another method, article shape data are previously stored, and a sensor detects the shape of an article. If data of the shape of an article corresponds to a stored data, it is decided the article is proper.

When confirmed an article is proper, the control means 20 starts image reading (Step Q7). Image reading comprises taking an image of a user's face by a video camera 25 to obtain information, and writing the information into a flame memory as image data. In this embodiment, a special half mirror 13 as shown in FIG. 1 is employed, and an image taken by the video camera 25 is synthesized with a foreground video previously prepared. Such synthesis method is disclosed in Japanese Patent Application Nos. 8-332635 (1996), and 9-74315 (1997). The half mirror 13 is disclosed in *IEICE TRANS COMMUN.*, VOL.E77-B. No.2 February 1994 PP226–231.

The half mirror 13 is disposed between a user and a display 26, in parallel with the display 26. The display 26 is visible to a user.

Figure 31:
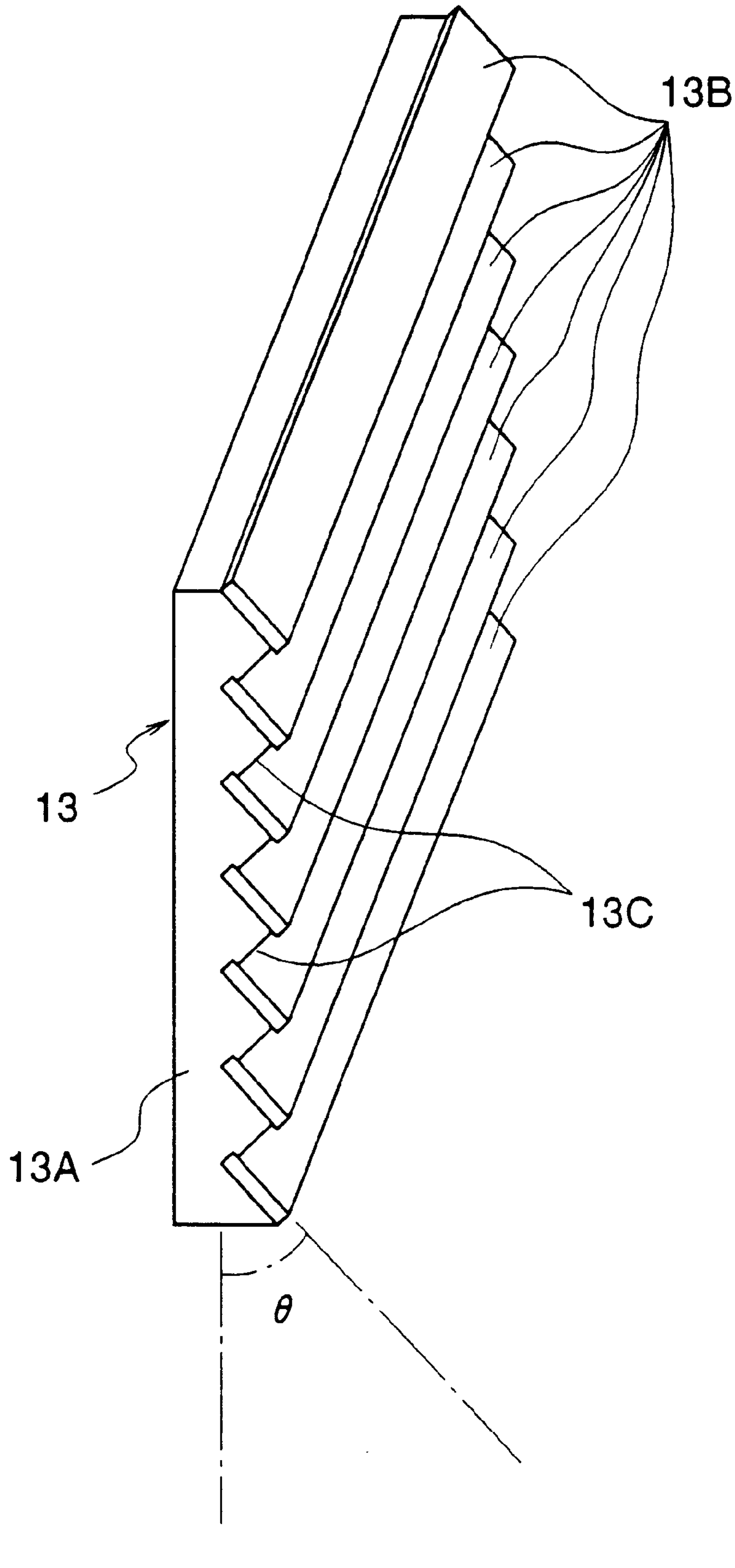
FIG. 31 is an enlarged perspective view of a half mirror.

FIG. 31 is an enlarged perspective view of a half mirror 13. The half mirror 13 includes a base 13A comprising a transparent resin or glass, and a plurality of half mirror pieces 13B which are disposed stepwise on surfaces 13C of the base 13A so as to have a predetermined inclination θ against a video camera 25. The half mirrors 13B are in long rectangle. Therefore, the image of a user is reflected from the half mirror pieces 13B and then taken by the video camera 25. On the other hand, the user recognizes an image displayed on a display 26, through surfaces 13C where no half mirror piece 13B is formed.

Surfaces of the half mirror 13 in the form of steps may be coated with a transparent material to smooth the surfaces.

Since the half mirror 13 comprises a plurality of half mirror pieces 13B disposed stepwise as described, dust and the like are liable to collect there. To prevent dust and the like from attaching to the half mirror 13, a protection board PB is interposed between a user and the half mirror 13. The protection board PB is composed of a transparent material, such as glass or acrylic resin. Between the protection board PB and the half mirror 13, the video camera 25 is disposed as shown in FIG. 1.

When the protection board PB is parallel to the display 26, it is liable that an image of a user is mirrored on the protection board PB and the mirrored image is overlapped with an image on the display 26. To avoid this, the protection board PB is disposed diagonally from the display 26. This displacement is advantageous in a case where a display 26 is prepared from material having limits of brightness, such as liquid crystal.

Figure 32:
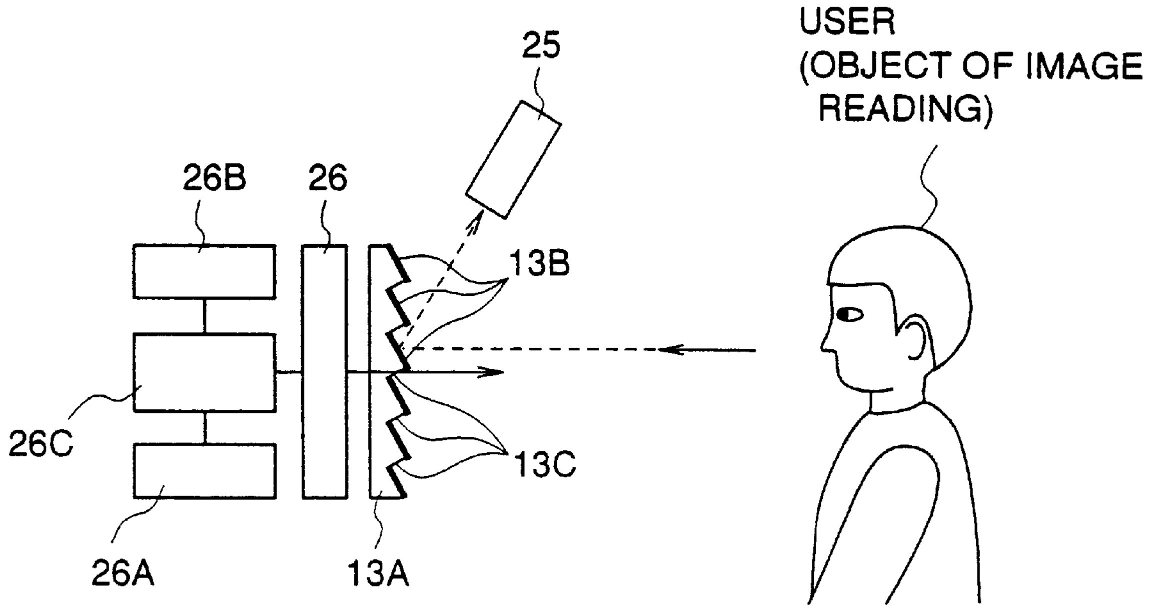
FIG. 32 is a diagram for explaining inputting an image.

FIG. 32 is a diagram for explaining image reading.

Referring to FIG. 32, at the stage of image reading (Step Q7), synthesis means 26C reads a variety of foreground information from a memory 26A and the read information are respectively displayed on a display 26 as a contraction foreground. At the same time, control means 20 instructs a user to select one from the displayed foregrounds, with voice and the like. After the user selects a preferred foreground using operation buttons 27, the selected foreground is displayed on the display 26 in picture plane.

Then, an image of the user is taken by the video camera 25. That is, an image of the user is reflected from the half mirror pieces 13B interposed between the user and the display 26, and is taken by the video camera 25. The image is stored in a frame memory 26B. Synthesis means 26C synthesizes the image in the frame memory 26B and the selected foreground. The image thus synthesized is displayed on the display 26 while it is checked by the user through the surface 13C of the half mirror pieces 13B. The control means 20 instructs the display 26 to display the synthesis image, while requiring, with voice, the user's agreement to the synthesis image. If agreed, the user fixes the synthesis image by the operation button 27 and an operation lever 27A, thereby terminating the image reading.

Referring again to FIG. 30, after the image reading, the control means 20 performs preprocessing of machining data based on image data stored in the frame memory 26B and information read from the mark M (Step Q8). In the preprocessing, the control means 20 calculates, based on information read from a mark M, which laser beam power range, and which graduation is suitable for image reproduction when expressing brightness and contrast of image data on an article. The reason why laser beam power range and graduation differ depending on the material of an article, is as follows.

Specifically, provided there is employed a laser oscillation unit 121 capable of changing laser beam power in a range of 0 W to 10 W. For an article made of wood, when image information is expressed on a surface of the wood in relatively high laser beam power range, the image seems to have an identical graduation, failing to express satisfactory contrast. Hence, the preprocessing is to determine how image data taken by the video camera 25 is reproduced within laser beam power range (gradation regions) permissible in the material of an article. When employed self-isolating laser beam machining means, it is preferable to have such preprocessing function.

If image data comprising pixels of very dark color is expressed on a wood, without preprocessing, sometimes the resultant is so black that the expressed image cannot be distinguished. It is thus required to adjust laser intensity according to machining difficulty, by preprocessing of data. For this, it is useful to divide a predetermined power range for a laser beam machining region by for example 256 graduations, and to provide contrast per dot. This method enables to provide contrast by changing laser beam power. As a result, it is able to express brightness on an article made of, such as leather or wood.

The aforesaid method, however, cannot be employed for an article made of material to which no contrast is provided even with the change of laser beam power (e.g., acrylic plate). In that case, it is preferable to convert color image data into monochromator gradation mode and then to convert into electric data capable of expressing contrast by employing dither method. The aforesaid conversions are attained by "PHOTOSHOP 4.0J" available from Adobe System Incorporated, 345 Park Avenue San Jose, Calif. 95110-2704 U.S.A.

Image reading as described is not limited to one where information taken by a video camera 25 is temporarily stored in a frame memory as image information. A user may store image taken by a video camera or the like, into a floppy disk or the like. Based on the stored information, an image can be reproduced on an article. Furthermore, a character input device for inputting character image information may be provided in order to reproduce such information to an article.

When the preprocessing is terminated, the control means 20 transfers machining data to a laser machining means 100 (Step Q9).

In the aforesaid preprocessing, it is possible to provide a mark M with laser beam machining data of an article. This is, however, unpractical because a mark M of this embodiment has its limit of storing information. Therefore, it is preferable to replace a mark M with, for example, a magnetic tape to provide a great amount of information. If laser beam machining is performed to articles whose type and material are previously determined, no mark M is required. Specifically, in a mark M, there are directly or indirectly described laser beam machining information of an article and, based on that information, the article is subjected to laser beam machining.

Although in the aforesaid mark M, direct laser beam machining information are described, it is possible to describe a serial number of an article as indirect machining condition. In that case, it is necessary to prepare detailed machining information corresponding to the serial number, in laser beam machining means 100. Such detailed information are stored in, for example, RAM, a replaceable CD-ROM and the like. Thus, a structure where concrete machining information and a serial number as machining condition are stored in the laser beam machining means 100 and an article, respectively, allows to replace machining information with improved machining information.

The laser beam machining means 100 receives the machining data from the control means 20 and stores the received data (Step R2). That is, the machining data are stores in a memory (not shown) or a CPU 111 through an input/output port 113.

The control means 20 then instructs the laser beam machining means 100 to move an article to a laser beam machining position (Step Q10). The means 100 moves a tray 5 in the directions of X and Z axes by guide means, to guide a package 15 containing an article up to its machining position (Step R3).

Next, the control means 20 instructs the laser beam machining means 100 to start laser beam machining (Step Q11). Based on the stored machining data, the CPU 111 instructs a controller 112 to move a laser beam machining head 123 to a machining position, through a bus 114, and also instructs an oscillation unit 121 to start laser beams oscillation (Step R4). The controller 112 drives a pulse motor 126 that is driving source for moving the head 123 of an XY table 125 in the direction of X axis, and a pulse motor 127 that is driving source for moving the head 123 in the direction of Y axis, thereby performing a movement according to machining data.

The laser oscillation unit 121 applies laser beams to an article K in synchronization with a move of the laser beam machining head 123. The instruction to start laser beams application is performed by pulse signals. Data per pulse include data of energy amount per laser beam application and its application time.

Movement of the laser beam machining head 123 by the controller 112 and the laser beam application from the laser oscillation unit 121 are controlled by the CPU 111 so as to cooperate with each other. Although a pulse laser is used in this embodiment, a known modulation laser may be used.

After the laser beam machining is terminated, the CPU 111 outputs termination signals to the control means 20 (Step R5). The control means 20 keeps being in stand-by until receipt of the termination signals, i.e., the termination of laser beam machining (Step Q12). During that time, a user is able to observe a state where an article is being machining through an observation window 101, thereby preventing the user from being bored. Leak of laser beams occurred when a user observes a machining state is liable to affect the user's eyes. Therefore, the observation window 101 is preferably prepared from a material capable of absorbing laser beams, so that the window 101 functions as a laser shielding plate that prevents laser beams from leaking the outside.

When received the termination signals, the control means 20 instructs the laser machining means 100 to move an article to a discharge position (Step Q13). Then, the means 100 moves a tray 5 to the discharge position, with a package 15 containing the article set on the tray 5, under the same controls as in moving the tray 5 to a laser machining position when required information on an article (Step R6).

After the article moves to the discharge position, the user is instructed, by the display 26 and voice, to take out the article. The user opens the put-in door 104 (Step Q14) and takes out the article given laser beam machining, from the tray 5 (Step Q15). Then, the setting sensor as described checks whether the user takes out the article from the tray 5 (step Q16).

When confirmed the door 104 is closed, the control means 20 completes operations of laser beam machining (Step Q17). Thereafter, the control means 20 locks the window 104 with an electronic lock 105.

This embodiment has the following effects:

(A) Safe laser beam machining is performed without a skilled operator, and a user is not required to set an article to a laser beam machining position.

(B) When a tray 5 is guided to a laser beam machining position, the tray 5 is positioned in the directions of X, Y and Z axes, making it possible to efficiently applying laser beams narrowed by a lens 123A.

(C) It is able to perform laser beam machining for reproducing image taken by a video camera 25.

(D) It is detectable whether a package 15 is opened or not. This prevents a user from exchanging an article in a package 15 with another to execute its laser beam machining, avoiding an occurrence of fire due to an exchange of the content of a package 15.

(E) A laser beam introduction port 15D1 is provided on a surface of a package 15 so that laser beams are introduced into a package 15 through the port 15. Even when a package 15 is made of a material absorbing laser beams, laser beam machining is performed over the package 15. This is because when performing laser beam machining through a package 15, without forming a laser beams introduction port 15D on a package 15, the package 15 should be made from a special material that resists to absorb laser beams, thus lowering the degree of design.

(F) A coating seal 15E covers a seal 16. This prevents a problem that dusts and the like enter from a laser beams introduction port 15D1, resulting in unsteady laser beam machining. This also prevents a seal 16 being peeled off instead of a coating seal 15E.

(G) A mark M attached to a package 15 contains information on laser beam) machining of an article. Even when changed the type of an article to be contained in a package 15, all required is to change a mark M. In addition, the size of laser beam machining region is readily altered by changing information on a mark M.

(H) When a predetermined fare is slotted by a user, an article is sold, and machining conditions for the article is extracted by reading information described in a mark M attached to the article, with a sensor 122. From image prepared by a user, or image data (e.g., character), machining data is prepared by referring to the extracted machining conditions, and laser beams are applied to the article based on the machining data. Therefore, even when changed the material of an article or machining conditions (e.g., shape), all required is to change a mark M. Since machining conditions are extracted by reading a mark M, complicated input operation that bothers a user can be omitted. In addition, machining data of image information to be expressed on an article are created by referring to machining conditions. Therefore, machining is performed with machining data suitable to an article. For example, for an article to which laser beams of low power should be applied, otherwise fire may occur, laser machining data are created within an allowable power range. On the other hand, for an article that requires high power laser beams, laser machining data are created with a required power range.

(I) After an article is sold by that a user slots a coin for a predetermined fare, note in laser beam machining, or an operation method is displayed in a display before staring the machining. After a user's input operation for checking the displayed contents, laser beam machining to the article is started. That is, unless a user confirms the note or operation method, laser beam machining is not performed, leading to safe laser beam machining.

(J) An article is packed in a package 15 comprising a bottom 15A, a lid 15D, and a seal 16 that extends over the sealing the bottom 15A and the lid 15D. In a state where the package 15 is sealed with the seal 16, a pattern in the form of a thin film of conductive material is provided on a surface of the seal 16. Before laser beam machining, it is detected whether the package 15 (the lid 15D) is opened or not, based on the state of continuity between a region of the pattern located in the bottom 15A and a region of the pattern located in the lid 15D. When detected the package 15 is opened, laser beam machining is not performed. Thus, it is able to prevent a user from exchanging an article in the package 15 with another to perform its laser beam machining. It is rare that machining conditions of an article originally packed in the package 15 and that of an exchanged article are identical. Disagreement in conditions may cause fire and the like. The detection of the package 15 as described enables to avoid various problems caused by a user's mishandling.

(K) After selling an article, a user opens a put-in door 104 of an automatic vending machine, and put the article in the machine. After the user closes the door 104, it is detected whether the door 104 is closed or not by a sensor 106. When confirmed the close of the door 104, the door 104 is locked. At least during laser beam machining, the door 104 cannot be opened. This prevents a user from opening the door 104 and putting the hand therein, or delivering something up to laser beams path, during laser beam machining, due to the user's interests in laser beams.

(L) When detected a package 15 is opened by checking the continuity of a pattern, laser beam machining is not performed. In cases where a user's operation is improper (e.g., when a put-in door 104 is not completely closed), such improper operation is displayed on a display to draw notice to a user. According, a user becomes aware why laser beam machining is not performed, and it is able to require a user to correct improper operation.

Embodiment 2

Figure 33:
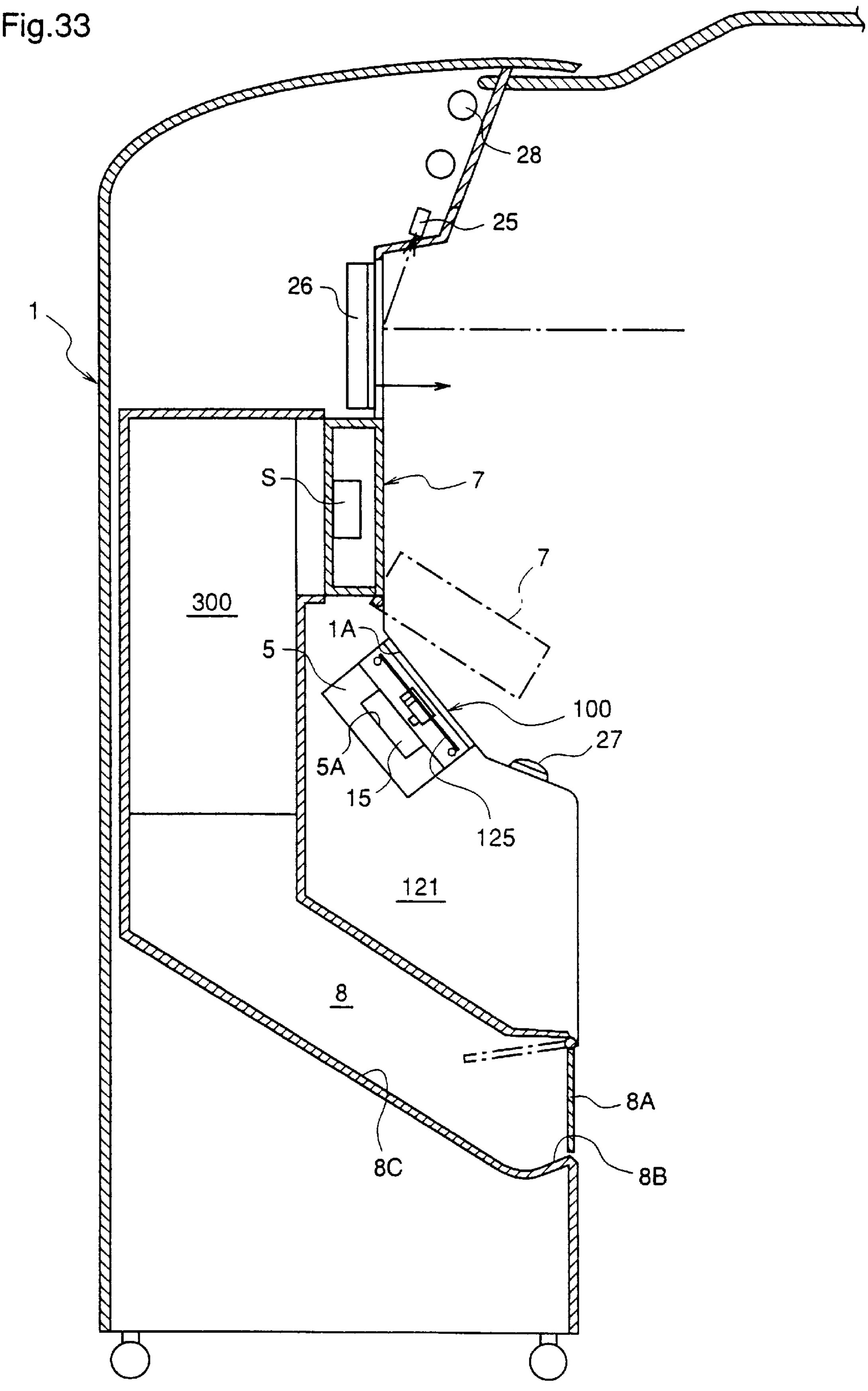
FIG. 33 is a diagram illustrating an internal automatic vending machine to which an automatic laser beam machining machine according to an embodiment 2 of the present invention is applied.
Figure 34:
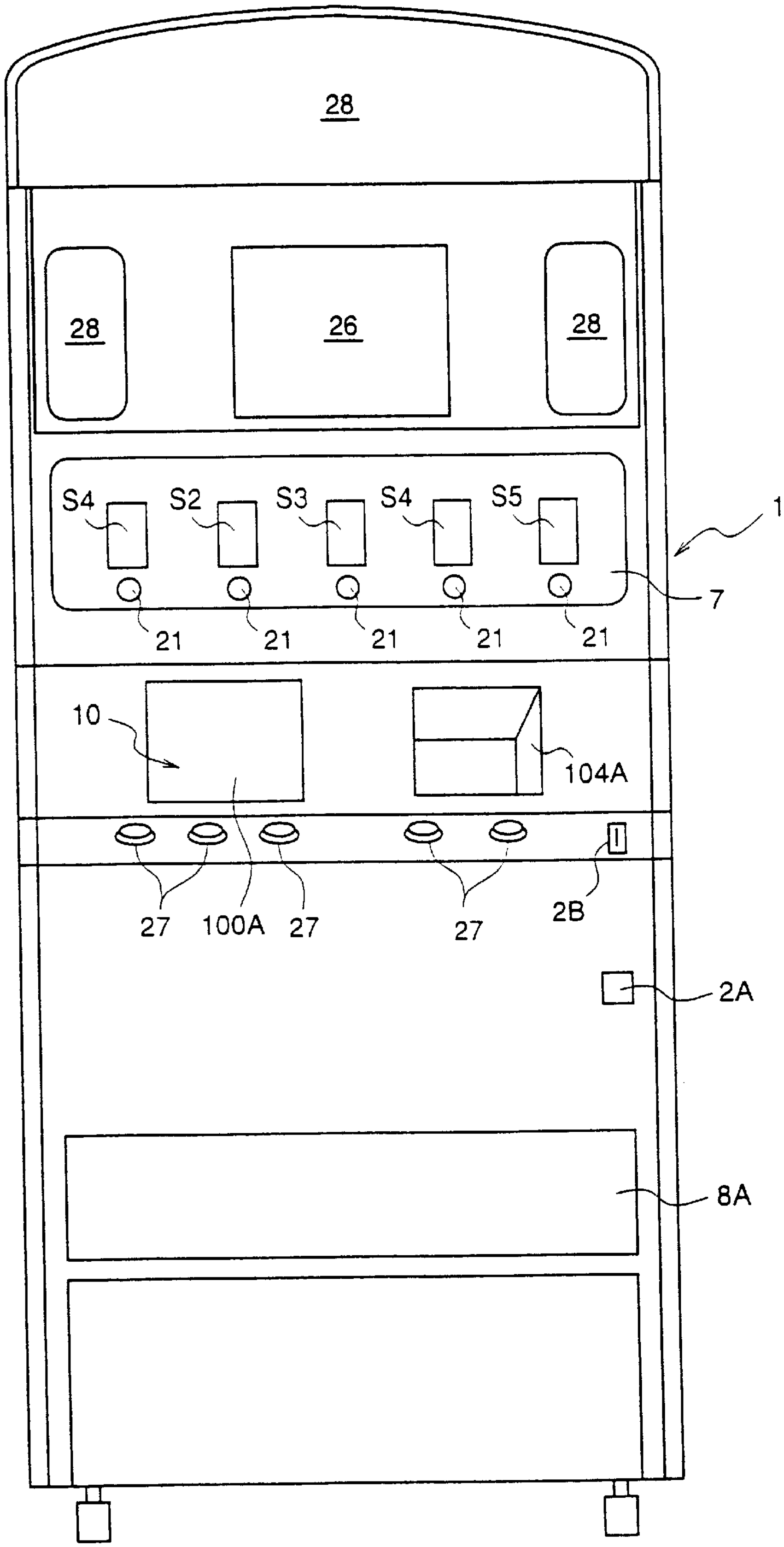
FIG. 34 is a diagram illustrating an external structure of the automatic vending machine to which the automatic laser beam machining machine is applied.

FIG. 33 is a diagram illustrating an internal structure of an automatic vending machine to which an automatic laser beam machining apparatus according to an embodiment 2 of the present invention is applied and FIG. 34 is a front view illustrating an appearance structure of the automatic vending machine to which the automatic laser beam machining apparatus is applied.

With reference to FIG. 33, in an automatic vending machine body 1, there are provided a stocker 300, a chute 8, and a laser beam machining means 100. The stocker 300 is disposed on the rear side of a show case 7 provided at the front upper portion of the automatic vending machine body 1. The stocker 300 is connected to the chute 8 below. In a casing of the laser beam machining means 100, there are provided an XY table 125 and a tray 5 including a storage 5A for storing a package 15, and the outside thereof, there is provided a laser oscillation unit 121. As shown in FIG. 34, an upper surface of the casing of the laser beam machining means 100 is exposed at the front surface of the automatic vending machine body 1 and an observation window which is open at the upper surface of the exposed casing is covered with a transparent glass 100A. On the left side of the transparent glass 100A, there is provided a put-in window 104A.

Conveniently, in FIG. 34, samples S1 to S6 are represented by "S".

With reference to FIG. 34, at the front surface of the show case 7, there is provided a selection button 21. As shown in FIG. 31, the show case 7 is supported on the automatic vending machine body 1 and is easy to open and close around a lateral pivot. Therefore, when a stock of articles stored in the stocker 300 runs out, the stocker 300 is opened to fill the articles therein.

Figure 35:
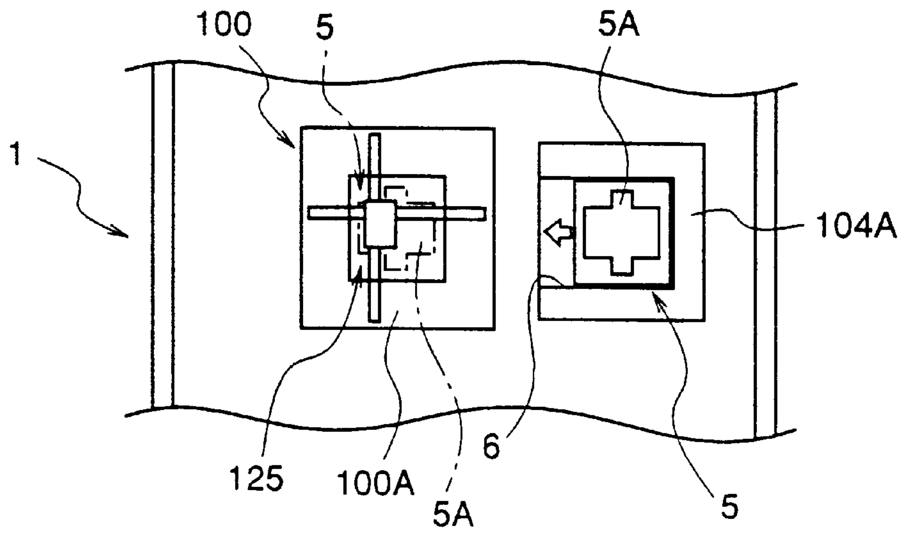
FIG. 35 is plan view illustrating partially enlarged laser beam machining means.

FIG. 35 is a plan view illustrating partially enlarged laser beam machining means.

With reference to FIG. 35, between the put-in window 104A and the laser beam machining means 100, a tray 5 and a guide rail 6 for guiding the tray 5 to the laser beams machining means 100 are provided. The guide rail 6 includes a guide groove (not shown) and the tray 5 is slidably mounted in the guide rail. The user sets the article in the storage 5A of the tray 5 and then slides the tray 5 along the guide rail 6 toward the laser beam machining means 100, thereby the user positions the article in a laser beam machining position of the laser beam machining means 100 in a given fitting (see the tray 5 and the storage 5A represented by alternate long and short dash lines in FIG. 35), the article being stored in the storage 5A. Thus, the tray 5 positioned in the laser beam machining position is held under the XY table 125 seen from the front surface of the automatic vending machine body 1 as shown in FIGS. 31 and 34.

A description is given of laser beam machining after setting the article in the laser beam machining position.

Figure 36:
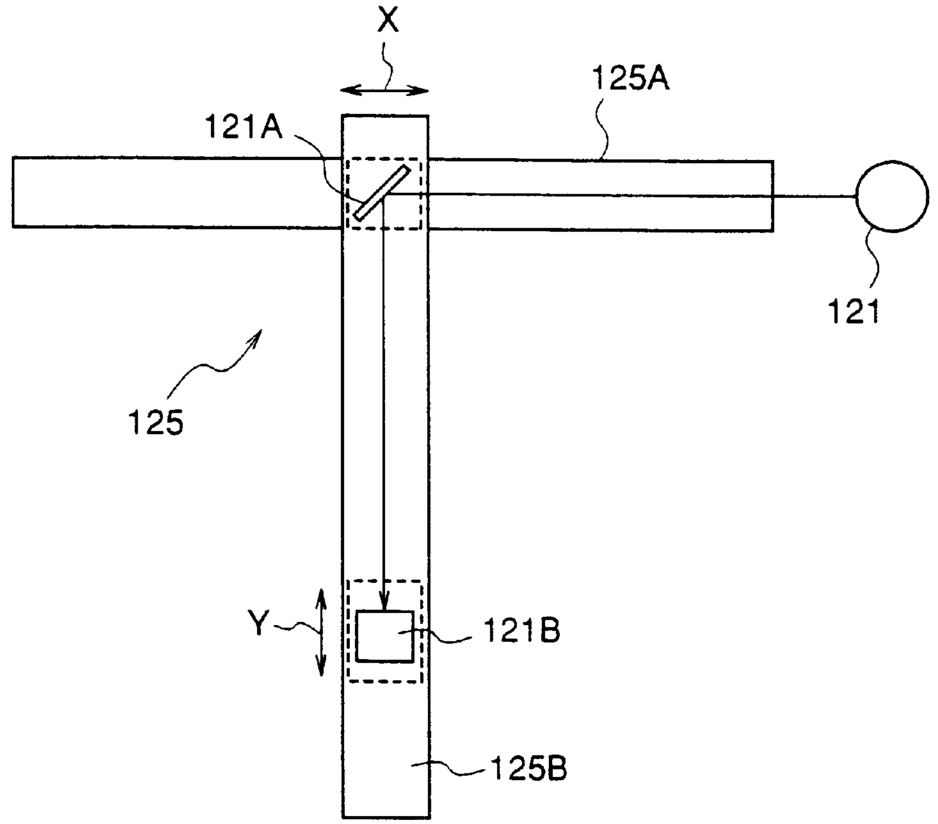
FIG. 36 is a plan view of an XY table.
Figure 37:
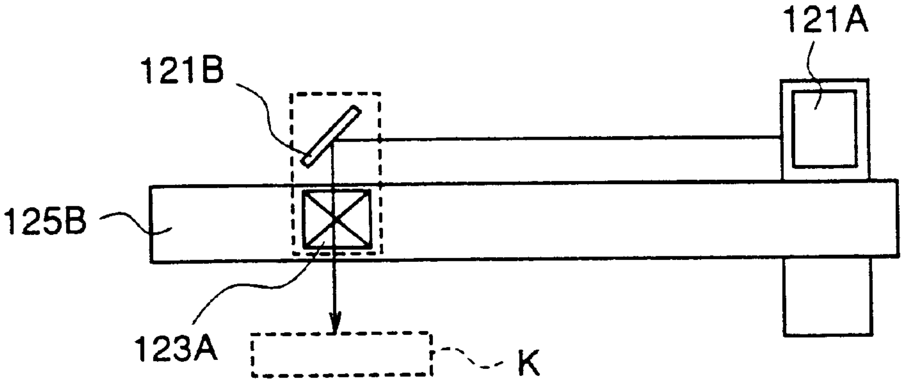
FIG. 37 is a side view of the XY table.

FIG. 36 is a plan view of the XY table and FIG. 37 is a side view of the XY table.

With reference to FIGS. 36 and 37, the XY table 125 is provided with a first mirror 121A and a second mirror 121B. The article K in the tray 5 is disposed under the XY table 125 and a condenser lens 123A is disposed opposite to the article K.

Laser beam machining is performed to the article K on the basis of video image data of a video camera 25 mentioned later.

At this time, X and Y coordinates in a region to which laser beams are to be applied are changed by the first mirror 121A and the second mirror 121B, thereby laser beams are applied to an arbitrary portion of the article K. More specifically, as shown in FIG. 36, the X rail 125A is fixed to the automatic vending machine body 1. On the X rail 125A, the Y rail 125B is slidably mounted in the direction of X axis. At an intersection of the X and Y rails 125A and 125B, the first mirror 121A fixed to the Y rail 125B is disposed and on the Y rail 125B extending coaxially in the direction of Y axis with respect to the first mirror 121A, the second mirror 121B is disposed so that it is movable on the Y rail 125B in the direction of the Y axis.

The laser beam oscillation unit 121 is movable in X axis in synchronization with movement of the Y rail 125B.

As mentioned above, disposition of the first and second mirrors 121A and 121B allows for the first mirror 121A to guide laser beams oscillated from the laser oscillation unit 121 in synchronization with movement of the Y rail 125B. In addition, the second mirror 121B slides on the Y rail 125B maintaining a disposition relation of coaxial extension between the first mirror 121A and the same, thereby allowing the second mirror 121B to guide laser beams reflected on the first mirror 121A from anywhere in the Y axis direction to Z axis direction. Therefore, the guided laser beams are reflected in the Z axis direction by the second mirror 121B, condensed by the condenser lens 123A, and then applied to a surface of the article K, thereby laser beam machining is performed.

The second mirror 121B moves in the direction of Y axis together with the condenser lens 123A. Such movement is achieved by a control means 20 mentioned later in a pulse motor (not shown) or the like, including movement of the Y rail 125B on the x rail 125A mentioned above.

Examples of processing will be described. Like a seal for stamping a name widely used in Japan, a surface thereof is burned using laser beams to provide a concave-convex portion. Like a mark as a sign for identifying a kind stamped on a plastic package of semiconductor electronic parts, characters are printed in a resin containing an ingredient (azo dyes) which develops color by heat. In the article which has a surface of a two-layer structure including base and surface layers, the surface layer is peeled using laser beams to expose the base layer.

In addition, as a special example, laser beams are applied to a stamp including a sponge layer containing liquid ink for a stamp, and a coating layer which coats the sponge layer and does not absorb ink contained in the sponge layer and simultaneously vaporizes ink, to make small holes in the coating layer, thereby images are drawn.

Figure 38:
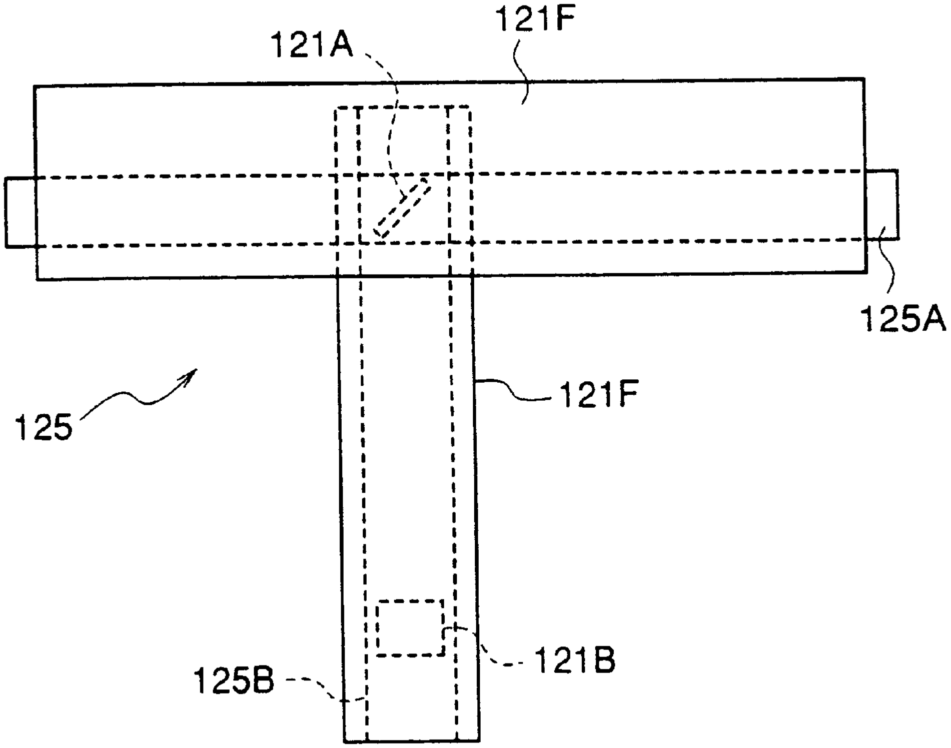
FIG. 38 is a plan view of an XY table according to a modification.
Figure 39:
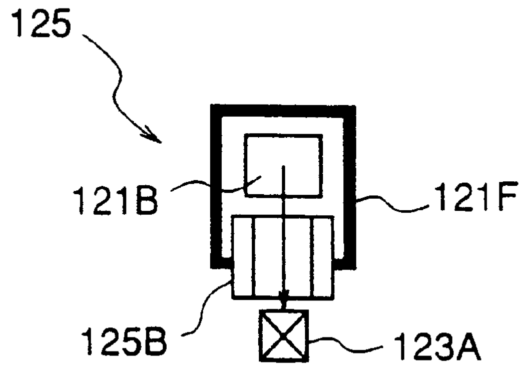
FIG. 39 is a side view of the XY table according to the modification.
Figure 40:
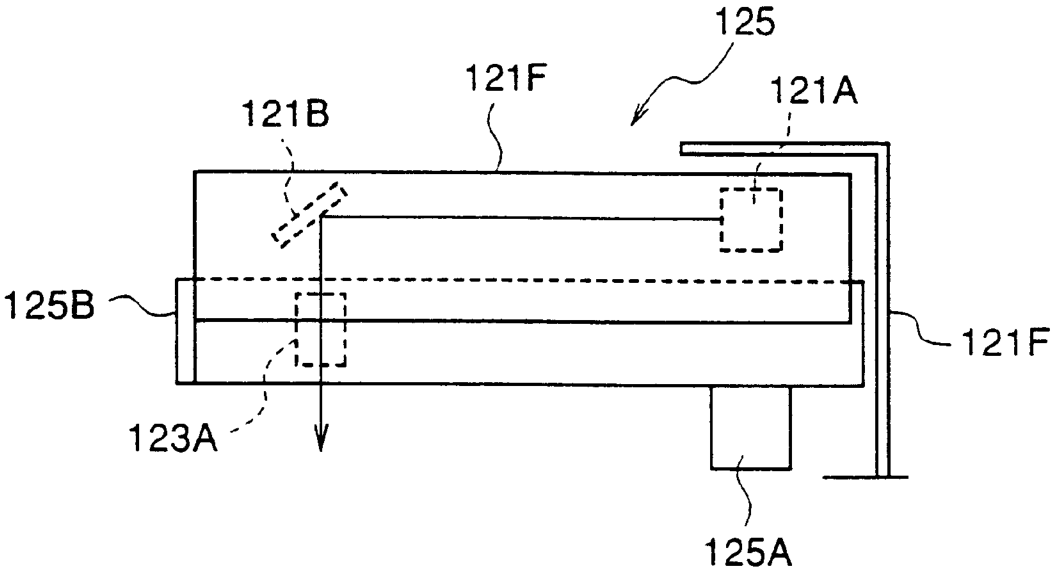
FIG. 40 is a front view of the XY table according to the modification.

FIGS. 38 to 40 illustrate modification of the XY table mentioned above. Specifically, FIG. 38 is a plan view of the XY table according to the modification, FIG. 39 is a side view of the XY table according to the modification, and FIG. 40 is a front view of the XY table according to the modification.

With reference to FIGS. 38 to FIG. 40, this modification is characterized in that an optical path of laser beams reflected on the first and second mirrors 121A and 121B is provided with a cover 121F made of a material which absorbs laser beams.

The material of the cover 121F may include any material which can absorb laser beams such as metal, other than a material such as an acrylate resin which changes its shape and absorbs laser beams on application of laser beams.

Provision of the cover 121F made of a material which absorbs laser beams is especially important for safety, since there is danger that laser beams may be irregularly reflected due to dust and directed to the user in cases where the XY table 125 is to be seen through the transparent glass 100A so that the user can see process state of the article as shown in FIG. 33.

Alternatively, the acrylate resin may be employed in place of the transparent glass. The acrylate resin can absorb energy of laser beams. Therefore, safety is further improved.

In the embodiment 2, the laser beams reflected on the first and second mirrors 121A and 121B have a low energy density and have no adverse effect on human body, and are condensed to make the energy density sufficient for machining the article immediately before the laser beams are applied to the article. Therefore, danger is avoided to some extent with no need for the cover 121F.

A stocker will be described.

Figure 41:
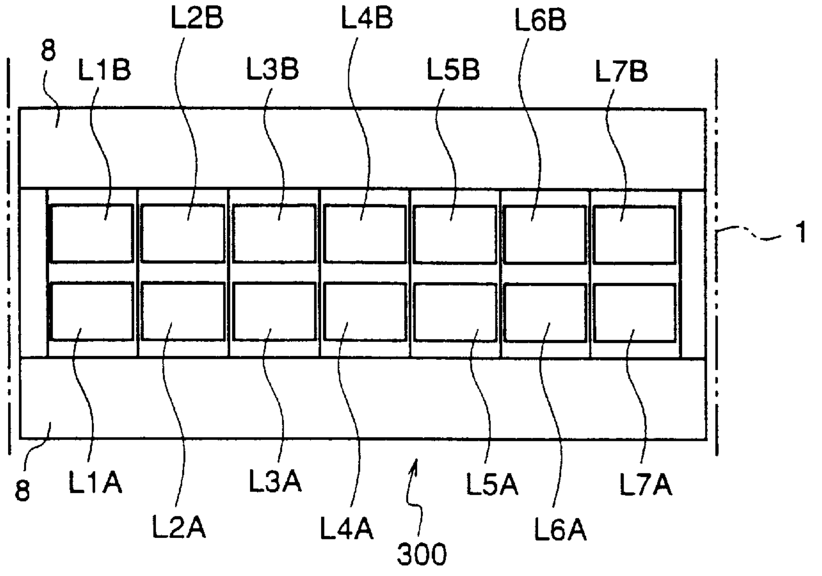
FIG. 41 is a plan view of a stocker.
Figure 42:
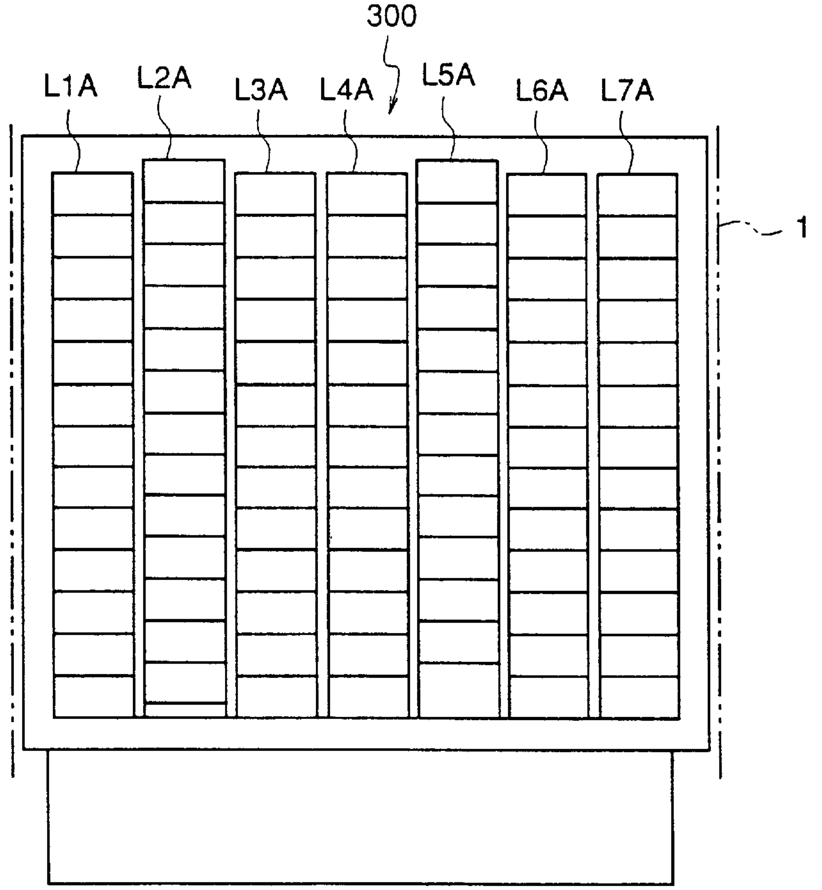
FIG. 42 is a front view of the stocker.

FIGS. 41 and 42 illustrates the stocker. Specifically, FIG. 41 is a plan view and FIG. 42 is a front view of the stocker.

With reference to FIGS. 41 and 42, in the stocker 300, plural packages 15 each storing the article are stacked in a line back and fourth. More specifically, in front parts L1A, L2A, L3A, L4A, L5A, L6A, and L7A, and in rear parts L1B, L2B, L3B, L4B, L5B, L6B, and L7B, the packages 15 including the same kind of article for each pair of opposite front and rear parts are stacked, respectively. In the packages 15 stacked in the front parts L1A to L7A and the rear parts L1B to L7B which are aligned in right and left direction respectively, the article K of different kind is stored, varied from each other in right and left direction.

In the show case 7, as shown in FIG. 34, the samples S1 to S6 are exhibited corresponding to all kinds of the articles stored in the stocker 300.

The user sees the show case 7 and pushes a selection button 21 to select a desired article, thereby driving a drive unit 300A mentioned later. Then, a pusher (not shown) moves back and fourth and pushes the package 15 which stores the article corresponding to the selected sample to the chute 8 shown in FIG. 33, that is, discharges the packages 15. Then, the packages 15 pushed by the pusher is carried to the vicinity of a discharge port 8B through a discharge path 8C of the chute 8.

The pusher is disposed at the bottom of one of the front parts L1A to L7A and the rear parts L1B to L7B.

Figure 43:
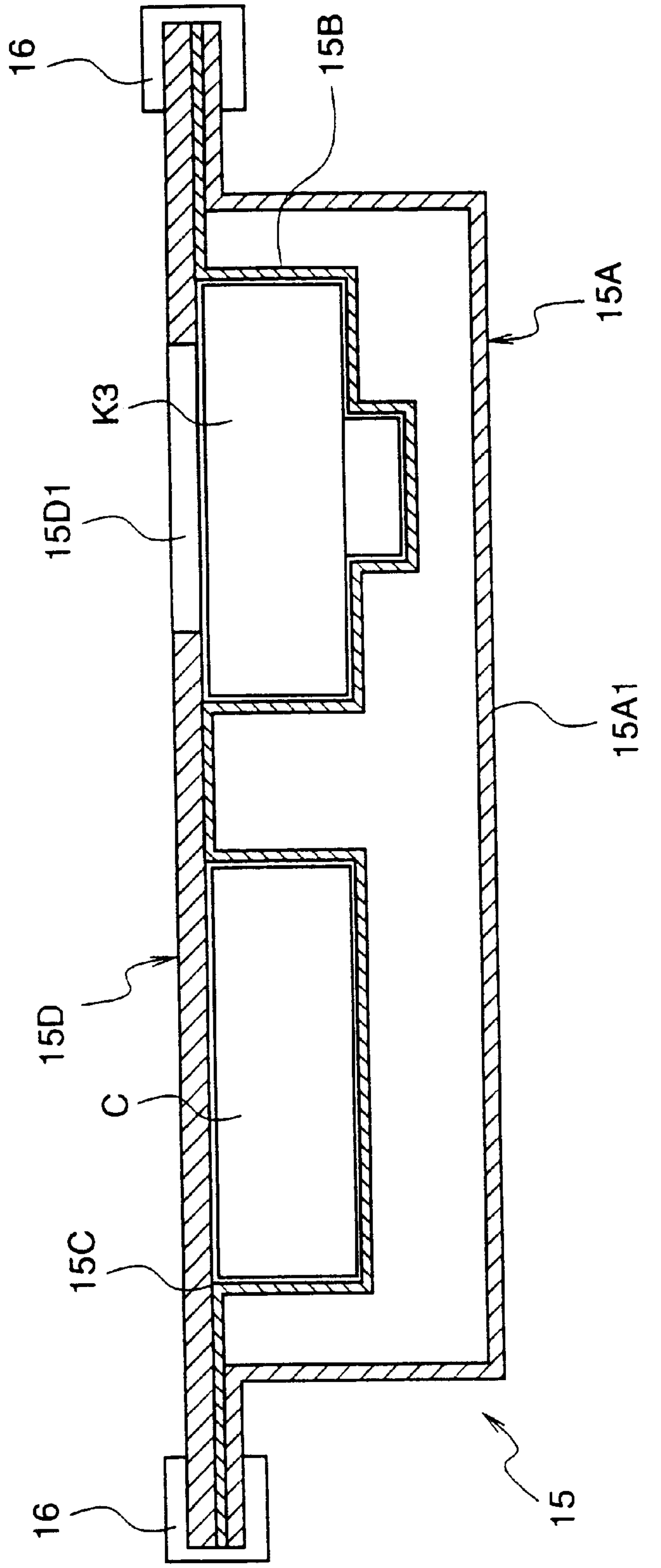
FIG. 43 is a cross-sectional view illustrating the article stored in the package.

FIG. 43 is a cross-sectional view illustrating the article stored in thus pushed-away package and a stored stamp as an example of the article.

FIG. 43 illustrates a stored stamp as an example of the article.

Referring to FIG. 43, a package 15 comprises i) a bottom 15A for storing a stamp K3 and a cap C, ii) a package 15B for storing the stamp K3 and the cap C before storing them in the bottom 15A, and iii) a lid 15D for closing an opening of the bottom 15A. The bottom 15A has a flat surface 15A1. The bottom 15A has a flat surface 15A1 to prevent the packages 15 from tilting in stacking the same in the stocker 300 or to prevent the packages 15 from being blocked in discharging the same. The package 15B is provided with a recess for storing the stamp K3 and the cap C in a given fit. A dimension of the recess is set to ensure that the stamp K3 is stored in a prescribed position where laser beam machining of the stamp K stored in the packages 15 using laser beams is not to be impeded if any vibration is applied to the stamp K in a relation between the packages 15 and the same. The lid 15D prevents the stamp K3 from falling off the packages 15 in discharging the same and has planar-plate shape. A portion of the lid 15D corresponding to the storage region of the stamp K3 is provided with a laser beam introduction port 15D1 so that a surface of the stamp K3 which requires laser beam machining is exposed. The laser beam introduction port 15D1 is used for introducing laser beams into the package 15 to apply them to the surface of the stamp K3 and preferably, it has a minimum opening area required for machining the stamp K3 to prevent the article K from falling off the opening of the laser beam introduction port 15D1.

Laser beam machining is performed to the article stored in the package 15 of the same shape as mentioned above. There are two reasons for this. 1) If a shape of the article stored in the package 15 is changed, it is not necessary to change a shape of the storage 5A of the tray 5. 2) A seal 16 is attached over the bottom 15A and the lid 15D and when the seal 16 is torn by the user, a control means mentioned later decides that the user stores an article other than a prescribed one and inhibits laser beam machining to take safety measures.

In addition, in plural positions of the package 15, recognition marks are provided. The recognition marks are detected by a sensor 5B of the tray 5 mentioned later, thereby it is possible to check whether the package 15 is stored in the given position of the storage 5A or not.

Having thus described that laser beam machining is performed to the article stored in the package 15 in the embodiment 2. Alternatively, plural trays 5 may be prepared to store the article in a given fitting, a shape of the storage 5A of the tray 5 being adapted to match a shape of every article. This allows direct storage of the article taken out of the package 15 in the storage 5A of the tray 5 to perform laser beam machining to the same.

Figure 44:
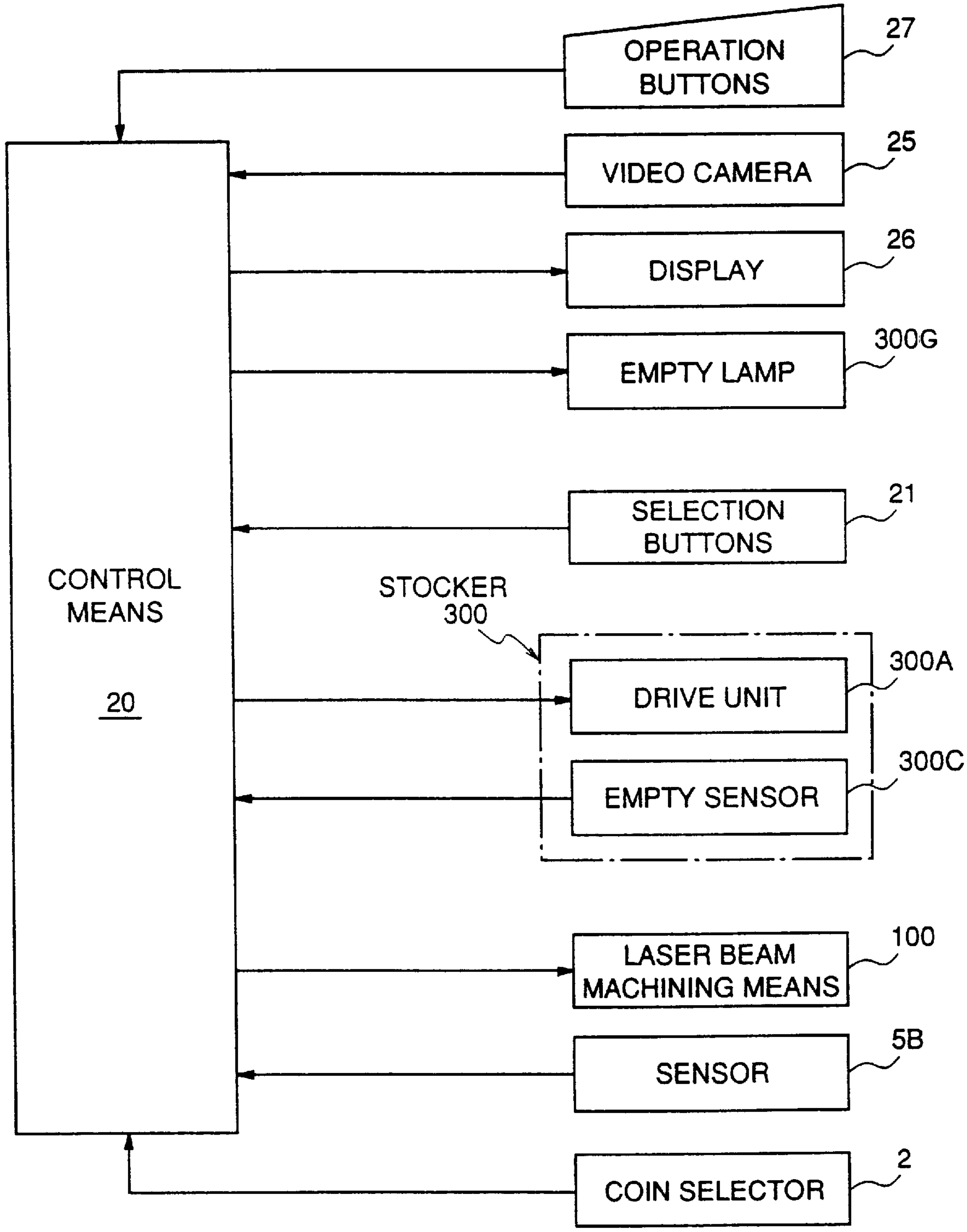
FIG. 44 is a block diagram illustrating an electric structure of the automatic vending machine to which the automatic laser beam machining machine is applied.

FIG. 44 is a block diagram illustrating electric construction of an automatic vending machine to which an automatic laser beam machine is applied.

With reference to FIG. 44, the control means 20 is electrically connected to a coin selector 2, a sensor 5B of the tray 5, a selection button 21, a video camera 25, a display means 26, an operation button 27, a laser beam machining means 100, a drive unit 300A of the stocker 300, an empty sensor 300C of the stocker 300, and an empty lamp 300G for displaying an empty state recognized by the empty sensor 300C, respectively.

The control means 20 is supplied with signals from the coin selector 2, the sensor 5B of the tray 5, the selection button 21, the video camera 25, the operation button 27, and the empty sensor 300C of the stocker 300, respectively. On the basis of the signals, the control means 20 controls the display means 26, the laser beam machining means 100, the drive unit 300A of the stocker 300, and the empty lamp 300G.

Figure 45:
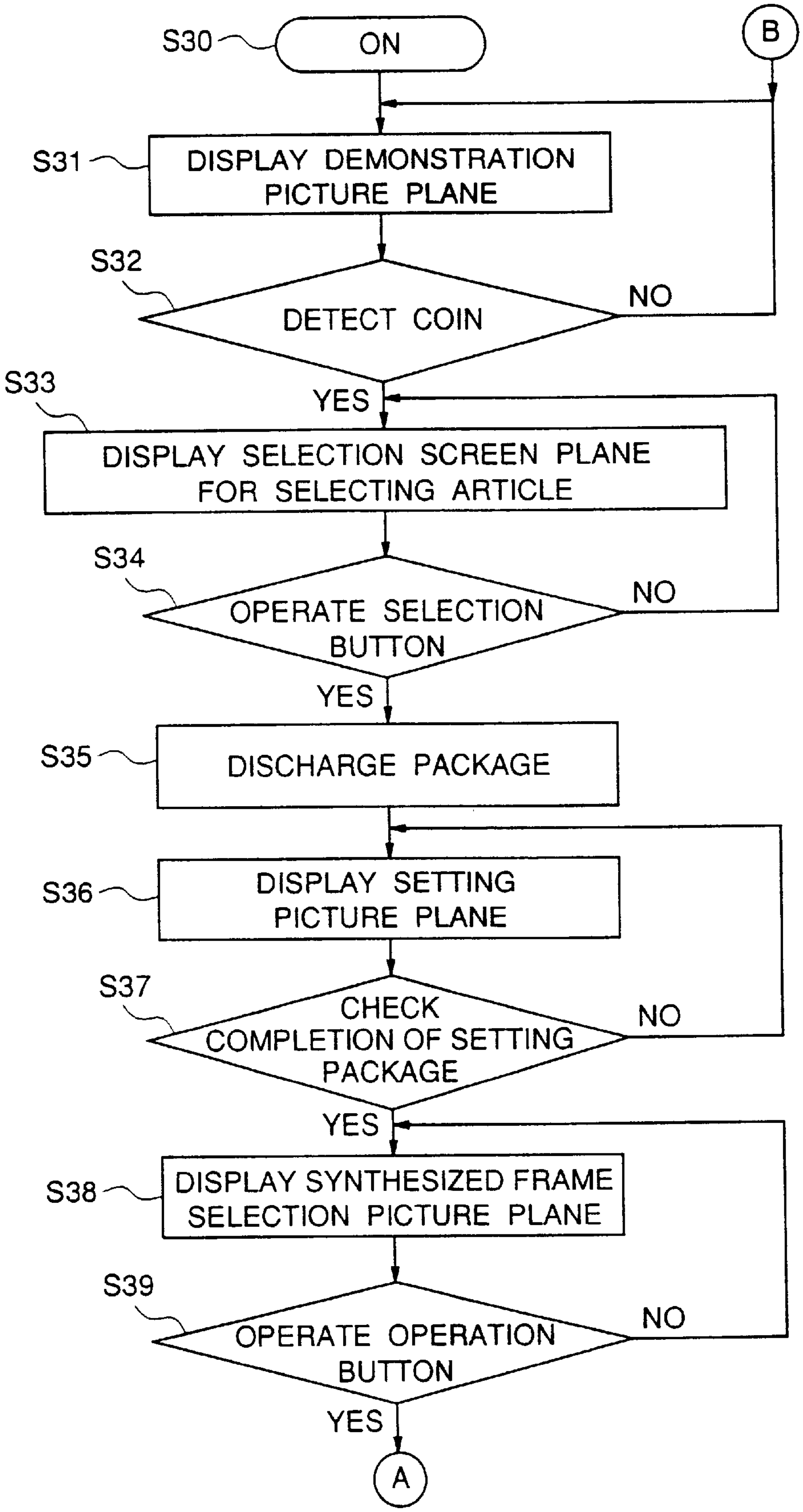
FIG. 45 is a flowchart illustrating a flow of a control of the automatic vending machine to which the automatic laser beam machining machine is applied.
Figure 46:
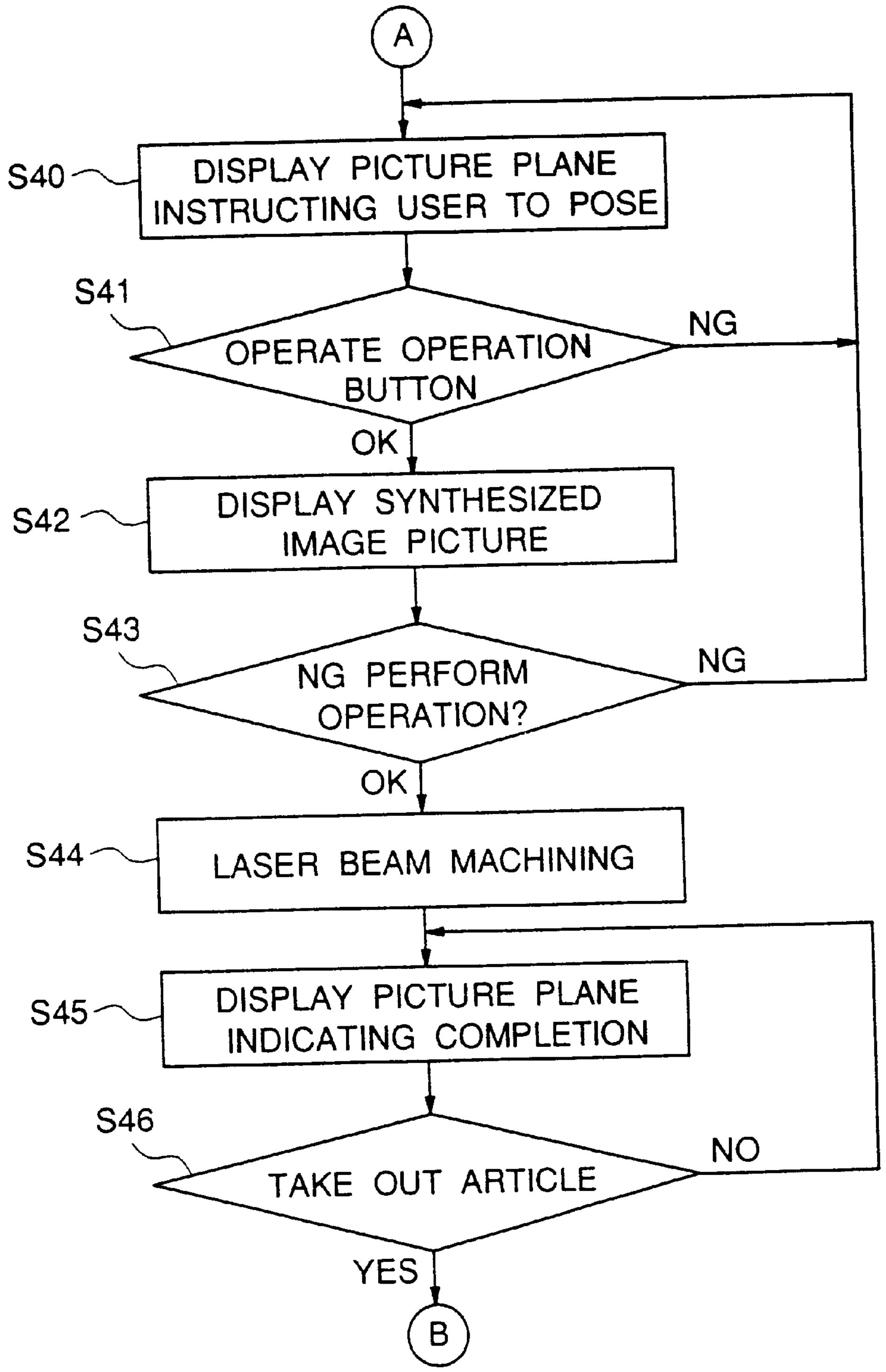
FIG. 46 is a flowchart illustrating a flow of a control of the automatic vending machine to which the automatic laser beam machining machine is applied.

FIGS. 45 and 46 are flowcharts illustrating a control flow of the automatic vending machine to which the laser beam machine is applied.

With reference to FIGS. 45 and 46, on application the power (Step S30), the control means 20 instructs the display 26 to display a demonstration picture plane and, on the basis of this instruction the display 26 displays the same thereon (Step S31).

The demonstration picture planes represent various types of plays which are performed in the embodiment 2 or commercial information.

Upon detection of coins corresponding to predetermined fare put in from the coin slot 2B in the coin selector 2 (Step S32), the control means 20 instructs the display 26 to display a selection screen plane for selecting the article to be laser-machined and on the basis of this instruction the display 26 displays the same thereon (Step S33).

The user sees the selection screen plane displayed in the display 26 and operates the selection button 21 to select the article to his taste (Step S34), the control means 20 instructs the stocker 300 to discharge the selected article K and, on the basis of this instruction the stocker 300 discharges the package 15 which stores the selected article K (Step S35).

Selection is performed by the selection button 21 as mentioned above. Alternatively, an image of the article K may be displayed on the display 26 and selection may be performed by the operation button 27.

On completion of discharge of the package 15, the control means 20 instructs the display 26 to display a setting picture plane indicating that the package 15 should be stored in the tray 5 and on the basis of this instruction the display 26 display the same thereon (Step S36).

Then, the user sees the setting picture plane displayed on the display 26 and sets the package 15 in the tray 5 in accordance with display of the display 26.

The setting picture planes represent way of setting the package 15 or precautions required for laser beam machining. Preferably, the user should be informed of the precautions by means of sounds as well as images from a standpoint of safety.

Thereafter, checking completion of setting the package 15 in the tray 5 on the basis of detection signals from the sensor 5B of the tray 5 (Step S37), the control means 20 instructs the display 26 to display a synthesized frame selection picture plane for selecting a frame of a foreground or a background to be synthesized with an image taken by a video camera 25 mentioned later or a kind of frame and, on the basis of this instruction the display 26 displays the same thereon (Step 38).

When the control means 20 checks that the user who has seen the screen displayed on the display 26 has operated the operation button 27 (Step S39), it instructs the display 26 to display a picture plane which instructs the user to pose before starting taking pictures using the video camera 25 and on the basis of this instruction the display 26 displays the same thereon (Step S40).

When the control means 20 checks that the user who has seen the screen displayed on the display 26 has operated the operation button 27 (Step 41), it instructs the display 26 to display a synthesized image picture in which the selected frame is synthesized with the taken image and, on the basis of this instruction the display 26 displays the same thereon (Step S42).

The control means 20 decides whether the user who has checked the synthesized image picture planes performs NG operation of the operation button 27 or not (Step S43). NG operation is the one indicating that the user does not like the obtained synthesized image. When the control means 20 checks that the user has performed NG operation, again in step S40, the same operation is performed. On the other hand, when the control means 20 checks that the user has performed OK operation (indicating that the user likes the obtained synthesized image) of the operation button 27, it makes the laser beam machining means 100 drive, thereby laser beam machining is performed to the article for reproducing the synthesized image therein (Step S44).

At this time, the control means 20 makes the display 26 display a picture plane indicating that the article is being machined.

Preferably, a put-in window 104A is automatically locked for safety so that the package 15 should not be taken out while the article is being machined.

On completion of machining/printing using laser beams, the control means 20 instructs the display 26 to display a picture plane indicating completion of machining/printing and takeout of the article to the display 26 and, on the basis of this instruction the display 26 displays the same thereon (Step S45).

Checking that the article has been taken out on the basis of detection signals from a sensor 5B of the tray 5 (Step S46), the control means 20 makes the display 25 display the first demonstration picture plane thereon.

The other construction is identical to that of the embodiment 1.

As should be appreciated from the forgoing description, in accordance with the embodiment 2, the following effects are achieved.

A) The article stored in the stocker 300 is discharged from the stocker 300, thereby laser beam machining is performed to the article when the user puts in predetermined fare. Therefore, it is not necessary for the user to bring the article. In addition, since the article adapted to a predetermined laser power is discharged from the stocker 300 in laser beam machining, it is not necessary for the user to decide whether the discharged article is appropriate for use in laser beam machining or not.

B) The user puts in the article from the put-in door 104 to store the same in the tray 5 and then slides it to the laser beam machining means 100 with the article stored in the tray 5, thereby positioning it in the laser beam machining position. Therefore, the user can perform laser beam machining to the article with ease.

C) The user discharges the article selectively from the stocker 300 to store the discharged article in the tray 5. Therefore, as described above, laser beam machining is performed to the article with the article stored in the tray, so that it is possible to perform laser beam machining even in the case of the article of different shape.

D) In order to deal with the articles of plural kinds of shapes, without preparing plural kinds of storages 5A, the article stored in the package 15 of the same shape is set in one tray 5 and the article is machined by the laser beam machining means 100 with the article stored in the package 15. In addition, the package 15 can store the article of different shape in a given fitting. Therefore, changing the package 15 can deal with changing a shape of the article.

E) Laser beam machining is performed to the article by the laser beam machining means 100 based on the image information taken by the video camera 25, while checking the image taken by the video camera 25 on the display 26.

F) With the laser oscillation unit 121 fixed to the automatic vending machine body 1 and by using the mirrors 121A and 121B, it is possible to perform machining to the article freely such as printing characters or images therein.

G) Laser beams are condensed by the condenser lens 123A with the laser beams being as close to the article as possible. For example, laser beams reflected on the first mirror 121A or the second mirror 121B are set to have low energy density and diaphragming thereof is performed immediately before the article. As a result, safety is improved.

H) The lid 15D of the package 15 is provided with the laser beam introduction port 15D1. Therefore, fire or the like attributable to burning the lid 15D on application of laser beams thereto is avoided.

I) If the user has changed a content of the package 15 into an article which is not suitable for use in laser beam machining, it is possible to detect this. Therefore, trouble which occurs in applying laser beams to the inappropriate article is prevented.

Embodiment 3

Figure 47:
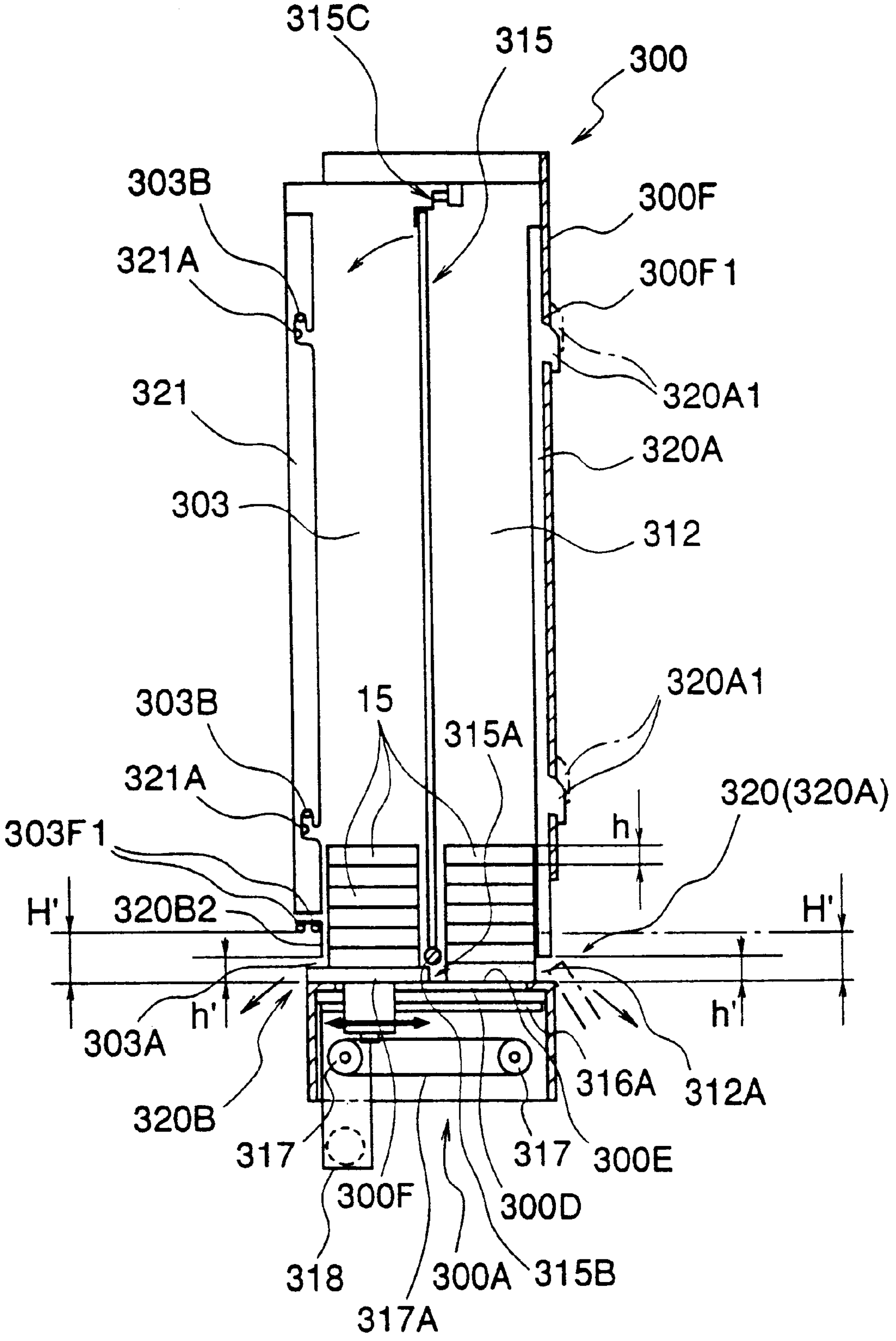
FIG. 47 is a vertically sectional side view of the stocker of the automatic vending machine to which an automatic laser beam machining machine according to a third embodiment is applied.
Figure 48:
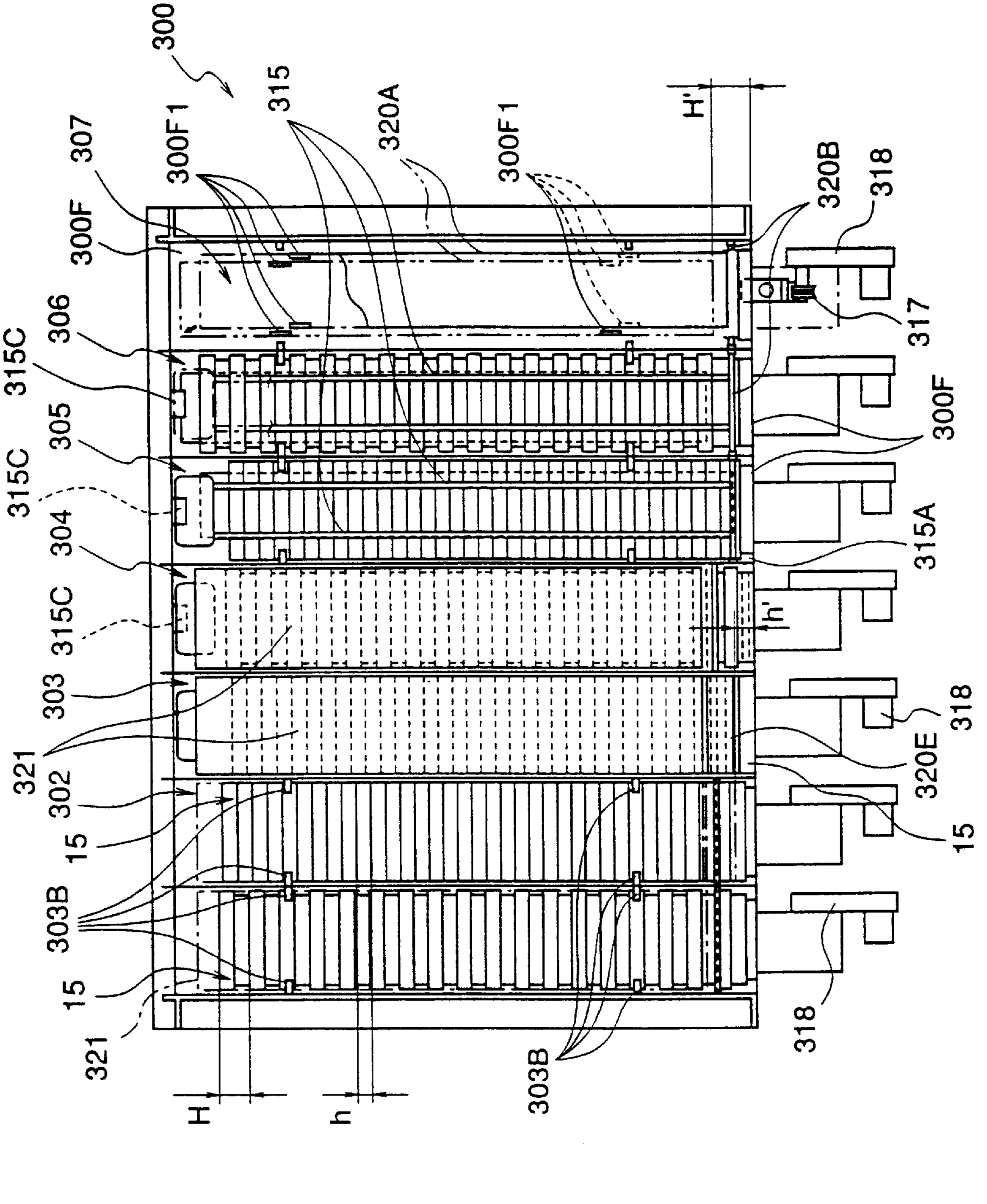
FIG. 48 is a front view of the stocker of the automatic vending machine to which the automatic laser beam machining machine is applied.
Figure 49:
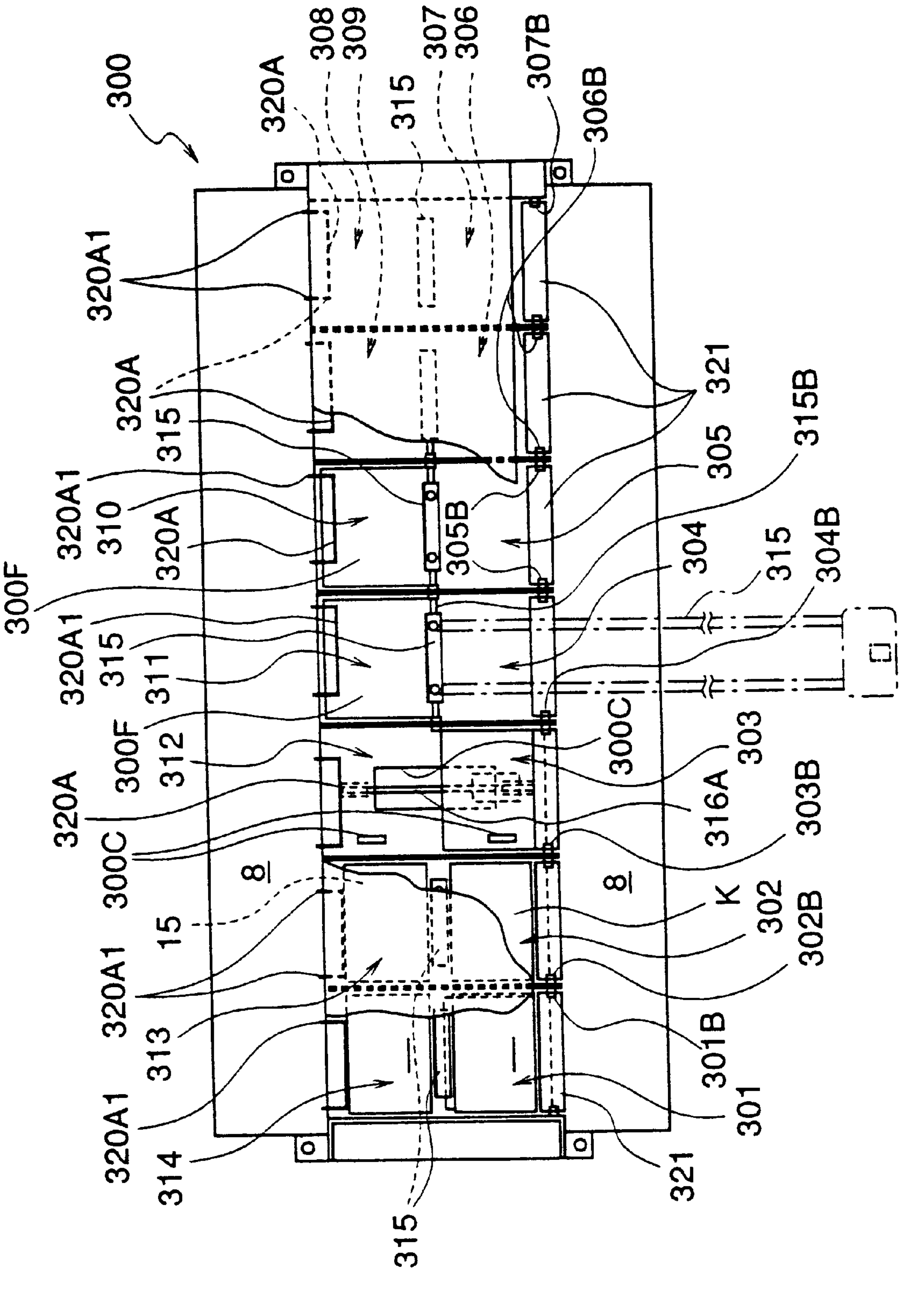
FIG. 49 is a plan view of the stocker of the automatic vending machine to which the automatic laser beam machining machine is applied.

FIG. 47 is a vertically sectional side view of a stocker of an automatic vending machine to which an automatic laser beam machining apparatus according to an embodiment 3 of the prevent invention is applied. FIG. 48 is a front view of a stocker of the automatic vending machine to which the automatic laser beam machining apparatus is applied. FIG. 49 is a plan view of a stocker of the automatic vending machine to which the automatic laser beam machining apparatus is applied.

Referring now to FIGS. 47 to 49, when the control means 20 checks that the user has slotted predetermined fare, the stocker 300 of the automatic vending machine of the embodiment 3 is ready to discharge the stored package 15.

In the stocker 300, storages 301, 302, 303, 304, 305, 306, 307, 308, 309, 310, 311, 312, 313, and 314 are disposed up and down.

The storages 301 to 314 have rectangular shapes seen from above and comprises storage regions which provide axial penetration, respectively. The storages 301 to 314 store plural packages 15 each having the same thickness for each storage in stacks.

Referring again to FIG. 49, behind the storage 301, the storage 302, the storage 303, the storage 304, the storage 305, the storage 306, and the storage 307, the storage 314, the storage 313, the storage 312, the storage 311, the storage 310, the storage 309 and the storage 308 are disposed, respectively. Between the storages 302 and 313, the storages 303 and 312, the storages 304 and 311, the storages 305 and 310, the storages 306 and 309, and the storages 307 and 308, there is provided a separation wall 315, respectively, which separates each pair of storages 302 and 313, 303 and 312, 304 and 311, 305 and 310, 306 and 309, and 307 and 308, respectively back and fourth.

A pusher 300B is provided for each pair of storages (for example 301 and 314). The pusher 300B is attached to a bottom surface 300E of the storage. The bottom surface 300E is provided with a hole 300D having a length sufficient for movably guiding the pusher 300B back and fourth. The deep hole 300D is provided in the movement direction of the pusher 300B.

At the bottom of the separation wall 315, there is provided a hole 315A for moving the pusher 300B, through which the pusher 300B moves beyond the separation wall 315.

The hole 315A must have a thickness sufficient for moving the pusher 300B and which is smaller than that of the package 15, since there is a possibility that the package 15 gets stuck in the hole 315A, which causes some troubles. For this reason, as shown in FIGS. 46 and 47, the hole 315A is set to have a thickness which is smaller than those of the package 15 H and h and is larger than that of the pusher 300B.

In walls of the storages 301 to 314 in the movement direction of the pusher 300B, openings 301A, 302A, 303A 304A, 305A, 306A, 307A, 308A, 309A, 310A, 311A, 312A, 313A, and 314A are provided, respectively (in FIG. 46 only the opening 312A). The openings 301A to 314A each has a thickness H' or h' which is almost the same as the largest thickness H or h of the package 15 to be stored.

In the embodiment 3, the package 15 has thicknesses H and h (smaller than H). Alternatively, the package 15 of different thickness may be stored for each pair of storages (for example 303 and 312).

The openings 301A to 314A are provided with an opening changing means 320 for setting thicknesses of openings 301A to 314*a* to be H' and h', respectively, corresponding to the thicknesses H and h of the package 15 to be stored.

The relations between H and h, and H' and h' are designed to satisfy $H \leqq H' < 2H$ and $h \leqq h' < 2h$. An opening area for storing the package 15 is smaller than a thickness which is twice as large as that of the package 15, since two packages 15 should not be discharged to chute 8 at a time.

Referring to FIGS. 46 and 47, means for moving the pusher 300B freely, i.e., a driving unit 300A of the stocker 300 comprises i) an endless belt 317A which is provided below the bottom surface 300E of the stocker 300 and is movable back and fourth, ii) a pair of pulleys 317 in which the belt 317A is engaged, and iii) a driving source 318 for rotating and driving one pulley of the pair of pulleys 317. To the belt 317A, the pusher 300B is fixed through a hole 300D. Therefore, the pusher 300B moves together with the belt 317A.

Drive of the driving source 318 is controlled by the control means 20.

In the embodiment 3, front and rear walls of the storages 301 to 314 serve as opening changing means 320, respectively.

Hooks 320A1 of the first plate-shaped opening changing means 320A arc engaged in plural holes 300F1 provided at a rear plate 300F of the stocker 300, respectively and an engagement position thereof is changed, thereby the rear walls of the storages 301 to 314 change a thickness of the opening (for example 312A) into H' or h'. At the front walls of the storages 301 to 314, a second opening changing means 320B is provided.

The second opening changing means 320B comprises i) a pair of fixed axes 320B1 which are stick-shaped and extending over the front storages 301 to 307, and ii) a skirt 320B2 removably attached to the fixed axes 320B1. The second opening changing means 320B can change a height of an opening into H' or h' depending on presence of the skirt 320B2. Specifically, the opening has h' height with the skirt 320B2 and has H' height without it.

The separation wall 315 falls around the axis 315B back and fourth by alternate long and short dash line shown in FIG. 49.

In addition, the separation wall 315 is fixed to the stocker 300 by means of fixing means 315C such as a magnet so that it will not fall around the axis 315B.

At right and left walls of the storages 301 to 307, there are provided plural projections 301B, 302B, 303B, 304B, 305B, 306B, and 307B and at a front wall 321, there are provided cutouts 321A. Engagement of the cutouts 321A into and out of the projections 301B to 307B allows attachment and removal of the front wall 321, respectively. This attachment and removal of the front wall 321, and rotation of the separation wall 315 allows storage additional packages 15 and replacement of the package 15 in the stocker.

An operation of the stocker which discharges the package is described.

On input of the selection switch 21 for selecting the article K among samples exhibited in the sample case 7, the packages 15 are discharged one by one from the storage where the package 15 including the article K corresponding to the selected sample is stored in stack.

This discharge is achieved by rotating the pulleys 317 using the driving source 318, thereby moving the belt 317A. This movement of the belt 317A allows the pusher 300B to move together with the same.

Then the pusher 300B pushes the package 15 out of the opening positioned forwardly in the moving direction, to discharge the same.

At this time, the pusher 300B moves back and fourth, sliding on a sliding bar 316A (see FIGS. 47 and 49) provided in back and fourth direction. Therefore, movement of the pusher 300B is limited in right and left direction.

The discharge will now be described in more detail, showing a pair of storages 303 and 312 as examples.

Referring to FIG. 47, in the storage 303, plural packages 15 are stored in stack. At the bottom of the package 15, the pusher 300B is placed. Also in the storage 312, the packages 15 are stored in stack. The package 15 at the bottom is disposed opposite to the pusher 315 through the hole 15A for moving the pusher 300B. At the bottom of the storage 312, the pusher 300B is not placed. In this state, when the driving source 318 is driven by the control means 20, the pusher 300B moves toward the storage 312, to push the package 15 which is opposite thereto out of the opening 312A. This pushed package 15 is discharged through the chute 8. On completion of discharge, the pusher 300B returns to the bottom of the package 15 stored in the storage 312. On subsequent drive of the driving source 318, the pusher 300B pushes the package 15 at the bottom of the storage 303 out of the opening 303A as described above, to discharge the same. In this way, the package 15 is alternately discharged out of the pair of storages (for example, 303 and 312). Therefore, the pair of storages must store the packages 15 including the same article K.

In order to store additional package 15 in the stocker 300, after opening a door provided at the automatic vending machine 1 and removing the front wall 321, the separation wall 315 falls forwardly. In this state, the packages 15 are stored in the rear storages 308 to 314, respectively.

At the completion of storing the packages 15 in the rear storages 308 to 314, the fallen separation wall returned to its original one and then the separation wall is fixed by the fixing means 315C. Subsequently, the packages 15 are stored in the rear storages 301 to 307, respectively. At the completion of storing the packages 15 in the front storages 301 to 307, the projections 301B to 307B are engaged in the cutouts 321A of the front wall 321, fixedly and then door is closed.

The other constructions are identical to those of the embodiment 1.

As should be appreciated from the foregoing description, in the embodiment 3, the opening changing means 320 allows appropriate change of the opening areas of the storages 301 to 314 in accordance with a thickness of the package 15 to be stored. As a result, it is possible to discharge several kinds of packages 15 of different thickness.

Embodiment 4

Figure 50:
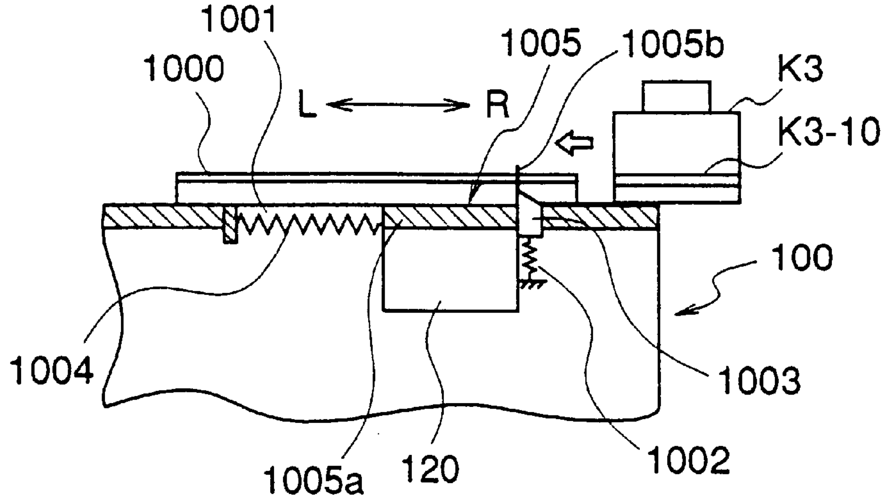
FIGS. 50(*a*) to 50(*c*) are simplified diagrams each illustrating a main structure of the laser beam machining means of the automatic vending machine to which an automatic laser beam machining machine according to an embodiment 4 of the present invention is applied.
Figure 50:
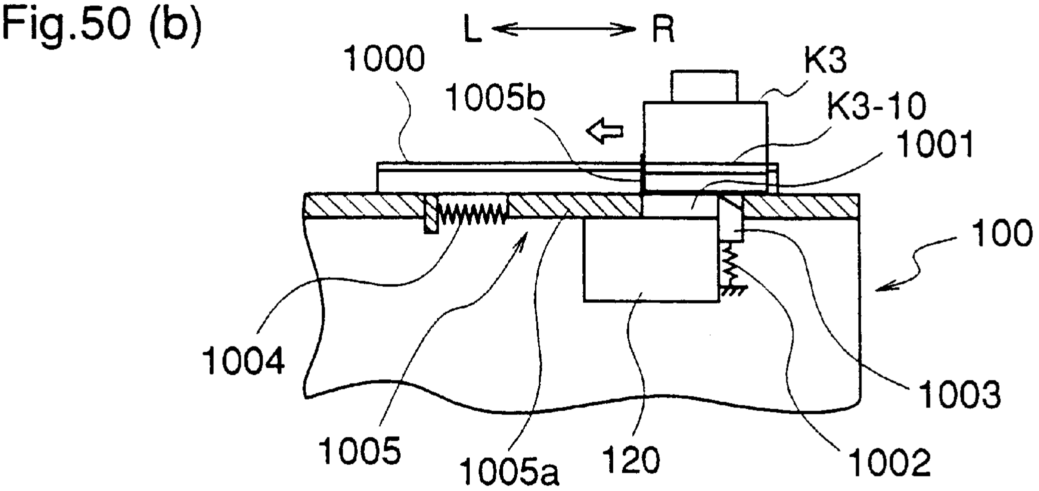
Figure 50:
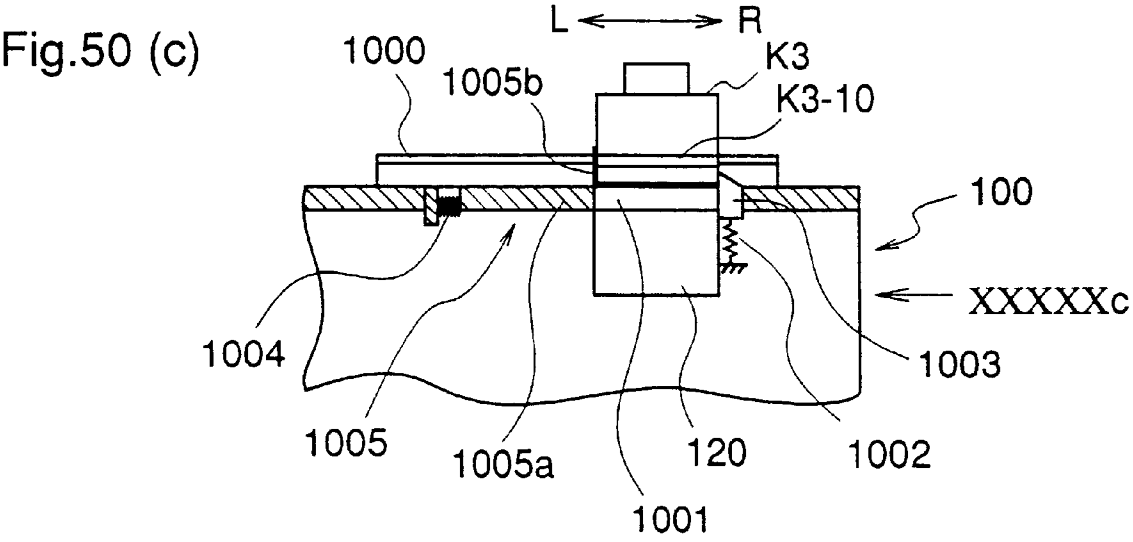
Figure 51:
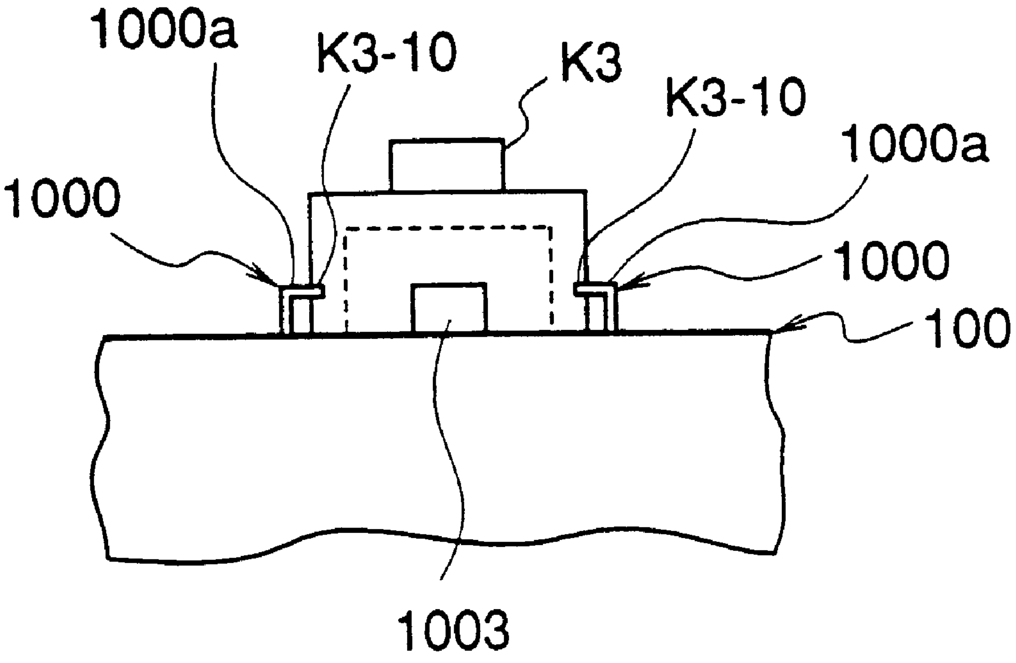
FIG. 51 is a diagram in the direction of the arrow XXXXXIc in FIG. 50(*c*).

FIGS. 50(*a*) to 50(*c*) are simplified diagrams of a main structure of a laser beam machining means of an automatic vending machine to which an automatic laser beam machining apparatus according to an embodiment 4 is applied and FIG. 51 is a view in the direction of XXXXXI arrow in FIG. 50(*c*).

In FIGS. 50(*a*) to 50(*c*) and 51, a stamp K3 is shown as the article.

Referring now to FIGS. 50(*a*) to 50(*c*) and 51, the automatic vending machine of the embodiment 4 is characterized in the following. When the user slides the stamp K3 along a pair of guide rails 1000 disposed above a laser beam machining unit 120, the stamp K3 is guided to a laser beam machining position. When the stamp K3 is guided to the laser beam machining position, the stamp K3 is positioned in an optical axis direction (Z axis direction) of a lens 123A (not shown in these figures) of the laser beam machining unit 120 and in a plane (XY plane) which intersects the optical axis direction thereof. The other constructions are identical to those of the embodiment 1.

Referring again to FIGS. 50(*a*) to 50(*c*), the laser beam machining unit 120 is disposed in a predetermined position inside a casing of the laser beam machining means 100.

The upper surface of the casing of the laser beam machining means 100 is provided with a hole 1001 for performing laser beam machining to the stamp K3. The hole 1001 has a predetermined opening area in a predetermined region of the upper surface of the casing including the laser beam machining unit 120.

The guide rails 1000 are used for slidably guiding the stamp K3 and attached to the upper surface of the casing in the guide direction of the stamp K3 and a length thereof is set to be longer than an opening length of the hole 1001. The guide rails 1000 are each disposed spaced apart by a distance corresponding to a width of the stamp K3 as shown in FIG. 51. The guide rails 1000 are L-shaped, respectively and bent tips 1001*a* thereof are used for being engaged in hollows K3-10 provided in both side surfaces of the stamp K3. Engagement of the tips 1000*a* into the hollows K3-10 allows prevention of vertical/horizontal deviation when the stamp K3 is positioned in the laser beam machining position.

Referring again to FIGS. 50(*a*) to 50(*c*), the hole 1001 comprises i) a contact 1003 which is used for contacting the stamp K positioned in the laser beam machining position to prevent deviation in the guide start direction (R direction) and is movable upwardly due to resiliency of the a spring 1002, and ii) a pressure body 1005 which is used for contacting the stamp K positioned in the laser beam machining position to prevent deviation in the guide completion direction (L direction) and is movable in the guide start direction due to resiliency of a spring 1004.

One end of the spring 1002 is attached on a lower surface of the contact 1003 and the other end thereof is attached on a casing of the laser beam machining means 100.

The contact 1003 is disposed in the guide start position of the stamp K3 rather than the laser beam machining unit 120. As shown in FIG. 51, an upper portion of the contact 1003 projects out of the hole 1001 between the pair of guide rails 1000, contacting a hole wall of the hole 1001.

The upper surface of the contact 1003 is tapered, inclining downwardly toward the guide start position of the stamp K3. Therefore, the stamp K3 is slidable smoothly along the guide rails 1000 toward the laser beam machining position.

One end of the spring 1004 is attached to a rear surface of the pressure 1005 and the other end is attached to a hole wall of the hole 1001.

The pressure 1005 is disposed in the guide completion position of the stamp K rather than the contact 1003 between the laser beam machining unit 120 and the guide rails 1000. The pressure 1005 comprises i) a plate-shaped base 1005*a* which is movable in the guide start direction due to resiliency of the spring 1004, and ii) a pushing piece 1005*b* which is attached to a front surface of the base 1005*a* and is for use in contact with the stamp K3 in guiding the same. The upper portion of the pushing piece 1005B projects out of the hole 1001 between the pair of guide rails.

As shown in FIG. 50(*c*), resiliency of the spring 1004 is set so that the stamp K3 is positioned immediately on the laser beam machining unit 120, i.e., in the laser beam machining position when the pressure 1005 is pushed through in the guide completion direction (L direction).

Hereinafter, a guiding and positioning operations of the laser beam machining means will now be described.

As shown in FIG. 50(*a*), engaging the bent tips 1000*a* of the guide rails 1000 in the hollow K3-10 of the stamp K3, the stamp K3 slides along the guide rail 1000 from the guide start side (R side) to the laser beam machining position, in L direction.

Then, the stamp K contacts the contact 1003.

Continuing sliding the stamp K3, the stamp K3 pushes the contact 1003 from above, going over the upper portion of the contact 1003 and contacts the pushing piece 1005B of the pressure 1005.

At this time, the contact 1003 descends against resiliency of the spring 1002 and get in the hole 1001 for laser beam machining.

Continuing sliding of the stamp K3 pushing the pressure 1005, as shown in FIG. 50(*b*), the pressure 1005 moves in the guide completion position direction (L direction) against resiliency of the spring 1004.

Since the contact 1003 is subjected to pressure from the stamp K3, it is in the hole 1001.

Continuing sliding of the stamp K3 until the pressure 1005 is pushed through in the guide completion direction, the stamp K3 moves over the contact 1003 and is guided to the laser beam machining position.

Then, as shown in FIG. 50(*c*), the pushing piece 1005*a* of the pressure 1005 contacts against a front surface of the stamp K3 with resiliency, while the contact 1003 is released from pressure of the stamp K, so that it is pushed up by resiliency of the spring 1002 contacting a hole wall of the hole 1001, to be in contact with the rear surface of the stamp K3.

When the stamp K3 is guided to the laser beam machining position, the front and rear surfaces of the stamp K3 are positioned back and fourth by the pushing piece 1005*a* of the pressure 1005 and the contact 1003, while the right and left side surfaces of the stamp K3 are positioned vertically and horizontally by engaging the bent tips 1000*a* in the hollows K3-10.

As is appreciated from the foregoing description, in accordance with the embodiment 4, the user slides the stamp K3 along the guide rails 1000, thereby it is possible to guide the stamp K3 to the laser beam machining position. When the stamp K3 is guided to the laser beam machining position, the stamp K3 is positioned in the optical axis direction (z axis direction) of the lens 123A of the laser beam machining unit 120 and in a plane (XY plane) which intersects the optical axis direction thereof. In addition, it is not necessary to provide a tray 5 for setting the stamp K3 therein. As a result, a number of parts is reduced.

Embodiment 5

Figure 52:
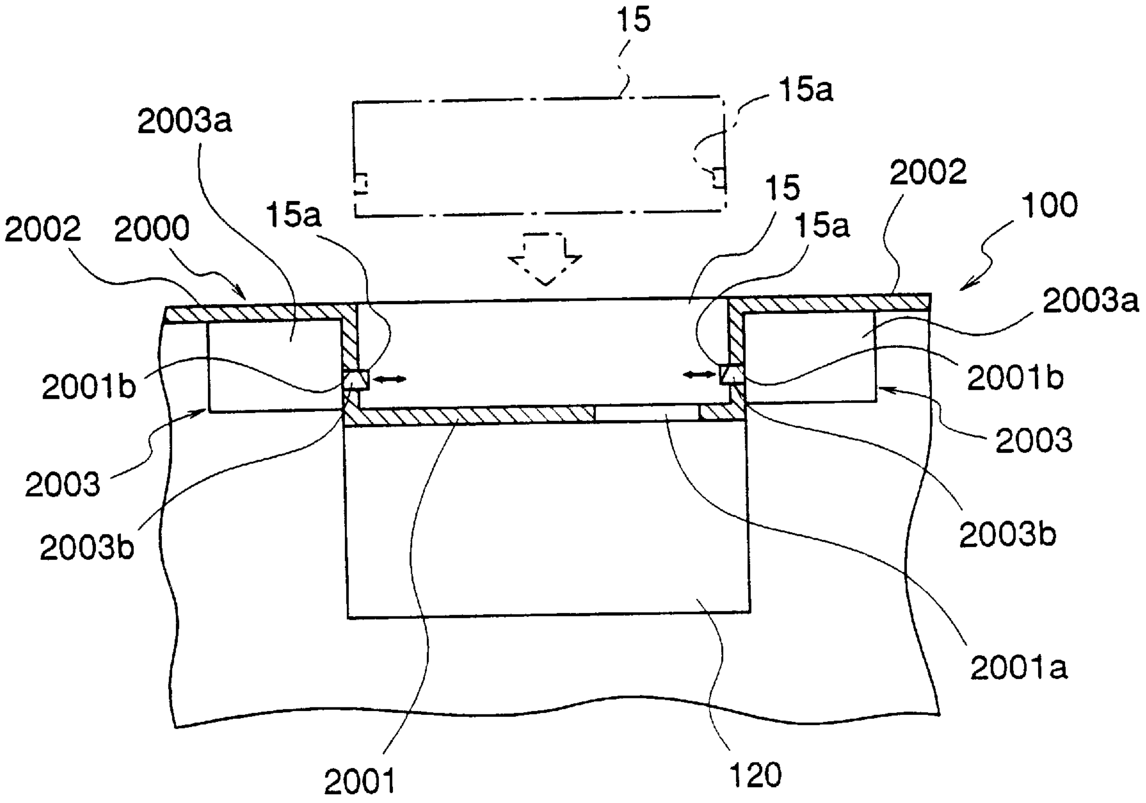
FIG. 52 is a simplified diagram illustrating a main structure of a laser beam machining means of the automatic vending machine to which an automatic laser beam machining machine according to an embodiment 5 of the present invention is applied.

FIG. 52 is a simplified diagram illustrating a main structure of the laser beam machining means of an automatic vending machine to which an automatic laser beam machining apparatus according to an embodiment 5 of the present invention is applied.

Referring now to FIG. 52, the automatic vending machine according to the embodiment 5 is characterized in the following respects.

When the user stores the package 15 including the article in a storage 2001 of a receiver 2000 disposed on the laser beam machining unit 120, the package 15 is guided to the laser beam machining position, and when the package 15 is guided thereto, it is positioned in the optical axis direction (z axis direction) of the lens 123A (not shown in FIG. 52) of the laser beam machining unit 120 and in a plane (XY plane) which intersects the optical axis direction thereof. The other constructions are identical to those of the embodiment 1.

The receiver 2000 is formed, being integral with the casing and is used for receiving the package 15. The receiver 2000 comprises i) the storage 2001 in which the package 15 is stored from above, and ii) a flange 2002 which extends outwardly from an edge of a side wall of the storage 2001.

The storage 2001 is disposed on the laser beam machining unit 120. A predetermined part of a bottom surface of the storage 2001 is provided with a hole 2001*a* for laser beam machining. A side surface of the storage 2001 is provided with the guide holes 2001*b* for guiding the engagements 2003*b* of a lock mechanism 2003 mentioned later so that it moves back and fourth freely.

The holes 2001*a* has a predetermined opening area so that laser beam machining is properly performed to the article in the package 15.

An upper surface of the flange 2002 is aligned with an upper surface of the casing and corresponds to the upper surface of the casing.

The lock mechanism 2003 comprises i) the bases 2003*a* attached to the storage 2001 of the receiver 2000 and the flange 2002, and ii) the engagement 2003*b* which is movable toward storage space of the storage 2001 by resiliency of a spring (not shown) provided in the base 2003*a* and is for being engaged in a recess 15*a* provided in a side surface of the package 15. The engagements 2003*b* are disposed, corresponding to the guide hole 2003B in the storage 2001.

A tip of the engagement 2003*b* is tapered, inclining downwardly toward the storage space of the storage 2001. Therefore, the package 15 is guided smoothly when it is stored along a side surface of the storage 2001.

Hereinafter, guiding and positioning operations of the laser beam machining means will be described.

The package 15 is inserted into the storage 2001, contacting a side surface thereof, from above the receiver 2000 toward the laser beam machining position.

Then, the package 15 comes into contact with the engagement 2003*b* of the lock mechanism 2003.

Continuing insertion of the package 15, it pushes the engagement 2003*b* laterally, guided downwardly along a tapered surface of a tip of the engagement 2003*b*.

At this time, the engagement 2003*b* recedes to the base 2003*a* of the lock mechanism 2003 against resiliency of the spring and a part of the engagement 2003*b* gets in the base 2003*b*.

Further continuing insertion of the package 15, it reaches a bottom surface of the storage 2001, i.e., the laser beam machining position. At this time, since the package 15 passes through the tips of the engagement 2003*b*, the engagement 2003*b* is released from pressure from the package 15, and is moved toward the storage space of the storage 2001 by resiliency of the spring 1002 and into engagement with the engagement recess 15*a* of the package 15.

When the package 15 is guided to the laser beam machining position, the package 15 is positioned vertically and horizontally by fitting the engagement 2003*b* of the lock mechanism 2003 into the engagement recess 15*a* of the package 15.

As described above, in accordance with the embodiment 4, the user stores the package 15 including the article in the storage 2001 of the receiver 2000, thereby the package 15 is guided to the laser beam machining position, and when the package 15 is guided to the laser beam machining position, the package 15 is positioned in an optical axis direction (z axis direction) of the lens 123A and in a plane (XY plane) which intersects the optical axis thereof. In addition, it is not necessary to provide the tray 5 for setting. As a result, number of parts is reduced.

In the embodiment 5, the user directly stores the package 15 in the receiver 2000. Alternatively, the laser beam machining means 100 may be provided with a chute including a groove having a given inclination, along which the package 15 is slid downwardly and guided to the laser beam machining position.

In FIG. 52, there is no door provided. Preferably, the door may be provided to prevent laser beams from being directed to the user for safety.

Embodiment 6.

Figure 53:
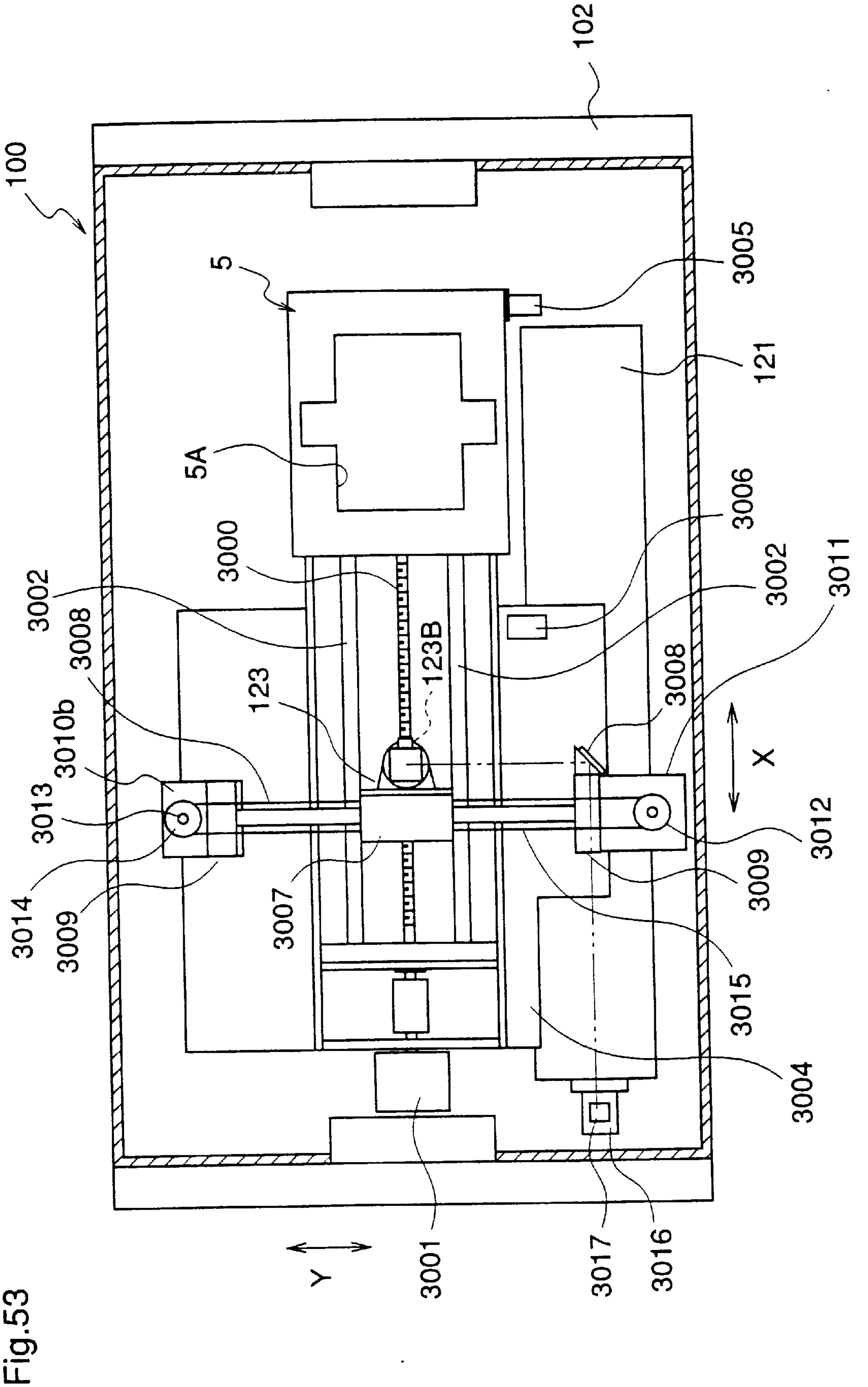
FIG. 53 is a transversely sectional plan view of a part of the laser beam machining means of the automatic vending machine to which the automatic laser beam machining machine according to the embodiment 5 of the present invention is applied.
Figure 54:
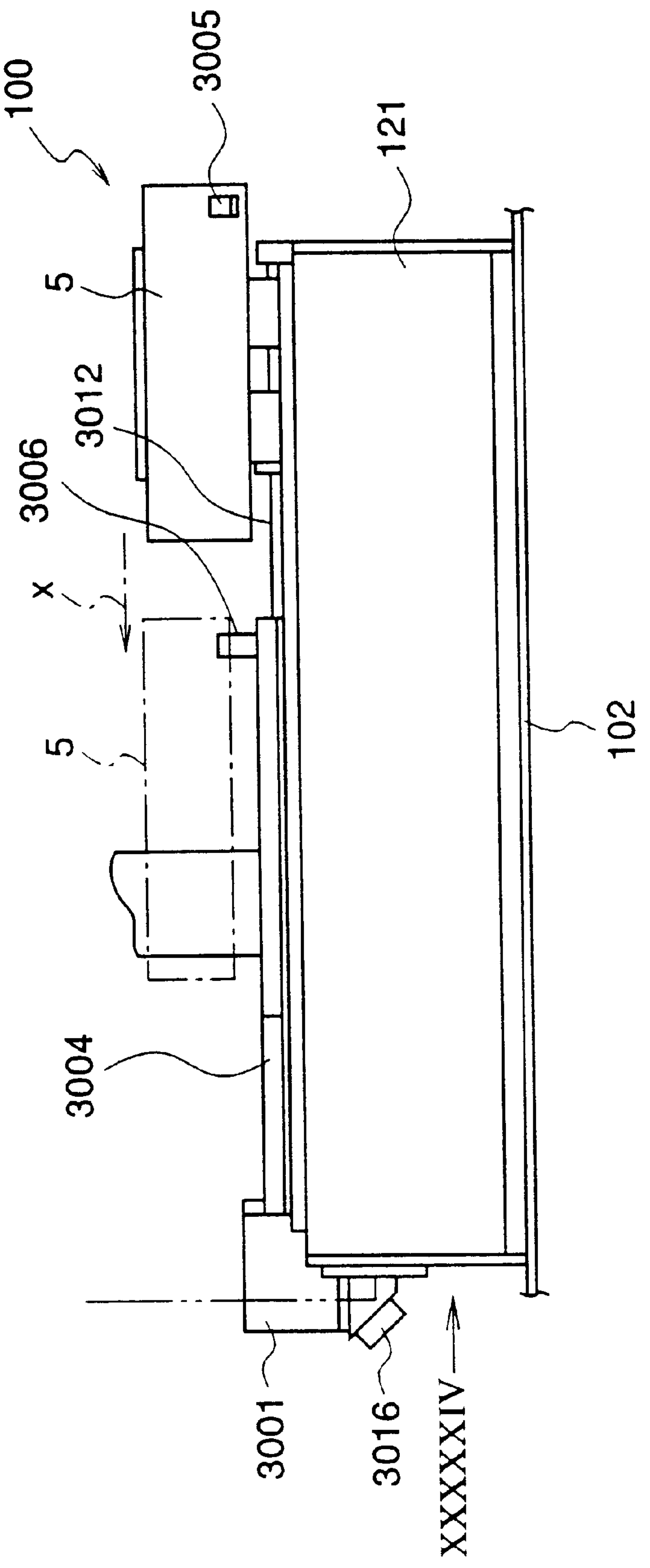
FIG. 54 is a vertically sectional right side view illustrating a part of the laser beam machining means to which the automatic laser beam machining machine is applied.
Figure 55:
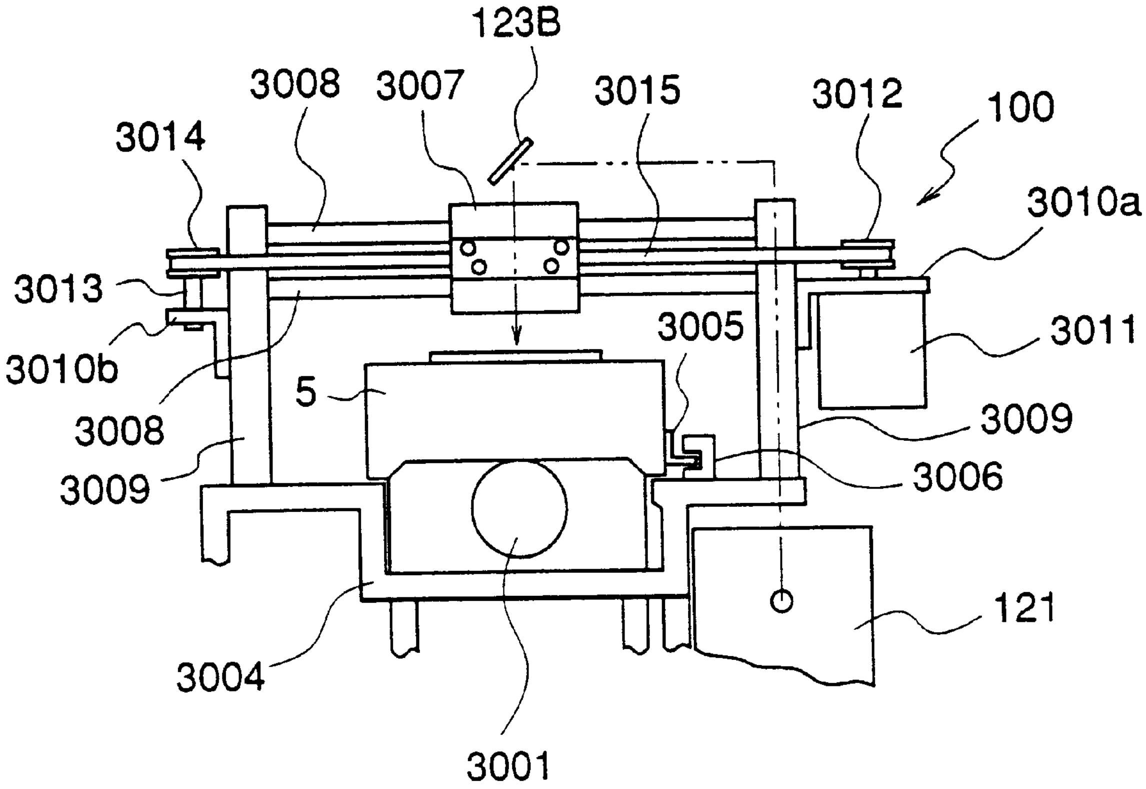
FIG. 55 is a diagram in the direction of the arrow XXXXXIc in FIG. 54.

FIG. 53 is a fragmentary sectional plan view illustrating a laser beam machining means of an automatic vending machine to which an automatic laser beam machining apparatus according to an embodiment 6 of the present invention is applied. FIG. 54 is a vertically sectional right side view illustrating the laser beam machining means. FIG. 55 is a view in the direction of XXXXIV arrow in FIG. 54.

With reference to FIGS. 53 to 55, the laser beam machining means 100 according to the automatic vending machine according to the embodiment 6 is characterized by a guiding mechanism for guiding the package 15 to the laser beam machining position with the article stored in the package 15 fixed to the tray 5 and a movement mechanism of a laser beam machining head 123. The other construction is identical to those of the embodiment 1.

The guiding mechanism comprises i) a feed shaft 3000 which extends in X axis direction and into which the tray 5 is fit slidably in X axis direction outwardly, ii) a serve motor 3001 whose output shaft is coupled to the feed shaft 3000 and which is used for rotating the feed shaft 3000, iii) a pair of guide bars 3002 which extend along the feed shaft 3000 and sandwich the feed shaft 3000 between them, and which is used for guiding the tray 5 in X axis direction iv) a supporting table 3004 disposed on a base 102 and for supporting the feed shaft 3000 and the guide bar 3002, v) an identification medium 3005 attached to one side of the tray 5, and vi) a transmission photo interrupter 3006 attached to a position corresponding to the laser beam machining position in an upper surface of the supporting table 3004 and for detecting passage of the identification medium 3005 without contacting the same. By driving the servo motor 3001, the tray 5 is moved in X axis direction toward the laser beam machining position. When the photo interrupter 3006 detects passage of the identification medium 3005, driving of the servo motor 3001 is stopped.

In the embodiment 6, the servo motor 3001 and the photo interrupter 3006 are used for guiding the tray 5 to the laser beam machining position, and when the photo interrupter 3006 detects passage of the identification medium 3005, driving of the servo motor 3001 is stopped, thereby the tray 5 is reliably stopped at the laser beam machining position. Alternatively, at the completion of counting a predetermined number of pulses by using a pulse motor, driving of the pulse motor may be stopped, thereby the tray 5 is reliably stopped at the laser beam machining position.

Referring again to FIGS. 53 and 55, the movement mechanism of the laser beam machining head 123 comprises i) a slider 3007 to which the laser beam machining head 123 is attached and which slides in Y axis direction, ii) a pair of head guide bars 3008 which extends in Y axis direction, into which the slider 3007 is fit outwardly and which guides the slider 3007 in Y axis direction, iii) a pair of columns 3009 disposed on the supporting table 3004 upwardly, sandwiching a tray guide bar 3002 between them, and for supporting the head guide bar 3008, iv) a pulse motor attached to one column 3009 through an L-shaped angle 3010*a*, v) a pulley 3012 rotatably attached to an output shaft of the pulse motor 3011 and which rotates together with the output shaft, vi) a pulley 3014 attached to the other column 3009 through the L-shaped angle 3010*b* and which rotates around a rotation axis 3013, and vii) an endless belt 3015 to which the slider 3007 is attached and engages in the pulleys 3012 and 3014, and which is rotatable in Y axis direction By driving the pulse motor 3011, the laser beam machining head 123 is moved in Y axis direction back and fourth.

Beside the supporting table 3004, a laser oscillation unit 121 is disposed in X axis direction.

Hereinafter, a guiding operation of the tray and a moving operation of the laser beam machining head will be described.

At the completion of setting the package 15 in the fitting recess 5A of the tray 5, the servo motor 3000 is driven, thereby the tray 5 moves from a home position to the laser beam machining position along the tray guide bar 3002.

The servo motor 3001 stops driving when the photo interrupter 3006 detects passage of the identification medium 3005 in the middle of movement of the tray 5 to the laser beam machining position.

Then the tray 5 stops moving and stops at the laser beam machining position.

On completion of guiding the tray 5 to the laser beam machining position, the pulse motor 3011 is moved in synchronization with laser oscillation from the laser oscillation unit 121.

Then, the laser beam machining head 123 moves to a beam machining region of the article set in the tray 5 along the head guide bar 3008 from home position.

By driving the servo motor 3001 of the guide mechanism, the tray 5 is moved in X axis direction. As a result, the tray 5 and the laser beam machining head 123 are moved relatively.

Direction of laser beams oscillated from the laser oscillation unit 121 is changed upwardly by a first mirror 3016 provided in a laser oscillation side of the laser oscillation unit 121 as illustrated by alternate long and two short dashes line in FIG. 54. Thereafter, as illustrated by alternate long and two short dashes line in FIG. 53, the laser beams are guided to a third mirror 3018 provided in the column 3009 in X axis direction by a second mirror 3017 provided above the first mirror 3016 and by the third mirror 3018, the laser beams are guided toward the reflection mirror 123B of the laser beam machining head 123 in a parallel direction to the head guide bar 3008. As shown in FIG. 55, so reflected laser beams, whose direction is changed downwardly by the reflection mirror 123*b* of the laser beam machining head 123 and then are condensed through the lens 123A (not shown in FIGS. 53 to 55), to be applied to the article.

As described above, in the embodiment 6, the servo motor 3001 is driven, thereby the tray 5 is moved in X axis direction to the laser beam machining position of the laser beam machining means 100, and when optically detecting that the tray 5 has reached the laser beam machining position, the servo motor 3001 stops driving. Therefore, when the tray 5 is guided to the laser beam machining position, it is reliably stopped at the position. In addition, one driving source performs its function satisfactorily for the guide mechanism and a link mechanism as illustrated in the guide mechanism of the embodiment 1 is dispensed with. As a result, the guide mechanism has a simplified structure as compared with that of the embodiment 1.

Further, when the laser beam machining head 123 is moved back and fourth in Y direction by driving the pulse motor 3011, the tray 5 is moved in X axis direction by driving the servo motor 3001 of the guide mechanism, thereby the tray 5 and the laser beam machining head 123 are moved relatively. Therefore, it is possible to perform desired laser beam machining to the beam machining region of the article.

Figure 56:
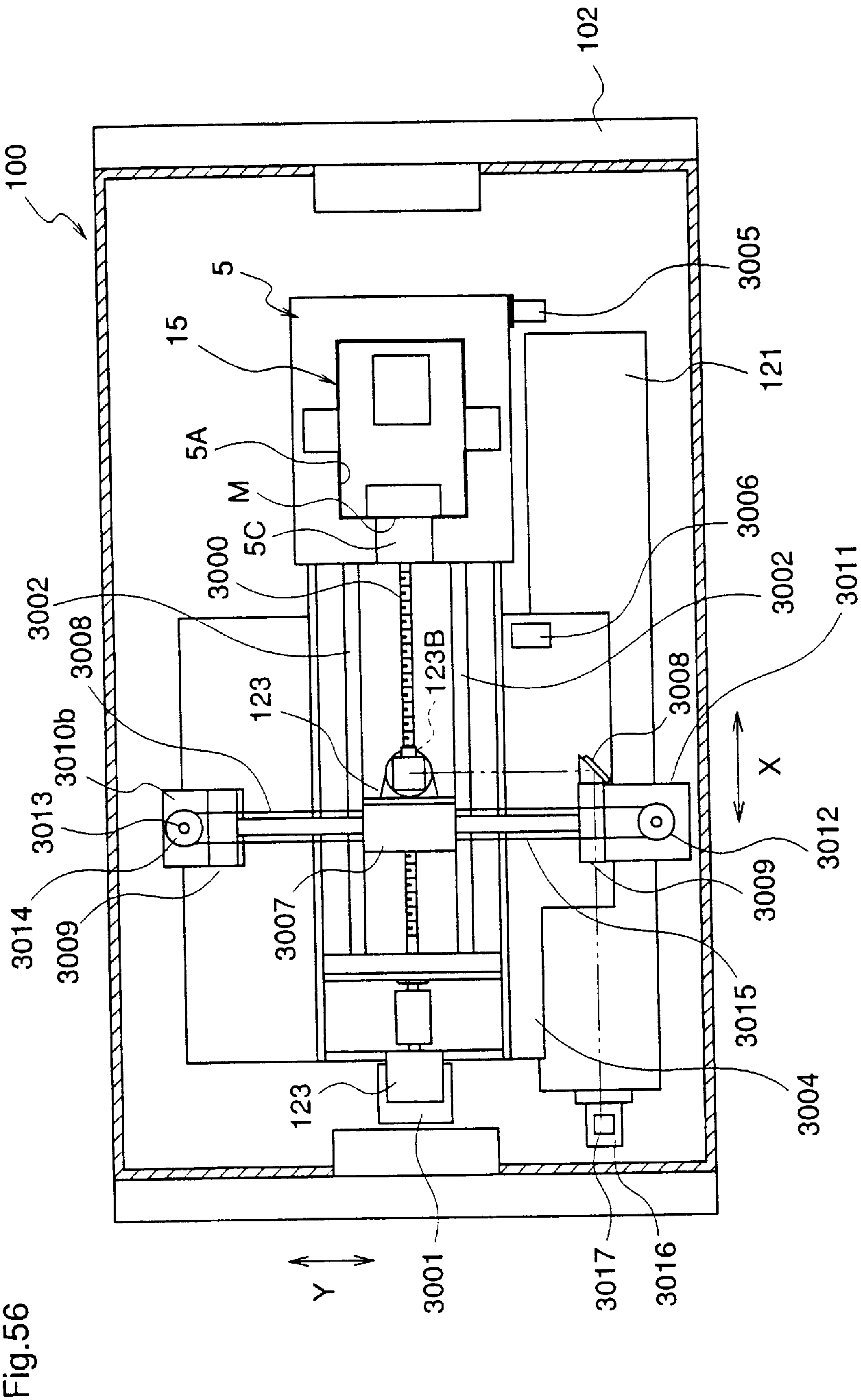
FIG. 56 is a transversely sectional plan view illustrating a part of the laser beam machining means according to the modification.
Figure 57:
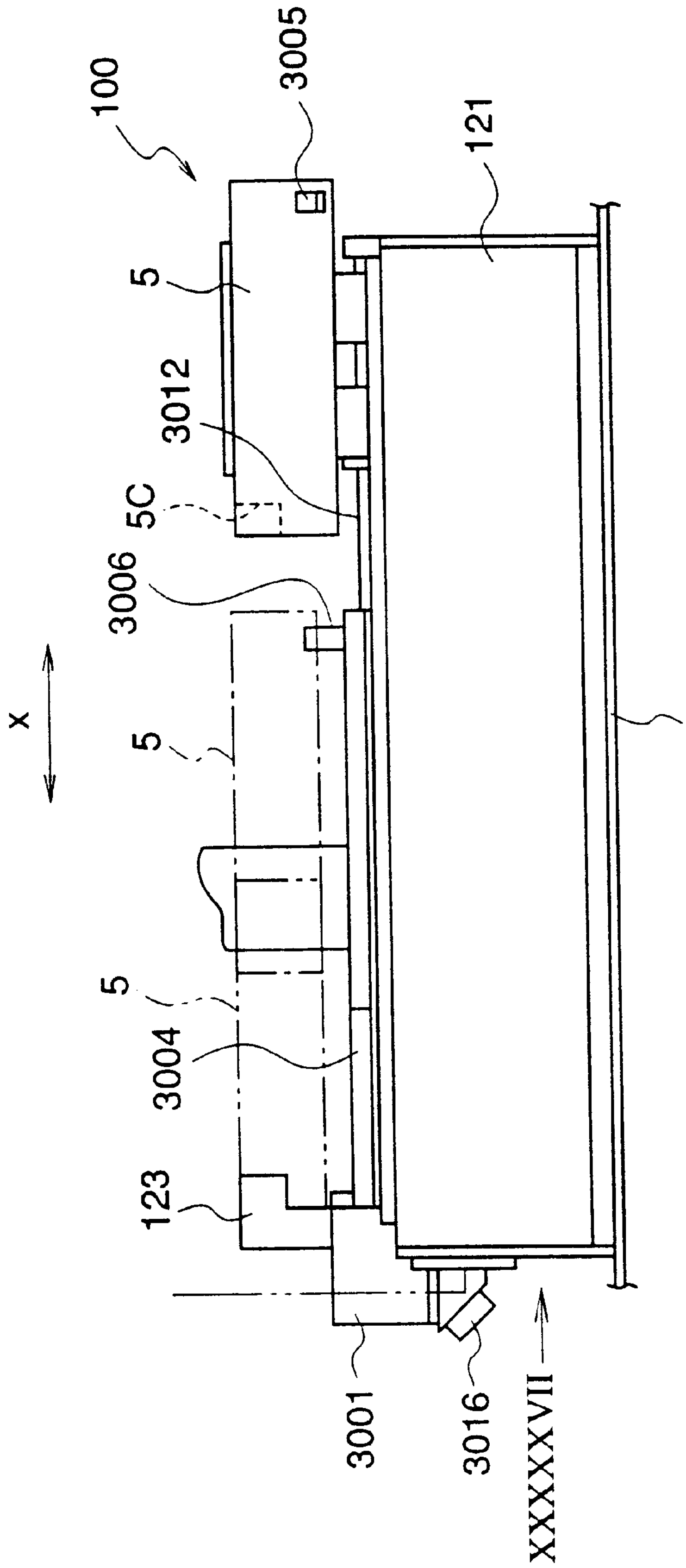
FIG. 57 is a vertically sectional right side view illustrating a part of the laser beam machining means.
Figure 58:
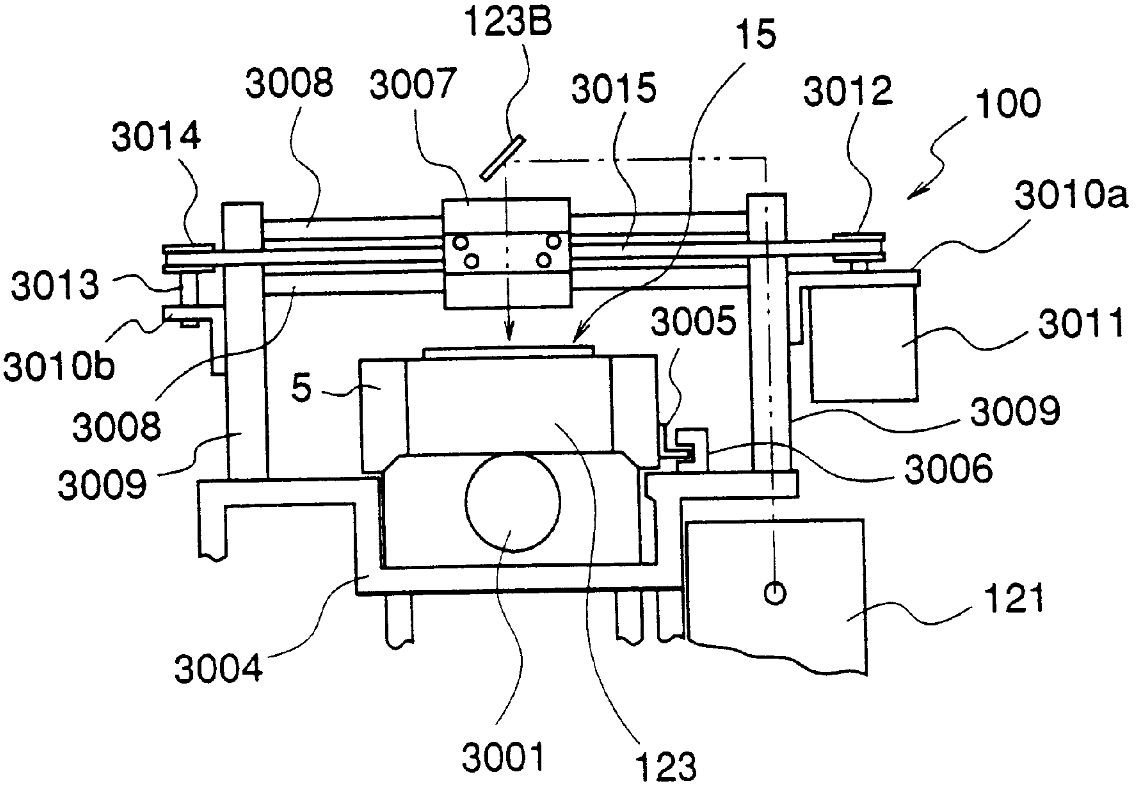
FIG. 58 is a diagram in the direction of the arrow XXXXVII in FIG. 57.

In the embodiment 6, as shown in FIG. 9, the tray 5 ascends, thereby a mark detection sensor 123 abuts a mark M. Alternatively, as shown in FIGS. 56 to 58, the mark detection sensor 123 is disposed opposite to the tray 5 on the servo motor 3001 disposed in an end position and a cutout 5C is formed from a face of the tray 5 which is opposite to the mark detection sensor 123 to a recess 5A and is used for guiding the mark detection sensor 123. As illustrated by alternate long and two short dashes line in FIG. 57, the tray 5 is moved to an end position in the vicinity of the servo motor 3001 beyond the photo interrupter 3006 and, after detecting the mark M of the package 15 set in the tray 5 in this end position, as illustrated by alternate long and short dash line, the tray 5 is moved to a home position again, and when the photo interrupter 3006 detects passage of the identification medium 3005, the tray 5 is stopped, thereby the article is moved to the laser beam machining position.

The present invention is not limited to the embodiments While preferred embodiments of the invention have been described for the purpose of disclosure, numerous changes and modifications to those embodiments described herein will be readily apparent to those skilled in the art and are encompassed within the spirit of the invention and the scope of the following claims.

What is claimed is:

1. An automatic laser beam machining apparatus for automatically laser beam machining an article, the apparatus comprising:

fare detecting means for detecting whether a user slots a fare for starting laser beam machining of an article;

laser beam machining means for laser beam machining of a pattern on the article;

guide means for guiding an article to a machining position of said laser beam machining means;

positioning means for positioning an optical axis of a lens of said laser beam machining means and an article in a plane intersecting the optical axis when the article is guided to the machining position by said guide means;

control means for starting laser beam machining of the article by said laser beam machining means after positioning of the article in the machining position by said positioning means, when the fare is detected by said fare detecting means;

a package having a bottom and a lid;

a stocker for storing plural types of articles, with an article contained in the package, said stocker discharging an article contained in a package when the fare is detected by said fare detecting means;

a laser beam introduction port for introducing laser beams from said laser beam machining means, the introduction port being disposed on a surface of said package;

selecting means for selecting a desired article so that the article is discharged from said stocker;

a mark for identifying the type of the article; and a mark detection sensor that identifies the type of article by detecting the mark, wherein said control means controls said stocker to have an attitude for discharging a stored article when the fare is detected by said fare detecting means and, in response to an instruction from said selection means, controls said stocker to selectively discharge the article, and, thereafter, controls said laser beam machining means to perform laser beam machining under conditions conforming to the article type when the type of the discharged article is detected by said mark detection sensor.

2. The automatic laser beam machining apparatus of claim 1 wherein said guide means comprises a tray including fixing means for fixing the article, and a guide mechanism for guiding the article fixed to the tray to a laser beam machining position of said laser beam machining means.

3. The automatic laser beam machining apparatus of claim 1 including a put-in port for putting the article in said laser beam machining means located in the vicinity of said laser beam machining means, said put-in port having a put-in door easy to open and close, said apparatus including an open/close detection sensor for detecting a state of said put-in door, and wherein said control means prohibits laser beam machining by said laser beam machining means when said open/close detection sensor detects said put-in door is open.

4. The automatic laser beam machining apparatus of claim 1 including image taking means for taking an image of a user, and display means for displaying the image taken by said image taking means, wherein said laser machining means performs laser beam machining of the article bared on the image displayed by said display means.

5. An automatic laser beam machining apparatus for automatically laser beam machining an article, the apparatus comprising:

fare detecting means for detecting whether a user slots a fare for starting laser beam machining of an article;

laser beam machining means for laser beam machining of a pattern on the article;

guide means for guiding an article to a machining position of said laser beam machining means;

positioning means for positioning an optical axis of a lens of said laser beam machining means and an article in a plane intersecting the optical axis when the article is guided to the machining position by said guide means;

control means for starting laser beam machining of the article by said laser beam machining means after positioning of the article in the machining position by said positioning means, when the fare is detected by said fare detecting means;

a package having a bottom and a lid;

a stocker for storing plural types of articles with an article contained in the package, said stocker discharging an article contained in a package when the fare is detected by said fare detecting means;

a seal for checking whether the lid of said package is open, said seal being attached to said package; and a seal detection sensor that checks whether the lid is open by detecting where said seal is attached to said package, and wherein said control means prohibits laser beam machining by said laser beam machining means when said seal detection sensor detects the lid is open.

6. The automatic laser beam machining apparatus of claim 5 wherein said guide means comprises a tray including fixing means for fixing the article and a guide mechanism for guiding the article fixed to the tray to a laser beam machining position of said laser beam machining means.

7. The automatic laser beam machining apparatus of claim 5 including a put-in port for putting the article in said laser beam machining means located in the vicinity of said laser beam machining means, said put-in port having a put-in door easy to open and close, said apparatus including an open/close detection sensor for detecting a state of said put-in door, and wherein said control means prohibits laser beam machining by said laser beam machining means when said open/close detection sensor detects said put-in door is open.

8. The automatic laser beam machining apparatus of claim 5 including image taking means for taking an image of a user, and display means for displaying the image taken by said image taking means, wherein said laser beam machining means performs laser beam machining of the article based on the image displayed by said display means.

9. An automatic laser beam machining apparatus for automatically laser beam machining an article, the apparatus comprising:

fare detecting means for detecting whether a user slots a fare for starting laser beam machining of an article;

laser beam machining means for laser beam machining of a pattern on the article;

a mark for identifying machining conditions of the article, the mark being attached to the article;

a mark detection sensor that identifies the machining conditions by detecting the mark;

control means for controlling said laser beam machining means to perform laser beam machining under the machining conditions identified by said mark detection sensor when the fare is detected by said fare detecting means;

a package including a bottom and a lid, the article being stored in said package, said package including a seal for checking whether the lid is open, said seal being attached to the package; and a seal detection sensor for detecting whether the lid is open by detecting where said seal is attached to said package, and wherein said control means prohibits laser beam machining by said laser beam machining means when said seal detection sensor detects that the lid is open.

10. The automatic laser beam machining apparatus of claim 9 including a stocker for storing the article, said stocker discharging the article when the fare is detected by said fare detecting means.

11. The automatic laser beam machining apparatus of claim 10 wherein said stocker stores plural types of articles, said apparatus including selecting means for selecting one of the articles for discharging the selected article from said stocker, and said control means controls said stocker to take an attitude for discharging the article when the fare is detected by said fare detecting means and, in response to an instruction from said selecting means, to selectively discharge the article from said stocker.

12. The automatic laser beam machining apparatus of claim 9 including positioning means for positioning an optical axis of a lens of said laser beam machining means and the article in a plane intersecting the optical axis when the article is placed in a laser beam machining position of said laser beam machining means.

13. The automatic laser beam machining apparatus of claim 9 including a laser beam introduction port for introducing laser beams from said laser machining means and located on a surface of said package.

14. The automatic laser beam machining apparatus of claim 13 including a coating seal to close said laser beam introduction port and to cover said seal.

15. The automatic laser beam machining apparatus of claim 9 including image taking means for taking an image of a user, and display means for displaying the image taken by said image taking means, and wherein said laser beam machining means performs laser beam machining of the article bared on the image displayed by said display means.

16. An automatic laser beam machining apparatus for automatically performing laser beam machining of an article, comprising:

fare detecting means that detects whether a user slots a fare for starting laser beam machining of the article;

laser beam machining means for laser beam machining of a pattern on the article;

a mark for identifying a type of the article, said mark being attached to the article;

a mark detection sensor that identifies the type of the article by detecting said mark; and control means for starting laser beam machining of the article in said laser beam machining means under machining conditions conforming to the type of the article detected by said mark detection sensor, when the fare is detected by said fare detecting means.

17. The automatic laser beam machining apparatus of claim 16 including positioning means for positioning an optical axis of a lens of said laser beam machining means and the article in a plane intersecting the optical axis when the article is placed in a laser beam machining position of said laser beam machining means.

18. The automatic laser beam machining apparatus of claim 16 including a stocker for storing the article, said stocker discharging the article when the fare is detected by said fare detecting means.

19. The automatic laser beam machining apparatus of claim 18 wherein said stocker stores plural types of articles, said apparatus including selecting means for selecting an article to discharge the article from said stocker, and said control means makes said stocker take an attitude for discharging the article stored to selectively discharge the article in response to an instruction from said selecting means, when the fare is detected by said detecting means.

20. The automatic laser beam machining apparatus of claim 16 including a package in which the article is stored, said package including a bottom and lid, said package including a seal for checking whether the lid is open, said seal being attached to the package, and a seal detection sensor for detecting whether the lid is open by detecting where said seal is attached to said package, and wherein said control means prohibits laser beam machining by said laser beam machining means when said seal detection sensor detects that the lid is open.

21. The automatic laser beam machining apparatus of claim 20 including a laser beam introduction port for introducing laser beams from said laser beam machining means and located on a surface of the package.

22. The automatic laser beam machining apparatus of claim 21 including a coating seal to close said laser beam introduction port and to cover said seal.

23. The automatic laser beam machining apparatus of claim 16 including image taking means for taking an image of a user, and display means for displaying the image taken by said image taking means, and wherein said laser beam machining means performs laser beam machining of the article bared on the image displayed by said display means.

24. A method of automatically performing a desired laser beam machining to an article, comprising the steps of:

reading a mark on the article for checking machining condition thereof by using a mark detecting sensor to extract the machining condition when at least a fare for starting laser beam machining to the article is slotted by a user;

producing machining data based on the extracted machining condition and image data for performing laser beam machining of a pattern to be expressed on the article; and performing laser beam machining to the article on the basis of the produced machining data.

25. The method of claim 24 wherein said machining data have been converted into contrast image data of monochromator by a dither method or the like.

26. The method of claim 24 wherein the article is contained in a package including a bottom, a lid, and a mark for checking whether the lid is opened, laser beam machining is not performed when said mark detection sensor reads said mark and detects the lid is opened.

27. The method of claim 26 wherein said mark is a thin-film pattern made of a conductive material, provided on a surface of a seal extends over the bottom and the lid when sealing the package, and said mark detection sensor detects whether the lid is opened by detecting whether a region where the pattern is attached to the bottom is continuous with a region where the pattern is attached to the lid.

28. The method of claim 24 wherein a put-in port is maintained closed at least during laser beam machining by prohibiting the put-in port being opened, when the article is put in a predetermined laser beam machining position through a put-in port, the put-in port is closed, and a detecting sensor confirms the put-in port is closed.

* * * * *

UNITED STATES PATENT AND TRADEMARK OFFICE

CERTIFICATE OF CORRECTION

PATENT NO. : 5,904,869

DATED : May 18, 1999

INVENTOR(S) : SAITO et al.

It is certified that error appears in the above-identified patent and that said Letters Patent is hereby corrected as shown below:

Column 37, line 38, change "bared" to --based--.

Column 39, line 15, change "bared" to --based--.

Column 40, line 19, change "bared" to --based--.

Signed and Sealed this

Twenty-first Day of December, 1999

Attest:

Q. TODD DICKINSON

*Attesting Officer* *Acting Commissioner of Patents and Trademarks*